US012386166B2

(12) United States Patent
Ikeda et al.

(10) Patent No.: US 12,386,166 B2
(45) Date of Patent: Aug. 12, 2025

(54) MICROSCOPE DEVICE AND DATA GENERATION METHOD USING MICROSCOPE

(71) Applicant: NIKON CORPORATION, Tokyo (JP)

(72) Inventors: Satoshi Ikeda, Yokohama (JP); Naoki Fukutake, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 605 days.

(21) Appl. No.: 17/707,096

(22) Filed: Mar. 29, 2022

(65) Prior Publication Data

US 2022/0244516 A1 Aug. 4, 2022

Related U.S. Application Data

(63) Continuation of application No. PCT/JP2019/038569, filed on Sep. 30, 2019.

(51) Int. Cl.
*G02B 21/08* (2006.01)
*G02B 21/02* (2006.01)
*G02B 21/36* (2006.01)

(52) U.S. Cl.
CPC ........... *G02B 21/088* (2013.01); *G02B 21/02* (2013.01); *G02B 21/361* (2013.01)

(58) Field of Classification Search
CPC ..... G02B 21/088; G02B 21/02; G02B 21/361
See application file for complete search history.

(56) References Cited

U.S. PATENT DOCUMENTS

| 6,262,818 B1 | 7/2001 | Cuche et al. |
| 2015/0015871 A1 | 1/2015 | Tamano |
| 2015/0309300 A1 | 10/2015 | Higaki |
| 2021/0311294 A1 | 10/2021 | Hayashi |

FOREIGN PATENT DOCUMENTS

| JP | 2002-526815 A | 8/2002 |
| JP | 2014-052476 A | 3/2014 |
| JP | 2014-137558 A | 7/2014 |
| JP | 2015-018045 A | 1/2015 |

OTHER PUBLICATIONS

Juan M. Soto et al., Optical diffraction tomography with fully and partially coherent illumination in high numerical aperture labelfree microscopy [Invited], "Applied Optics", Jan. 1, 2018, vol. 57, No. 1 (10 pp.).
International Search Report, dated Dec. 24, 2019, in corresponding International Patent Application No. PCT/JP2019/038569 (4 pp.).
Written Opinion of the International Searching Authority, dated Apr. 14, 2022, in corresponding International Application No. PCT/JP2019/038569 (13 pp.).

*Primary Examiner* — James A Dudek

(74) *Attorney, Agent, or Firm* — STAAS & HALSEY LLP

(57) ABSTRACT

A microscope device comprises an illumination optical system for illuminating a sample, a detection optical system for receiving light from the sample, a detector for detecting the light from the sample via the detection optical system and outputting a detection signal of the light, a data processor for generating at least one of a three-dimensional refractive index distribution and a two-dimensional phase distribution in the sample based on the detection signal of the light output from the detector, and a modulation element group that is provided at a position of a pupil or a position conjugate with the pupil in only the illumination optical system, and has light transmittance changing continuously within a surface of the pupil or within a surface conjugate with the pupil.

12 Claims, 26 Drawing Sheets

FIG.8A
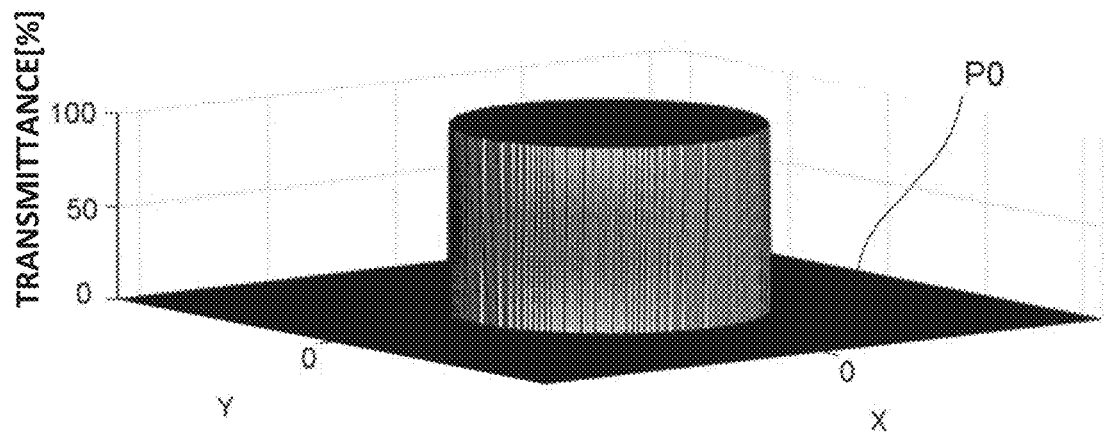
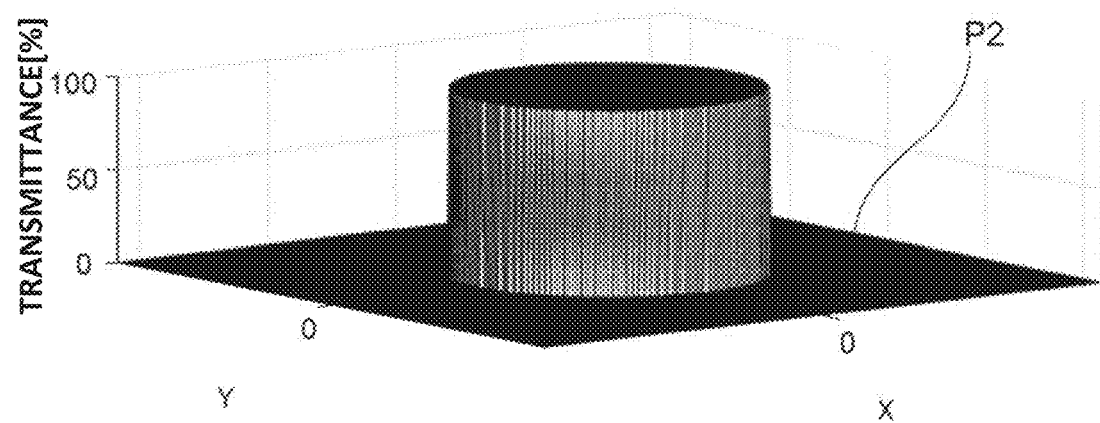
FIG.8B
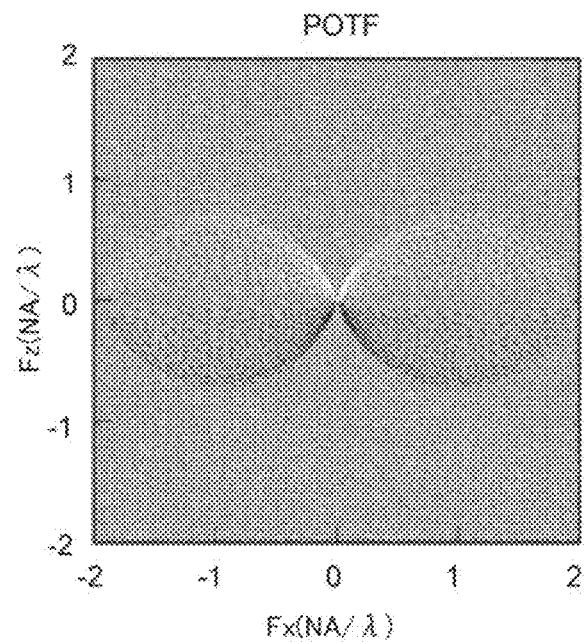

FIG. 9A
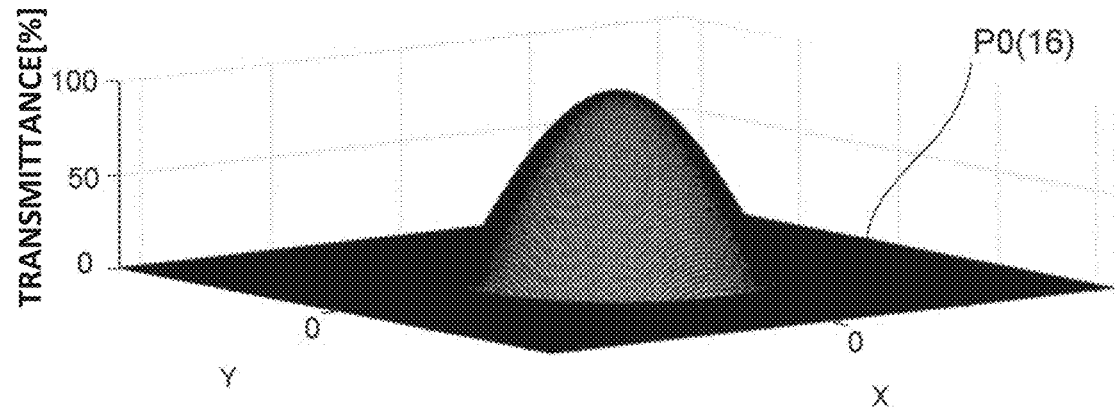
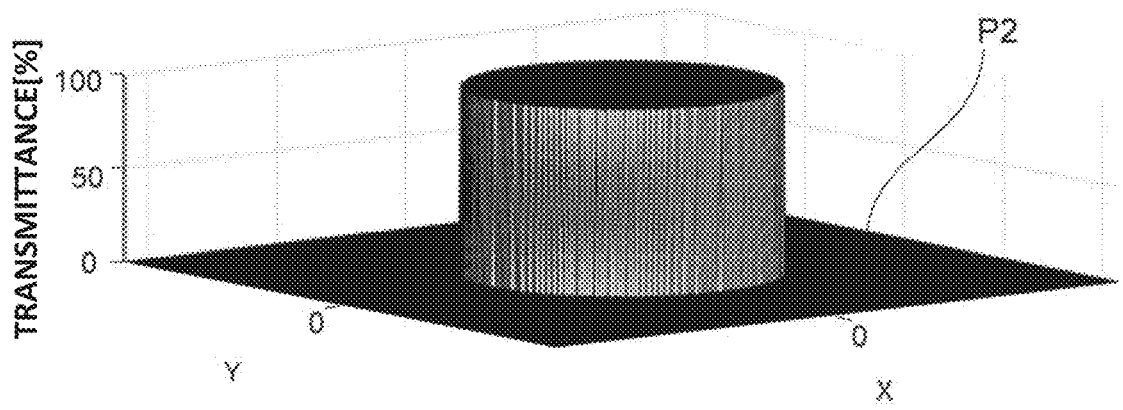
FIG. 9B
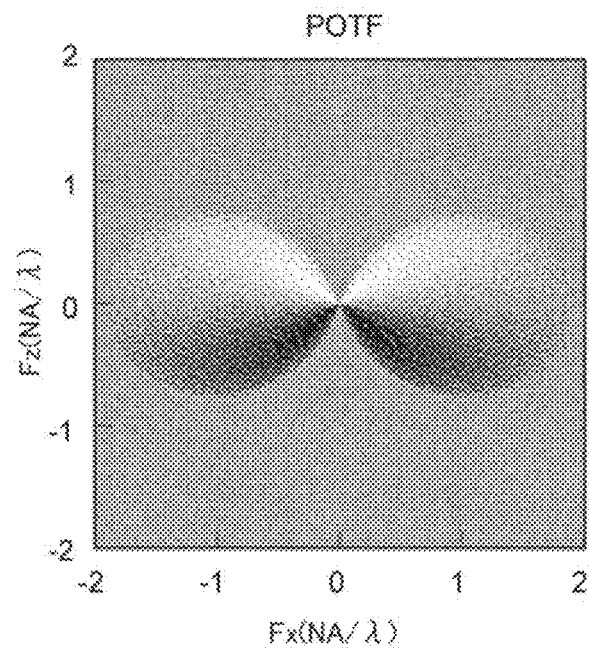

MICROSCOPE DEVICE AND DATA GENERATION METHOD USING MICROSCOPE

CROSS REFERENCE TO RELATED APPLICATION

This application is a Continuation of International Patent Application No. PCT/JP2019/038569 filed on Sep. 30, 2019, the contents of which are incorporated herein by reference.

TECHNICAL FIELD

The present invention relates to a microscope device and a data generation method using a microscope.

TECHNICAL BACKGROUND

A method for finding a phase distribution and a refractive index distribution in a sample such as a phase object has been recently devised (see, for example, Non-Patent literature 1).

PRIOR ARTS LIST

Non Patent Document

Non-Patent literature 1: Juan M. Soto et al., Optical diffraction tomography with fully and partially coherent illumination in high numerical aperture label-free microscopy [Invited], "Applied Optics", Jan. 1, 2018, Vol. 57, No. 1.

SUMMARY OF THE INVENTION

A microscope device according to a first aspect comprises: an illumination optical system for illuminating a sample; a detection optical system for receiving light from the sample; a detector for detecting the light from the sample via the detection optical system and outputting a detection signal of the light; a data processor for generating at least one of a three-dimensional refractive index distribution and a two-dimensional phase distribution in the sample based on the detection signal output from the detector; and a modulation element group that is provided at a position of a pupil or a position conjugate with the pupil in only the illumination optical system, and has light transmittance changing continuously within a surface of the pupil or within a surface conjugate with the pupil.

A microscope device according to a second aspect comprises: an illumination optical system for illuminating a sample; a detection optical system for receiving light from the sample; a detector for detecting light from the sample via the detection optical system and outputting a detection signal of the light; a data processor for forming an image of the sample based on the detection signal output from the detector; and a modulation element that is provided at a position of a pupil or a position conjugate with the pupil in only the illumination optical system, and has light transmittance changing continuously within a surface of the pupil or a surface conjugate with the pupil, wherein the modulation element is a spatial light modulator capable of changing a transmittance distribution of the light, and wherein the spatial modulator includes a transmission type flat plate, a transmission type liquid crystal element, a reflection type liquid crystal element, and a digital mirror device (DMD) in which light transmittance changes, and when the DMD is used, a desired light transmittance distribution can be set by controlling an angle of each mirror in the DMD.

A data generation method according to a third aspect is a data generation method using a microscope device comprising an illumination optical system for illuminating a sample, a detection optical system on which light from the sample is incident, and a modulation element group which is provided at a position of a pupil or a position conjugate with the pupil in only the illumination optical system, and has light transmittance changing continuously within a surface of the pupil or within a surface conjugate with the pupil, the data generation method comprising: detecting light from the sample via the detection optical system and outputting a detection signal of the light; and generating data of at least one of a three-dimensional refractive index distribution and a two-dimensional phase distribution in the sample based on the output detection signal.

BRIEF DESCRIPTION OF THE DRAWINGS

FIG. 8A is a graph showing a distribution of the transmittance of a conventional pupil, and FIG. 8B is a diagram showing a distribution of POTF in the case of FIG. 8A;

FIG. 9A is a graph showing a case where the light transmittance of an illumination side modulation element changes according to a cosine function, and FIG. 9B is a diagram showing a distribution of POTF in the case of FIG. 9A;

DESCRIPTION OF THE EMBODIMENTS

Figure 1:
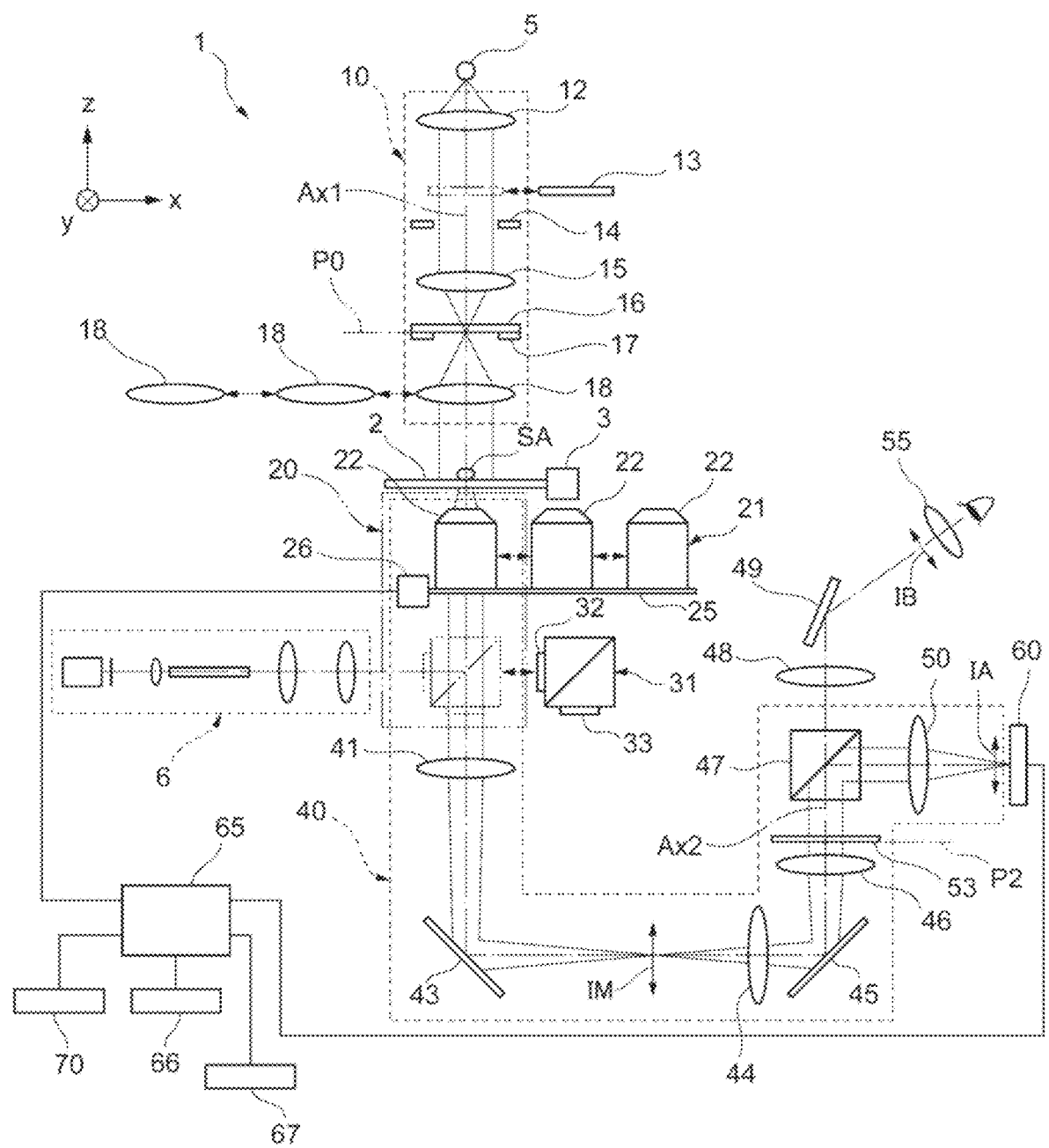
FIG. 1 is a diagram showing a schematic configuration of a microscope device according to a first embodiment.

A microscope device according to each embodiment will be described hereinafter. In the figures used in the following description, components may be illustrated as being enlarged for convenience in order to make the features thereof easy to understand, and the dimensional ratios and the like of the components are not necessarily the same as the actual ones.

First Embodiment

First, a microscope device 1 according to a first embodiment will be described with reference to FIG. 1. The microscope device 1 according to the first embodiment comprises a stage 2, a transmitted illumination light source 5, an epi-illumination light source 6, a transmitted illumination optical system 10, an epi-illumination optical system 20, a detection optical system 40, a detector 60, a control part 65, an image processor 66, an operation input part 67, and an image display part 70. Here, the optical axis of the transmitted illumination optical system 10 is represented by Ax1, and the optical axis of the detection optical system 40 is represented by Ax2. The optical axis Ax1 of the transmitted illumination optical system 10 and the optical axis Ax2 of the detection optical system 40 are basically common optical axes to (that is, coaxial with) the optical axis of the microscope device 1, but they are represented to be discriminated as the optical axis Ax1 of the transmitted illumination optical system 10 and the optical axis Ax2 of the detection optical system 40 for convenience of description. The stage 2 is formed by using a transparent parallel flat plate. The stage 2 supports a sample SA thereon. The sample SA is a phase object such as a cell. The stage 2 is provided with a stage driver 3. The stage driver 3 moves the stage 2 along the optical axis Ax1 of the transmitted illumination optical system 10.

Figure 2:
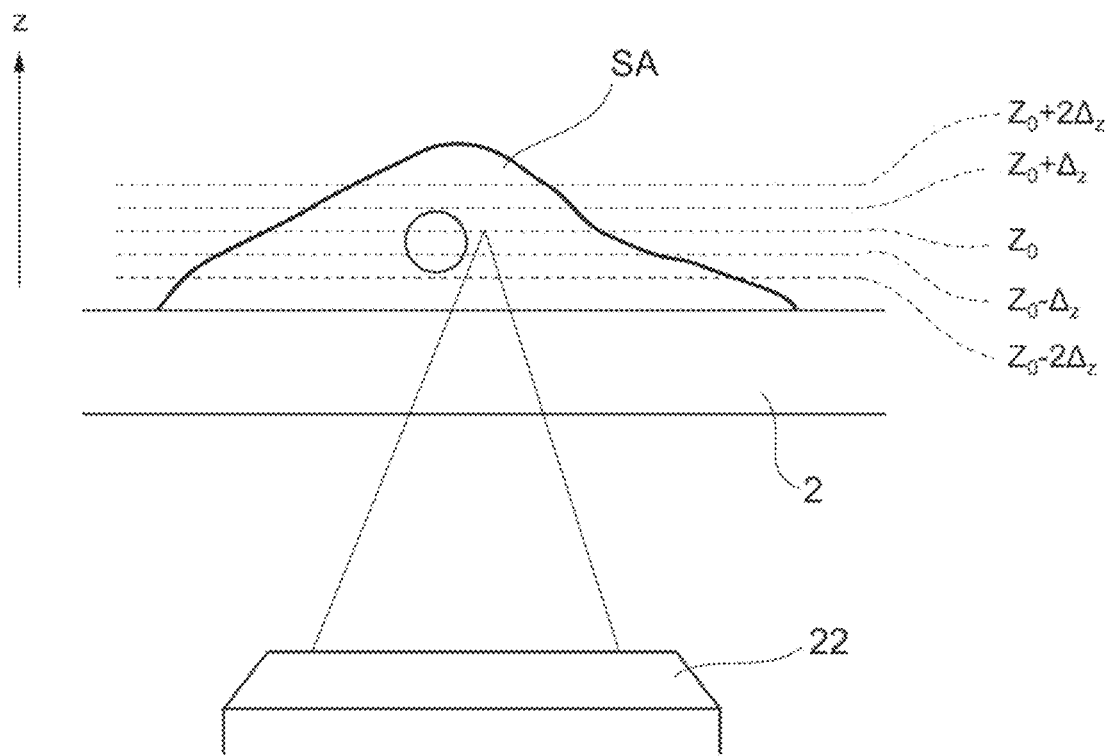
FIG. 2 is an enlarged view of a stage.

As shown in FIG. 2, a coordinate axis extending in the optical axis direction of the transmitted illumination optical system 10 is defined as a z-axis. The stage 2 is moved in a z-direction by the stage driver 3, whereby it is possible to obtain image data of cross sections of the sample SA at a predetermined position $Z_0$, a position $Z_0+\Delta z$ apart from the position $Z_0$ by $+\Delta z$, a position $Z_0-\Delta z$ apart from the position $Z_0$ by $-\Delta z$, a position $Z_0+2\Delta z$ apart from the position $Z_0$ by $+2\Delta z$, a position $Z_0-2\Delta z$ apart from the position $Z_0$ by $-2\Delta z$, etc.

The transmitted illumination light source 5 generates illumination light in a predetermined wavelength band. The transmitted illumination optical system 10 comprises a collector lens 12, a field stop 14, a relay lens 15, an illumination side modulation element 16, an aperture stop 17, and a condenser lens 18 in this order from the transmitted illumination light source 5 side. The transmitted illumination light source 5 includes, for example, a halogen lamp or the like. When a halogen lamp is used as the transmitted illumination light source 5, it is preferable to provide an element for narrowing the wavelength band of the illumination light. By narrowing the wavelength band of the illumination light, it is possible to enhance the accuracy of calculation values of POTF, etc., which will be described later in detail. The wavelength band of the illumination light can be narrowed, for example, by inserting a bandpass filter 13 having a predetermined spectral transmittance characteristic into an optical path between the collector lens 12 and the relay lens 15 in the transmitted illumination optical system 10. The spectral transmittance characteristic of the bandpass filter 13 is set based on the wavelength band of the illumination light according to the purpose of observation such as bright field observation and fluorescence observation.

The bandpass filter 13 may be inserted in an optical path between the field stop 14 and the relay lens 15 in the transmitted illumination optical system 10. Not limited to the bandpass filter 13 as described above, a filter cube (not shown) including a bandpass filter may be inserted into the optical path of the illumination optical system as in the case of a ninth embodiment described later.

The illumination side modulation element 16 and the aperture stop 17 are arranged on a surface perpendicular to the optical axis Ax1 of the transmitted illumination optical system 10 at a position P0 of a pupil (hereinafter, may be referred to as an illumination pupil) between the relay lens 15 and the condenser lens 18 in the transmitted illumination optical system 10. The illumination side modulation element 16 is arranged adjacent to the aperture stop 17 (as an example, above the aperture stop 17 as shown in FIG. 1). The surface perpendicular to the optical axis Ax1 of the transmitted illumination optical system 10 at the position P0 of the illumination pupil is referred to as the surface of the illumination pupil. As an example, the illumination side modulation element 16 is a flat plate having light transmissivity in which the transmittance of light changes within the surface of the flat plate. This flat plate is formed, for example, by vapor-depositing a film capable of reducing the light transmittance (having a light-shielding property) on a parallel flat plate such as a glass substrate. As an example, a metal film is vapor-deposited. For example, by changing the film thickness according to a site of the parallel flat plate on which the film is vapor-deposited, it is possible to change the light transmittance according to the site of the parallel flat plate (as the film thickness is larger, the light transmittance is lower). By arranging the illumination side modulation element 16 on the surface of the illumination pupil, it is possible to change the light transmittance within the surface of the illumination pupil. Therefore, it can be said that the light transmittance of the illumination side modulation element 16 changes within the surface of the illumination pupil. The light transmittance of the illumination side modulation element 16 changes continuously (or discretely) within the surface of the illumination pupil. It should be noted that the light transmittance of the illumination side modulation element 16 is changed according to the site of the illumination side modulation element 16, thereby finding the distribution of light transmittance of the illumination side modulation element 16 (in other words, the distribution of the light transmittance on the surface of the illumination pupil). Any one of a plurality of illumination side modulation elements 16 which are different in the change of light transmittance, that is, the distribution of light transmittance can be selected as the illumination side modulation element 16, and arranged at the position P0 of the illumination pupil. The details of the light transmittance of the illumination side modulation element 16 will be described later. The position where the illumination side modulation element 16 is arranged is not limited to the position P0 of the illumination pupil. For example, the illumination side modulation element 16 may be arranged on a surface perpendicular to the optical axis Ax1 at a position conjugate with the illumination pupil (in other words, a surface conjugate with the illumination pupil).

The condenser lens 18 is arranged above the stage 2 so as to face the stage 2. Any one of a plurality of condenser lenses 18 having different optical characteristics can be selected as the condenser lens 18 and arranged above the stage 2.

The epi-illumination light source 6 generates excitation light in a predetermined wavelength band. The epi-illumination optical system 20 comprises an objective lens unit 21 and a filter cube 31 in this order from the sample SA side. The objective lens unit 21 includes a plurality of objective lenses 22, a lens holder 25, and a unit driver 26. The objective lens 22 is arranged below the stage 2 so as to face the stage 2. The lens holder 25 holds a plurality of objective lenses 22 which are different in focal length. The lens holder 25 is configured by using, for example, a revolver, a turret, or the like. The unit driver 26 drives the lens holder 25 to be capable of selecting any one of the plurality of objective lenses 22 and arranging it below the stage 2. The unit driver 26 may move the lens holder 25 along the z-axis. In this case, the stage driver 3 may be used in combination, or the stage driver 3 may not be used.

When a bright field observation or the like is performed on the sample SA by using the transmitted illumination optical system 10, the filter cube 31 is retracted from the optical path of the detection optical system 40 including the epi-illumination optical system 20 as indicated by a solid line in FIG. 1. When a fluorescence observation is performed on the sample SA by using the epi-illumination light source 6, the filter cube 31 is inserted into the optical path of the detection optical system 40 including the epi-illumination optical system 20 as indicated by a two-dot chain line in FIG. 1. The filter cube 31 reflects excitation light emitted from the epi-illumination light source 6 toward the stage 2. The filter cube 31 transmits fluorescence generated in the sample SA on the stage 2 to a first imaging lens 41 of the detection optical system 40. The filter cube 31 includes an excitation filter 32 for transmitting the excitation light from the epi-illumination light source 6 therethrough. The filter cube 31 includes an absorption filter 33 for absorbing the excitation light reflected from the sample SA, the stage 2, and the like.

The detection optical system 40 includes the objective lens unit 21 and the filter cube 31. The detection optical system 40 comprises a first imaging lens 41, a first mirror 43, a lens 44, a second mirror 45, a collimator lens 46, and a half mirror 47 in this order from the epi-illumination optical system 20 side. The detection optical system 40 further comprises a third imaging lens 50 and a detection side modulation element 53. Further, a second imaging lens 48, a third mirror 49, and an eyepiece 55 are arranged on the optical path of light transmitted through the half mirror 47.

The ratio of the transmittance and reflectance of the half mirror 47 is set to, for example, 1:1. A part of light incident on the half mirror 47 is reflected by the half mirror 47 and incident on the third imaging lens 50. The light transmitted through the third imaging lens 50 forms an image on a predetermined first image surface IA. Here, the position of the predetermined first image surface IA is a position conjugate with the focal position of the objective lens 22. The detector 60 is arranged on the first image surface IA of the detection optical system 40. The other part of the light incident on the half mirror 47 passes through the half mirror 47, and is incident on the second imaging lens 48. Light transmitted through the second imaging lens 48 is reflected by the third mirror 49, and forms an image on a predetermined second image surface IB. Here, the position of the predetermined second image surface IB is a position conjugate with the focal position of the objective lens 22. An observer can observe an image of the sample SA formed on the second image surface IB by using the eyepiece 55. An imaging element such as CCD or CMOS is used for the detector 60.

The detection side modulation element 53 is arranged on a surface perpendicular to the optical axis Ax2 of the detection optical system 40 at a position P2 conjugate with the pupil of the objective lens 22 in the detection optical system 40 (hereinafter, may be referred to as a detection pupil). The surface perpendicular to the optical axis Ax2 of the detection optical system 40 at the position P2 conjugate with the detection pupil is referred to as a surface conjugate with the detection pupil. As an example, the detection side modulation element 53 is formed by vapor-depositing a film capable of reducing the light transmittance on a parallel flat plate such as a glass substrate, similarly to the illumination side modulation element 16. By arranging the detection side modulation element 53 on the surface conjugate with the detection pupil, the light transmittance can be changed within the surface conjugate with the detection pupil. Therefore, it can be said that the light transmittance of the detection side modulation element 53 changes within the surface conjugate with the detection pupil. The light transmittance of the detection side modulation element 53 changes continuously (or discretely) within the surface conjugate with the detection pupil. Any one of a plurality of detection side modulation elements 53 having different light transmittance distributions can be selected as the detection side modulation element 53, and arranged at the position P2 conjugate with the detection pupil. The details of the light transmittance of the detection side modulation element 53 will be described later. The position where the detection side modulation element 53 is arranged is not limited to the position P2 conjugate with the detection pupil. For example, the detection side modulation element 53 may be arranged on the surface perpendicular to the optical axis Ax2 at the position of the detection pupil (in other words, the surface of the detection pupil). In this case, for example, the detection side modulation element 53 may be built in the objective lens 22.

In the present embodiment, when the bright field observation or the like is performed on the sample SA by using the transmitted illumination optical system 10, the filter cube 31 is retracted from the optical path of the detection optical system 40 (the epi-illumination optical system 20) as indicated by the solid line in FIG. 1. Illumination light emitted from the transmitted illumination light source 5 is incident on the collector lens 12 (through the bandpass filter 13 when a halogen lamp is used as the transmitted illumination light source 5). The illumination light transmitted through the collector lens 12 passes as parallel light through the field stop 14, and is incident on the relay lens 15. The illumination light transmitted through the relay lens 15 passes through the illumination side modulation element 16 and the aperture stop 17, and is incident on the condenser lens 18. The illumination light transmitted through the condenser lens 18 is incident as parallel light on the sample SA on the stage 2. As a result, the transmitted illumination optical system 10 illuminates the sample SA on the stage 2 with the illumination light from the transmitted illumination light source 5.

Light transmitted or diffracted through the sample SA (hereinafter, may be referred to as detection light) is incident on the objective lens 22 as the detection optical system 40. The detection light transmitted through the objective lens 22 is incident on the first imaging lens 41. The detection light transmitted through the first imaging lens 41 is reflected by the first mirror 43 to form an image on a predetermined intermediate image surface IM, and then incident on the lens 44. The detection light transmitted through the lens 44 is reflected by the second mirror 45, and incident on a collimator lens 46. The detection light transmitted through the collimator lens 46 passes as parallel light through the detection side modulation element 53, and is incident on the half mirror 47. A part of the detection light incident on the half mirror 47 is reflected by the half mirror 47 and incident on the third imaging lens 50. The detection light transmitted through the third imaging lens 50 forms an image on a predetermined first image surface IA on which the detector 60 is arranged. The other part of the detection light incident on the half mirror 47 passes through the half mirror 47 and is incident on the second imaging lens 48. The detection light transmitted through the second imaging lens 48 is reflected by the third mirror 49 and forms an image on the predetermined second image surface IB.

When the fluorescence observation is performed on the sample SA by using the epi-illumination light source 6, the filter cube 31 is inserted into the optical path of the detection optical system 40 (epi-illumination optical system 20) as indicated by the two-dot chain line in FIG. 1. Excitation light emitted from the epi-illumination light source 6 passes through the excitation filter 32 of the epi-illumination optical system 20 and is incident on the filter cube 31. The excitation light incident on the filter cube 31 is reflected by the filter cube 31 and incident on the objective lens 22. The excitation light transmitted through the objective lens 22 is incident on the sample SA on the stage 2. As a result, the epi-illumination optical system 20 illuminates the sample SA on the stage 2 with the excitation light from the epi-illumination light source 6.

The irradiation of the excitation light excites a fluorescent substance contained in the sample SA to emit fluorescence. The fluorescence from the sample SA is incident on the objective lens 22 as the detection optical system 40. The fluorescence transmitted through the objective lens 22 is incident on the filter cube 31. The fluorescence incident on the filter cube 31 passes through the filter cube 31, passes through the absorption filter 33, and is incident on the first imaging lens 41. The fluorescence transmitted through the first imaging lens 41 is reflected by the first mirror 43 to form an image on a predetermined intermediate image surface IM, and is incident on the lens 44. The fluorescence transmitted through the lens 44 is reflected by the second mirror 45 and is incident on the collimator lens 46. The fluorescence transmitted through the collimator lens 46 passes as parallel light through the detection side modulation element 53, and is incident on the half mirror 47.

A part of the fluorescence incident on the half mirror 47 is reflected by the half mirror 47, and incident on the third imaging lens 50. The fluorescence transmitted through the third imaging lens 50 forms an image on the predetermined first image surface IA on which the detector 60 is arranged. The other part of the fluorescence incident on the half mirror 47 passes through the half mirror 47 and is incident on the second imaging lens 48. The detection light transmitted through the second imaging lens 48 is reflected by the third mirror 49, and forms an image on the predetermined second image surface IB.

In the case of the bright field observation, the detector 60 illuminates the sample SA by using the transmitted illumination optical system 10, detects light from the sample SA (in other words, detection light transmitted or diffracted through the sample SA) via the detection optical system 40, and outputs a detection signal of the light. In other words, it can be said that the detector 60 captures an image of the sample SA via the detection optical system 40. Here, the detection signal is a signal indicating the signal strength detected by the detector 60 according to the intensity of the light (detection light). Specifically, when the detector 60 is CCD, the signal is a signal in each pixel of the CCD. The detection signal can be rephrased as a signal indicating the signal strength detected by the detector 60 according to the intensity of the image of the sample SA. The detection signal of the light (detection light) output from the detector 60 is transmitted to the image processor 66 via the control part 65.

In the case of the fluorescence observation, the detector 60 detects the fluorescence from the sample SA via the detection optical system 40, and outputs a detection signal of the fluorescence. The detection signal of the fluorescence output from the detector 60 is transmitted to the image processor 66 via the control part 65. The control part 65 controls the entire microscope device 1. The control part 65 is electrically connected to the stage driver 3, the unit driver 26, the detector 60, the image processor 66, the operation input part 67, the image display part 70, and the like.

The image processor 66 illuminates the sample SA by using the transmitted illumination optical system 10, and detects light from the sample SA through the detection optical system 40 (in other words, performs a bright field observation) to generate refractive index data relating to the sample SA based on a detection signal of the light (detection light) output from the detector 60. Here, the refractive index data relating to the sample SA is data representing the refractive index of the sample SA, for example, data of the refractive index at each position in the sample SA, that is, data indicating a refractive index distribution in the sample SA. Further, the refractive index data relating to the sample SA is stored in a storage unit (not shown), for example, as a look-up table. Further, the image processor 66 generates image data in which the brightness value of each pixel is set according to the value of the refractive index at each position of the refractive index distribution in the sample SA (hereinafter may be referred to as image data of the refractive index distribution of the sample SA). Further, based on the detection signal of the detection light output from the detector 60, the image processor 66 generates image data in which the brightness value of each pixel is set according to the value of the signal strength of the detection signal at each position (each pixel of the detector 60) in the sample SA (hereinafter, may be referred to as image data of the sample SA by bright field observation). Further, based on a fluorescence detection signal output from the detector 60, the image processor 66 generates image data in which the brightness value of each pixel is set according to the value of the signal strength of the detection signal at each position (each pixel of the detector 60) in the sample SA (hereinafter, may be referred to as image data of sample SA by fluorescence observation).

The image display part 70 displays an image of the refractive index distribution in the sample SA based on the image data of the refractive index distribution of the sample SA generated by the image processor 66. Further, the image display part 70 displays the image of the sample SA by bright field observation based on the image data of the sample SA by bright field observation generated by the image processor 66. Further, the image display part 70 displays an image of the sample SA by fluorescence observation based on the image data of the sample SA by fluorescence observation generated by the image processor 66.

Next, a method of finding a three-dimensional refractive index distribution in the sample SA as the refractive index data relating to the sample SA will be described by the image processor 66. A typical example of finding a three-dimensional refractive index distribution in a sample SA includes a method using a theory called PC-ODT (Partially Coherent-Optical Diffraction Tomography). Hereinafter, the theory of PC-ODT will be described. From the equation of partial coherent imaging, the intensity I(x, y, z) of the image of a three-dimensional object can be expressed by the following expression (1).

[Expression 1]

$$I(x, y, z) = \tag{1}$$
$$C\left[\int\int\int\int\int\int d\xi_1 d\eta_1 d\zeta_1 d\xi_2 d\eta_2 d\zeta_2 [\tilde{o}(\xi_1, \eta_1, \zeta_1)\tilde{o}^*(\xi_2, \eta_2, \zeta_2)\right.$$
$$\left. TCC(\xi_1, \eta_1, \zeta_1, \xi_2, \eta_2, \zeta_2)\exp[ik[(\xi_1 - \xi_2)x + (\eta_1 - \eta_2)y + (\zeta_1 - \zeta_2)z]]]\right]$$

In expression (1), o represents the complex amplitude transmittance of the object. TCC represents the transmission cross coefficient. (4, 71, ( ) represents the direction cosine of diffracted light (or direct light). Further, an image in this case is an image of the sample SA obtained by forming an image of light (detection light) transmitted through at least a part of the sample SA under illumination. Therefore, the intensity I(x, y, z) of the image of the three-dimensional object, that is, the image of the three-dimensional sample SA can be replaced with the signal strength of the detection signal output from the detector 60 in the image processing (that is, the signal strength in each pixel of the detector 60 when the sample SA is imaged by the detector 60). More specifically, an image of an xy cross section at each position in the z-direction of the sample SA (that is, each position in the optical axis direction) is captured by the detector 60, and the signal strength of the output detection signal is used as the intensity I(x, y, z) of the image of the sample SA. As shown in FIG. 1, a coordinate axis extending in the optical axis direction of the transmitted illumination optical system 10 is defined as a z-axis, and coordinate axes perpendicular to the z-axis are defined as an x-axis and a y-axis. The transmission cross coefficient TCC can be expressed by the following expression (2).

Note that it is not necessary to capture an image of an xy cross section at each position in the z-direction of the sample SA by the detector 60, and based on a detection signal corresponding to an image of an xy cross section at an arbitrary position in the z-direction detected by the detector 60, an image of an xy cross section at other position in the z-direction may be obtained by using machine learning. In this case, a trained model is generated in advance by using images at respective positions in the z-direction of the sample as teacher data, and the image processor 66 inputs, to the trained model, a detection signal corresponding to an image of an xy cross section at any position in the z-direction of the sample SA obtained by the detector 60, whereby the image processor 66 may obtain a detection signal corresponding to an image of an xy cross section at other position in the z-direction of the sample SA. Since the detection signal corresponding to the image of the sample SA obtained by using machine learning as described above is also information estimating the light from the sample SA, it can be rephrased as the detection signal of the light from the sample SA.

[Expression 2]

$$TCC(\xi_1, \eta_1, \zeta_1, \xi_2, \eta_2, \zeta_2) = \tag{2}$$
$$\int\int\int d\xi_s d\eta_s d\zeta_s S(\xi_s, \eta_s, \zeta_s) G(\xi_1 + \xi_s, \eta_1 + \eta_s, \zeta_1 + \zeta_s)$$
$$G'(\xi_2 + \xi_s, \eta_2 + \eta_s, \zeta_2 + \zeta_s)$$

In expression (2), S represents an illumination pupil. G represents a detection pupil. Since the transmission cross coefficient TCC is an Hermitian conjugate, it has a property shown in the following expression (3).

[Expression 3]

$$TCC(\xi_1, \eta_1, \zeta_1, \xi_2, \eta_2, \zeta_2) = TCC'(\xi_2, \eta_2, \zeta_2, \xi_1, \eta_2, \zeta_1) \quad (3)$$

In the case of a thin sample such as a cell, the influence of scattering is small, so that the first-order Born approximation (low contrast approximation) is established. At this time, it is only necessary to consider the interference between the direct light transmitted through the sample (0th-order diffracted light) and the diffracted light diffracted by the sample (1st-order diffracted light). Therefore, the following expression (4) can be obtained from the above expressions (1) to (3) by the first-order Born approximation.

[Expression 4]

$$I(x, y, z) = \qquad (4)$$
$$2C\mathrm{Re}\left[\int\int\int d\xi d\eta d\zeta [\tilde{o}(\xi,\eta,\zeta)\tilde{o}^*(0,0,0)TCC(\xi,\eta,\zeta,0,0,0)\right.$$
$$\left.\exp[ik(\xi x+\eta y+\zeta z)]]\right]$$

Further, the complex amplitude transmittance o of the object can be approximated as indicated by the following expression (5).

[Expression 5]

$$o(x, y, z) = [1 + P(x, y, z)]\exp[i\Phi(x, y, z)] \simeq 1 + i\Phi(x, y, z) + P(x, y, z) \quad (5)$$

In expression (5), P represents the real part of the scattering potential. Φ represents the imaginary part of the scattering potential. The above expression (4) is expressed as the following expression (6) by using the expression (5).

[Expression 6]

$$I(x, y, z) = \qquad (6)$$
$$2C\mathrm{Re}\left[\int\int\int d\xi d\eta d\zeta [[\tilde{\delta}(\xi,\eta,\zeta)+i\tilde{\Phi}(\xi,\eta,\zeta)+\tilde{P}(\xi,\eta,\zeta)]\right.$$
$$\left.TCC(\xi,\eta,\zeta,0,0,0)\exp[ik(\xi x+\eta y+\zeta z)]]\right]$$

Here, TCC is changed to WOTF (Weak Object Transfer Function). WOTF is defined by the following expression (7).

[Expression 7]

$$TCC(\xi, \eta, \zeta, 0, 0, 0) = WOTF(\xi, \eta, \zeta) \qquad (7)$$
$$= \int\int\int d\xi_z d\eta_z d\zeta_z$$
$$G(\xi+\xi_z, \eta+\eta_z, \zeta+\zeta_z)$$
$$S(\xi_z, \eta_z, \zeta_z)G^*(\xi_z, \eta_z, \zeta_z)$$

From the above expressions (6) and (7), the intensity I (x, y, z) of an image of a three-dimensional object obtained by a transmitted illumination microscope is expressed as the following expression (8).

[Expression 8]

$$I(x, y, z) = 2C\mathrm{Re}\left[\int\int\int d\xi d\eta d\zeta [[\tilde{\delta}(\xi,\eta,\zeta)+i\tilde{\Phi}(\xi,\eta,\zeta)+\tilde{P}(\xi,\eta,\zeta)]\right. \quad (8)$$
$$\left. WOTF(\xi,\eta,\zeta)\exp[ik(\xi x+\eta y+\zeta z)]]\right]$$

Here, it is assumed that the change in the amplitude of the sample is small and negligible. In other words, P=0 is assumed. In this case, when the above expression (8) is expressed in real space, the following expression (9) is obtained.

[Expression 9]

$$I(x, y, z) = 2C\left[\int\int\int dxdydz\mathrm{Re}[EPSF(x, y, z)] - \right. \quad (9)$$
$$\left.\Phi(x, y, z)\otimes\mathrm{Im}[EPSF(x, y, z)]\right]$$

In expression (9), EPSF represents an effective point spread function. EPSF is equivalent to a function obtained by performing the inverse Fourier transform on WOTF. EPSF is generally a complex function. The first term of the expression (9) represents a background intensity. The second term of the expression (9) indicates that the imaginary part Im[EPSF] of EPSF is applied to the imaginary part Φ of the scattering potential of the sample. By using this expression (9), it is possible to find the imaginary part Φ of the scattering potential of the sample.

<First Method for Finding Φ(x, y, z)>

Figure 3:
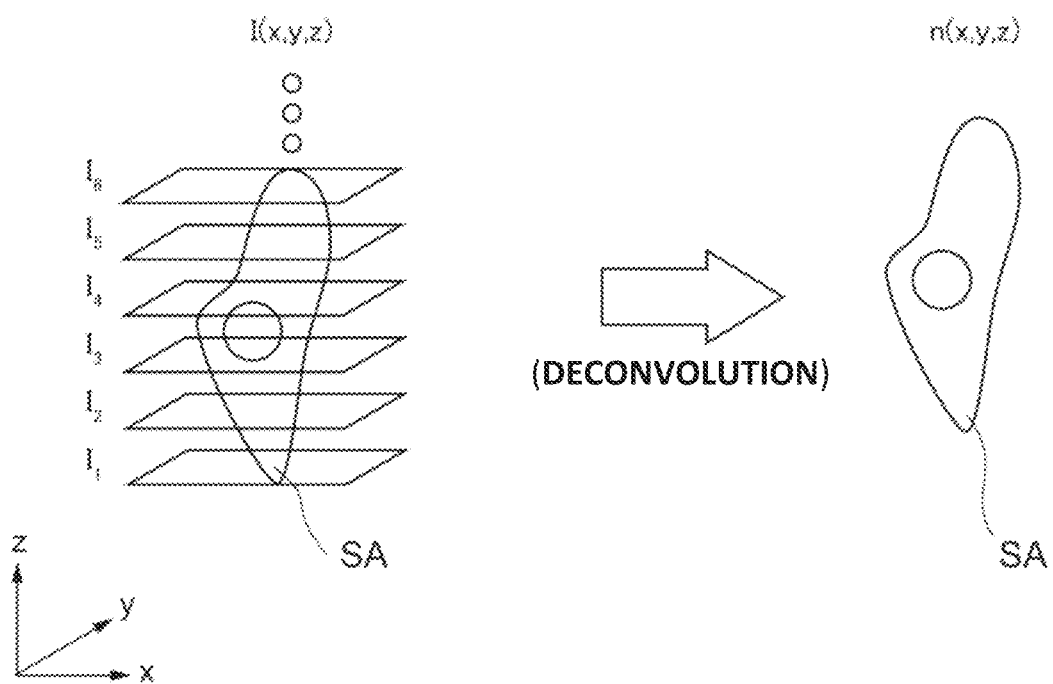
FIG. 3 is a schematic diagram showing a first method for performing deconvolution based on image data of a plurality of cross sections of a sample.

A first method for finding Φ(x, y, z) includes a method of directly performing deconvolution using Im[EPSF]. FIG. 3 schematically shows a process in which the intensities of images of a plurality of cross sections (xy cross sections) at different positions in the z direction (that is, different positions in the optical axis) of the sample SA are obtained by moving the stage 2 in the z-direction (that is, the optical axis direction) and deconvolution is performed. Images of a plurality of cross sections at different positions in the z-direction (that is, different positions in the optical axis direction) of the sample SA may be collectively referred to as a z-stack image of the sample SA. The first term of the expression (9) is a constant term representing the background intensity. First, both sides of the expression (9) are divided by this constant term to normalize the expression (9), and then the first term of the normalized expression (9) is removed in real space (or frequency space). Then, deconvolution is performed by using Im[EPSF] to obtain the following expression (10).

[Expression 10]

$$\Phi(x, y, z) = -\mathcal{F}^{-1}\left[\tilde{I}'(\xi, \eta, \zeta)\frac{POTF(\xi, \eta, \zeta)^*}{|POTF(\xi, \eta, \zeta)|^2+\gamma}\right] \quad (10)$$

In expression (10), a function obtained by performing the three-dimensional Fourier transform on Im[EPSF] is referred to as POTF (Phase Optical Transfer Function). Since Im[EPSF] can take values from positive values to negative values, POTF can also take values from positive values to negative values. Here, POTF serves as an index indicating the contrast and resolution of an image (picture)

of the sample SA by bright field observation. Specifically, the absolute value of POTF represents the contrast of the image, and as the absolute value of POTF is higher, the contrast of the image (picture) of the sample SA by bright-field observation is higher. Further, as a region where the value of POTF is not equal to 0 in the frequency space is wider, the resolution of the image (picture) of the sample SA by bright-field observation is higher. Further, the intensities I (for example, $I_1$ to $I_6$ in FIG. 3) of images of respective cross sections of the sample SA in the z-stack image of the sample SA are normalized by the constant term of the expression (9), and the normalized result is represented by I'. It is assumed that γ takes any small value.

<Second Method for Finding Φ(x, y, z)>

Figure 4:
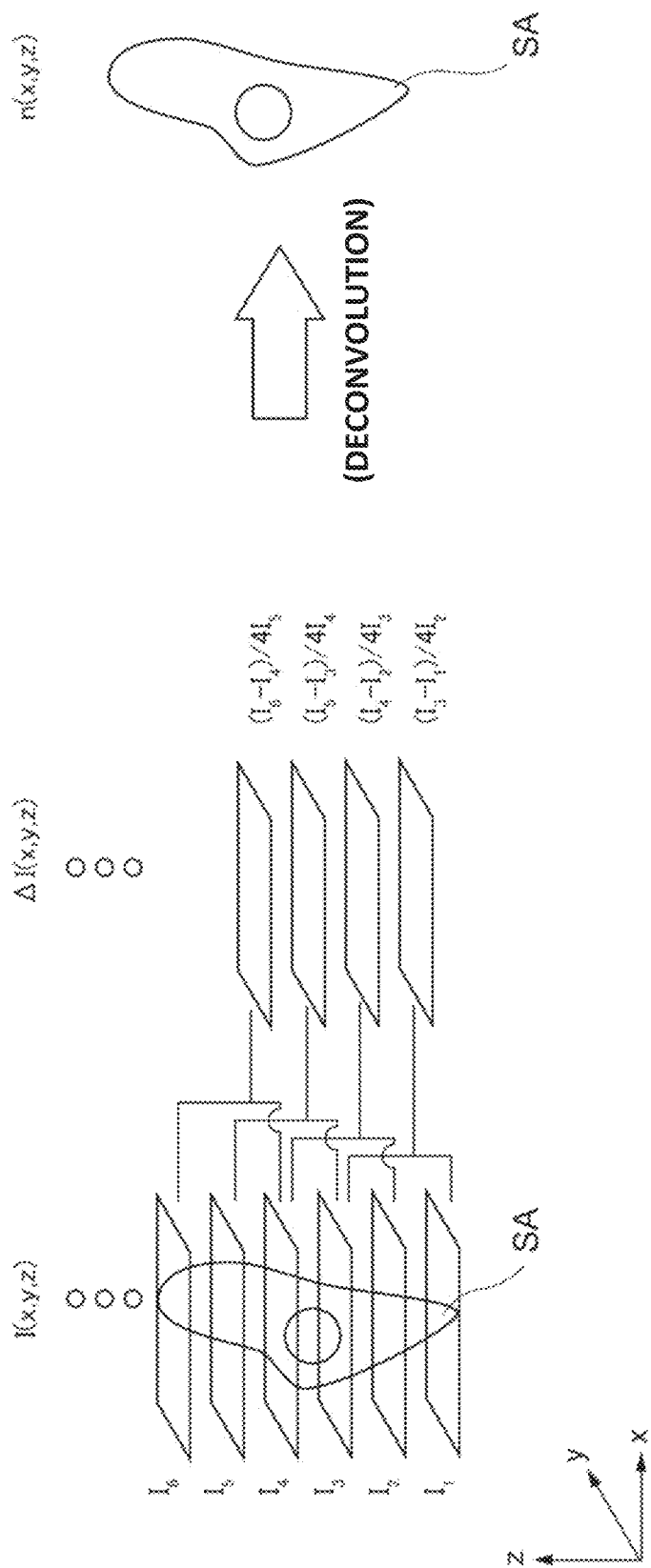
FIG. 4 is a schematic diagram showing a second method for performing deconvolution based on image data of a plurality of cross sections of a sample.

A second method for finding Φ(x, y, z) includes a method for finding the difference between intensities of images of two cross sections at different positions in the z-direction (that is, different positions in the optical axis direction) of the sample SA to remove the constant term of the expression (9), and then performing deconvolution by using Im[EPSF] of the obtained difference in intensity. FIG. 4 schematically shows a process of obtaining the intensities of images of two cross sections at different positions in the z-direction (that is, different positions in the optical axis direction) of the sample SA (signal intensities of the detection signal of the detector 60) to find out the difference between the intensities of the images of the two cross sections, and performing deconvolution.

First, formation of an image when z is shifted by ±Δz is considered. In this case, the following expression (11) can be obtained from the expression (8).

[Expression 11]

$$I(x, y, z \pm \Delta z) = \\ 2C\mathrm{Re}\left[\iiint d\xi d\eta d\zeta \big[[\delta(\xi, \eta, \zeta) + i\Phi(\xi, \eta, \zeta)]WOTF(\xi, \eta, \zeta) \\ \exp(\pm ik\zeta\Delta z)\exp[ik(\xi x + \eta y + \zeta z)]\big]\right] \quad (11)$$

Next, for the expression (11), the difference between I(x, y, z+Δz) and I(x, y, z−Δz) is found. As a result, the first terms of the expression (11) cancel each other out, and the following expression (12) is obtained.

[Expression 12]

$$I(x, y, z + \Delta z) - I(x, y, z - \Delta z) = \\ 2C\mathrm{Re}\left[\iiint d\xi d\eta d\zeta [i\Phi(\xi, \eta, \zeta)WOTF(\xi, \eta, \zeta) \\ 2i\sin(k\zeta\Delta z)\exp[ik(\xi x + \eta y + \zeta z)]]\right] \quad (12)$$

Here, it is assumed that WOTF'(ξ, η, ζ)=WOTF(ξ, η, ζ)2i sin kζΔz. As a result, the expression (12) can be expressed as the following expression (13).

[Expression 13]

$$I(x, y, z + \Delta z) - I(x, y, z - \Delta z) = \\ 2C\mathrm{Re}\left[\iiint d\xi d\eta d\zeta i\Phi(\xi, \eta, \zeta)WOTF'(\xi, \eta, \zeta) \\ \exp[ik(\xi x + \eta y + \zeta z)]\right] \quad (13)$$

If the right side of the expression (13) is expressed in real space, the following expression (14) is provided.

[Expression 14]

$$I(x, y, z + \Delta z) - I(x, y, z - \Delta z) = -2C\Phi(x, y, z) \otimes \mathrm{Im}[ESPF'(x, y, z)] \quad (14)$$

After both sides are divided by a constant term, deconvolution is performed by using ImEPSF' to obtain the following expression (15).

[Expression 15]

$$\Phi(x, y, z) = -\mathcal{F}^{-1}\left[(I'_{+\Delta z} - I'_{-\Delta z})\frac{POTF'(\xi, \eta, \zeta)^*}{|POTF'(\xi, \eta, \zeta)|^2 + \gamma}\right] \quad (15)$$

In expression (15), a function obtained by performing the three-dimensional Fourier transform on ImEPSF' is represented by POTF'. The intensities I (I(x, y, z+Δz) and I(x, y, z−Δz)) of images of two cross sections at different positions in the z-direction (that is, different positions in the optical axis direction) of the sample SA are normalized by the constant term of the expression (14), and the normalized result is represented by I'. It is assumed that γ takes any small value. The above-mentioned two methods are valid for any pupil shape.

The scattering potential Φ is defined by the following expression (16) for P=0.

[Expression 16]

$$\Phi(x, y, z) = k_0^2\{n(x, y, z)^2 - n_m^2\} \quad (16)$$

In expression (16), n(x, y, z) represents a three-dimensional refractive index distribution in the sample SA, $k_0$ represents the wavenumber in vacuum, and $n_m$ represents the refractive index of a medium. By using the expression (16), it is possible to convert the scattering potential Φ obtained by the above-mentioned first method or the second method into a three-dimensional refractive index distribution. The image processor 66 uses the above-mentioned expression (10) or expression (15) and the expression (16) to find the three-dimensional refractive index n(x, y, z) in the sample SA from the signal strength of the detection signal output from the detector 60, that is, the intensity I(x, y, z) of the image of the three-dimensional sample SA. As an example, the image processor 66 generates image data in which the brightness value of each pixel is set according to the value of the refractive index at each position (coordinate) of the obtained three-dimensional refractive index distribution in the sample SA, that is, image data of the three-dimensional refractive index distribution of the sample SA. Note that the intensity of the three-dimensional image of the sample SA can be expressed as the intensity of the image of each cross section of the sample SA in the z-stack image of the sample SA. In other words, the intensity of the image of the three-dimensional sample SA can also be said to be the intensities of a plurality of images at different positions in the z-direction (that is, different positions in the optical axis direction) in the sample SA.

In the first embodiment, when the aperture shape at the position of the pupil is circular as in the prior art, if the contrast of the image (picture) of the sample SA by bright field observation lowers as a result of increasing the illumination σ (making the illumination σ close to 1) in order to improve the resolution, the obtainable dynamic range of the refractive index at each position of the sample SA narrows. In other words, the contrast of the image of the refractive index distribution in the sample SA lowers. On the contrary, if the resolution of the image (picture) of the sample SA by bright field observation lowers as a result of reducing the illumination σ in order to improve the contrast, it is not possible to find a fine change in the refractive index at each position of the sample SA. In other words, the resolution (resolving power) of the image of the refractive index distribution in the sample SA lowers. Therefore, it is difficult to find a fine change in the refractive index with a wide dynamic range of the refractive index. In other words, it is difficult to obtain an image of the refractive index distribution in the sample SA, which has both high contrast and high resolution (resolving power). The illumination σ is the ratio between the numerical aperture of the transmitted illumination optical system 10 and the numerical aperture of the detection optical system 40.

In the present embodiment, the illumination side modulation element 16 whose light transmittance changes within the surface of the illumination pupil is provided at the position P0 of the illumination pupil in the transmitted illumination optical system 10. Further, the detection side modulation element 53 whose light transmittance changes within a surface conjugate with the detection pupil is provided at a position P2 conjugate with the detection pupil in the detection optical system 40. As a result, according to the present embodiment, even in a state where the illumination σ is large and the resolution of the image (picture) of the sample SA by bright field observation is high, the contrast is maintained in a high state, so that it is possible to obtain a three-dimensional refractive index distribution that has a wide dynamic range of the refractive index and shows fine changes in the refractive index in the sample SA. In other words, it is possible to obtain an image of the refractive index distribution in the sample SA, which has both high contrast and high resolution (resolving power).

Figure 5:
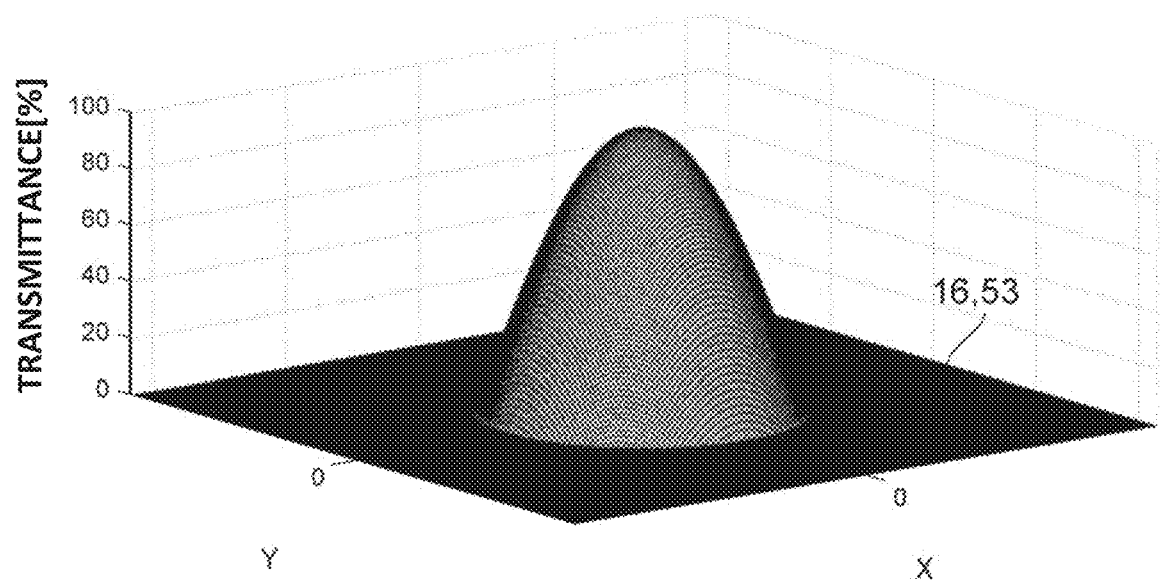
FIG. 5 is a graph showing a case where the light transmittance of a modulation element changes according to a cosine function.
Figure 6:
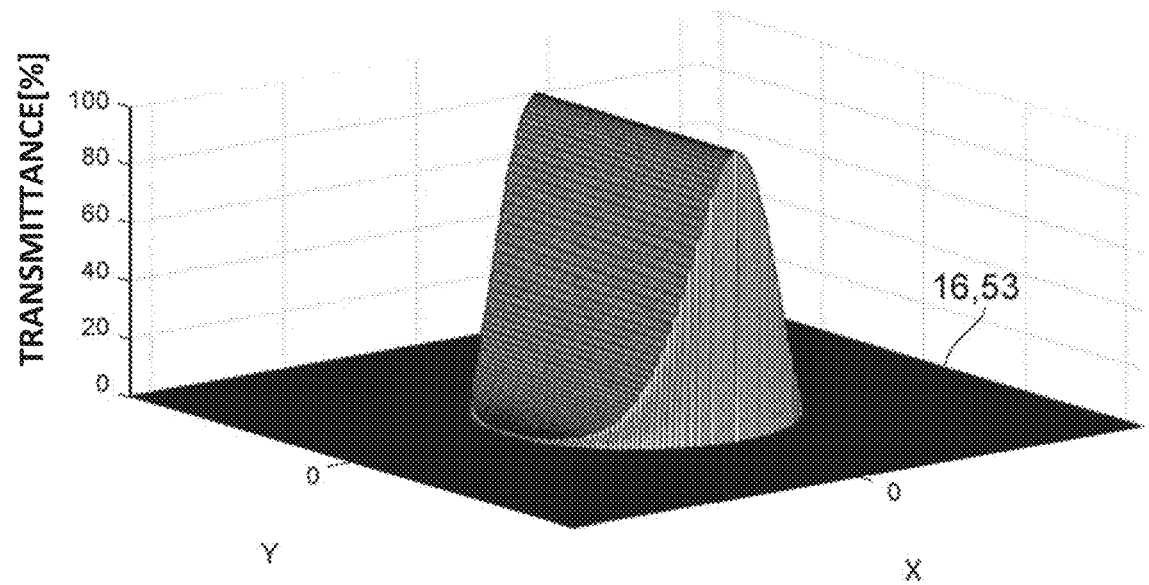
FIG. 6 is a graph showing a case where the light transmittance of the modulation element changes according to a Gaussian function.
Figure 7:
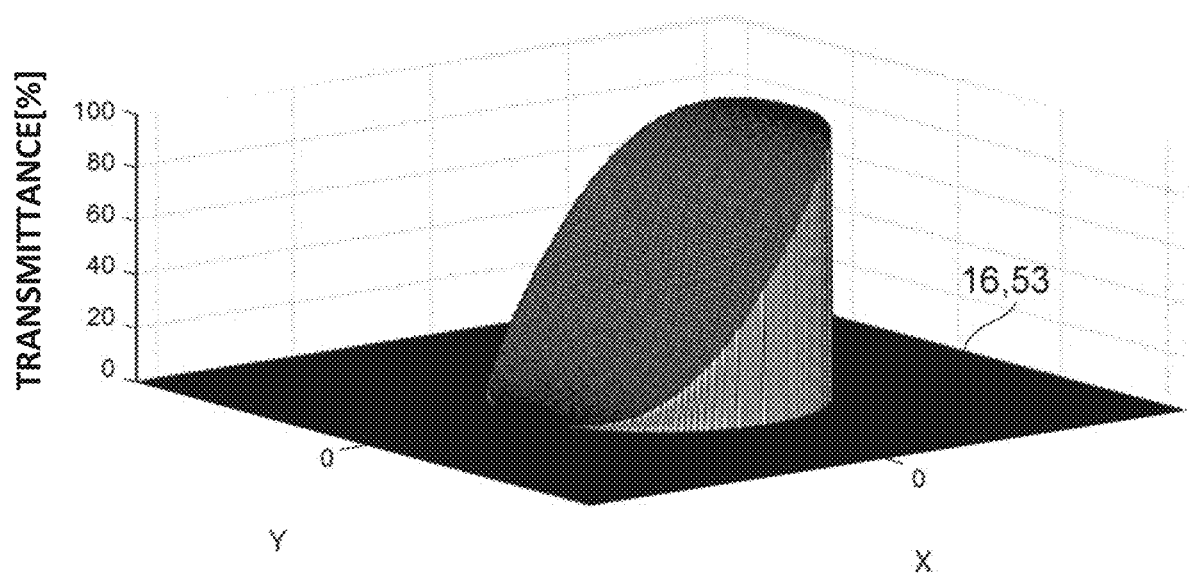
FIG. 7 is a graph showing a case where the light transmittance of the modulation element changes according to a sine function.

Examples of the change in the light transmittance within the surface of the pupil (in other words, the distribution of the light transmittance within the surface of the pupil) of the illumination side modulation element 16 and the detection side modulation element 53 will be described. FIGS. 5 to 7 are graphs showing examples of the distributions of light transmittance of the illumination side modulation element 16 and the detection side modulation element 53. In FIGS. 5 to 7, X represents coordinates in the x direction whose origin is set to a coordinate position through which the optical axis (the optical axis Ax1 of the transmitted illumination optical system 10 or the optical axis Ax2 of the detection optical system 40) passes, and Y represents coordinates in the y direction whose origin is set to the coordinate position through which the optical axis passes. In the example shown in FIG. 5, the light transmittance of the illumination side modulation element 16 or the detection side modulation element 53 changes according to a continuous function. Specifically, the light transmittance of the illumination side modulation element 16 or the detection side modulation element 53 is maximum at the origins of X and Y, and decreases according to a cosine function from the origins of X and Y on any straight line passing through the origins of X and Y (a portion having the same light transmittance is distributed concentrically around the origins of X and Y as a center). In other words, the light transmittance of the illumination side modulation element 16 or the detection side modulation element 53 changes according to a cosine function. Note that the light transmittance of the illumination side modulation element 16 or the detection side modulation element 53 can be said to change according to a continuous function (for example, a cosine function) from the origins of X and Y or decrease as the distance from the origins of X and Y increases within the surface of the pupil (within the surface of the illumination pupil or within the surface conjugate with the detection pupil).

The light transmittance of the illumination side modulation element 16 or the detection side modulation element 53 may be minimum at the origins of X and Y, and increase according to a cosine function from the origins of X and Y on any straight line passing through the origins of X and Y. Further, on any straight line passing through a point different from the origins of X and Y, the light transmittance of the illumination side modulation element 16 or the detection side modulation element 53 may change according to a cosine function from the point different from the origins of X and Y (a portion having the same light transmittance may be distributed concentrically around the point different from the origins of X and Y as a center).

In the example shown in FIG. 5, the light transmittance of the illumination side modulation element 16 or the detection side modulation element 53 may be maximum at the origins of X and Y, and decrease according to a Gaussian function from the origins of X and Y on any straight line passing through the origins of X and Y. Further, the light transmittance of the illumination side modulation element 16 or the detection side modulation element 53 may be maximum at the origins of X and Y and decrease according to a quadratic function from the origins of X and Y on any straight line passing through the origins of X and Y. In other words, the light transmittance of the illumination side modulation element 16 or the detection side modulation element 53 may change according to a Gaussian function or a quadratic function without limiting to the cosine function.

In the example shown in FIG. 6, the light transmittance of the illumination side modulation element 16 or the detection side modulation element 53 changes according to a continuous function. Specifically, the light transmittance of the illumination side modulation element 16 or the detection side modulation element 53 is maximum at coordinate positions of X=0, and decreases according to a Gaussian function from the coordinate positions of X=0 in the X direction (a portion having the same light transmittance is linearly distributed so as to extend in the Y direction). In other words, the light transmittance of the illumination side modulation element 16 or the detection side modulation element 53 changes according to a Gaussian function. Note that the light transmittance of the illumination side modulation element 16 or the detection side modulation element 53 can also be said to increase once and then decrease according to a continuous function (for example, a Gaussian function) in the X direction (one direction) within the surface of the pupil.

The light transmittance of the illumination side modulation element 16 or the detection side modulation element 53 may be maximum at coordinate positions of Y=0 and decrease according to a Gaussian function from the coordinate positions of Y=0 in the Y direction (a portion having the same light transmittance may be linearly distributed so as to extend in the X direction). Further, the light transmittance of the illumination side modulation element 16 or the detection side modulation element 53 may increase once and then decrease according to a Gaussian function in any direction in the XY coordinate system without limiting to the X direction or the Y direction (a portion having the same light transmittance may be linearly distributed so as to extend in a direction perpendicular to any direction in the XY coordinate system).

The light transmittance of the illumination side modulation element 16 or the detection side modulation element 53 may be minimum at the coordinate positions of X=0 and increase according to a Gaussian function from the coordinate positions of X=0 in the X direction (a portion having the same light transmittance may be linearly distributed so as to extend in the Y direction). Further, the light transmittance of the illumination side modulation element 16 or the detection side modulation element 53 may be minimum at the coordinate positions of Y=0 and increase according to a Gaussian function from the coordinate positions of Y=0 in the Y direction (a portion having the same light transmittance may be linearly distributed so as to extend in the X direction). Further, the light transmittance of the illumination side modulation element 16 or the detection side modulation element 53 may decrease once and then increase according to a Gauss function in any direction in the XY coordinate system without limiting to the X direction or the Y direction (a portion having the same light transmittance may be linearly distributed so as to extend in a direction perpendicular to any direction in the XY coordinate system).

In the example shown in FIG. 6, the light transmittance of the illumination side modulation element 16 or the detection side modulation element 53 may be maximum at the coordinate positions of X=0 and decrease according to a cosine function from the coordinate positions of X=0 in the X direction. Further, the light transmittance of the illumination side modulation element 16 or the detection side modulation element 53 may be maximum at the coordinate positions of X=0 and may decrease according to a quadratic function from the coordinate positions of X=0 in the X direction. In other words, the light transmittance of the illumination side modulation element 16 or the detection side modulation element 53 may change according to a cosine function or may change according to a quadratic function without limiting to the Gaussian function.

In an example shown in FIG. 7, the light transmittance of the illumination side modulation element 16 or the detection side modulation element 53 changes according to a continuous function. Specifically, the light transmittance of the illumination side modulation element 16 or the detection side modulation element 53 monotonically decreases according to a sine function in the X direction (for example, −X direction) (a portion having the same light transmittance is linearly distributed so as to extend in the Y direction). In other words, the light transmittance of the illumination side modulation element 16 or the detection side modulation element 53 changes according to a sine function. Note that the light transmittance of the illumination side modulation element 16 or the detection side modulation element 53 can also be said to monotonically increase according to a sine function in the X direction (for example, +X direction) or monotonically decrease or increase in the X direction within the surface of the pupil.

The light transmittance of the illumination side modulation element 16 or the detection side modulation element 53 may monotonically decrease or increase according to a sine function in the Y direction (a portion having the same light transmittance may be linearly distributed so as to extend in the X direction). Further, the light transmittance of the illumination side modulation element 16 or the detection side modulation element 53 may monotonically decrease or increase according to a sine function in any direction in the XY coordinate system without limiting to the X direction or the Y direction (a portion having the same light transmittance may be linearly distributed so as to extend in a direction perpendicular to any direction in the XY coordinate system).

In the example shown in FIG. 7, the light transmittance of the illumination side modulation element 16 or the detection side modulation element 53 may decrease monotonically according to a linear function in the X direction (for example, −X direction). In other words, the light transmittance of the illumination side modulation element 16 or the detection side modulation element 53 may change according to a linear function without limiting to the sine function.

In the examples shown in FIGS. 5 to 7, the above-described continuous function may be any one of a sine function, a cosine function, a quadratic function, a linear function, and a Gaussian function. The above-mentioned continuous function is not limited to a sine function, a cosine function, a quadratic function, a linear function, and a Gaussian function, but may be other function such as a cubic function. Further, the range in which the light transmittance changes in the illumination side modulation element 16 and the detection side modulation element 53 may be set according to the size (diameter) of the pupil (illumination pupil, detection pupil). For example, in the cases shown in FIGS. 5 to 7, the illumination side modulation element 16 and the detection side modulation element 53 are formed so that a region where the light transmittance is equal to 0 matches the outer peripheral portion of the pupil (illumination pupil, detection pupil).

When the light transmission of the illumination side modulation element 16 or the detection side modulation element 53 changes according to a cosine function or a sine function, it is desired that the change is made according to a cosine function or a sine function in a range smaller than one cycle within the surface of the pupil (illumination pupil, detection pupil). This is because if the range is larger than one cycle, the value of POTF also behaves periodically, which is not preferable from the viewpoint of deconvolution. In this case, there will be a plurality of frequencies at which the value of POTF is equal to 0, and thus noise occurring in a deconvolution process will increase, so that the accuracy of the obtainable refractive index distribution of the sample SA will deteriorate. Further, it is elaborated that when the light transmittance of the illumination side modulation element 16 or the detection side modulation element 53 changes according to a cosine function, the light transmittance is equal to 0 (the value of the cosine function is equal to 0) at the outer peripheral portion of the pupil (illumination pupil, detection pupil). This is to take into consideration the discontinuity of the light transmittance at the outer peripheral portion of the pupil being a cause of artifacts such as ringing in an image.

FIG. 8A shows a case where the light transmittance at the position P0 of the illumination pupil and the position P2 conjugate with the detection pupil is equal to 100% (constant) within the surface of the illumination pupil and the surface conjugate with the detection pupil as in the prior art. In this case, the light transmittance distribution is the same as that of a conventional circular aperture stop. FIG. 8B shows a distribution of POTF in the case of FIG. 8A. In FIG. 8B, the illumination σ=0.95 is set. Here, in FIG. 8B, gray color (background) indicates that the value of POTF is equal to 0, white color indicates that the value of POTF is a positive value, and black color indicates that the value of POTF is a negative value. Therefore, in FIG. 8B, as the white or black color is darker, the absolute value of POTF is larger. In the case where the light transmittance at the position of the pupil is equal to 100% (constant) within the surface of the pupil as in the prior art, it can be seen from FIG. 8B that when the illumination σ increases up to 0.95, the absolute values of POTF in the entire band in the frequency space are small. Therefore, the contrast of the image (picture) of the sample SA by bright field observation is low, and the obtainable dynamic range of the refractive index at each position of the sample SA narrows (the contrast of the image of the refractive index distribution lowers). In other words, it is difficult to generate an image of a three-dimensional refractive index distribution in the sample SA, which has both high contrast and high resolution (resolving power).

FIG. 9A shows a case where the light transmittance of the illumination side modulation element 16 provided at the position P0 of the illumination pupil changes according to a cosine function as shown in FIG. 5, and the light transmittance at the position P2 conjugate with the detection pupil is equal to 100% (constant) within the surface conjugate with the detection pupil as in the prior art. FIG. 9B shows a distribution of POTF in the case of FIG. 9A. In FIG. 9B, the illumination σ=0.95 is set. Here, as in the case of FIG. 8B, in FIG. 9 (B), gray color (background) indicates that the value of POTF is equal to 0, white color indicates that the value of POTF is a positive value, and black color indicates that the value of POTF is a negative value. From FIG. 9B, in the case where the light transmittance of the illumination side modulation element 16 provided at the position P0 of the illumination pupil changes according to a cosine function as shown in FIG. 5, even when the illumination σ increases up to 0.95, the absolute value of POTF is higher in a wide frequency band. Further, it can be seen that the absolute value of POTF shown in FIG. 9B is larger than the absolute value of the conventional POTF shown in FIG. 8B over the entire band in the frequency space. Therefore, the contrast of the image (picture) of the sample SA by bright field observation is high, and the obtainable dynamic range of the refractive index at each position of the sample SA is wider (the contrast of the image of the refractive index distribution is high). In other words, it is possible to generate an image of a three-dimensional refractive index distribution in the sample SA, which has both high contrast and high resolution (resolving power).

Figure 10A:
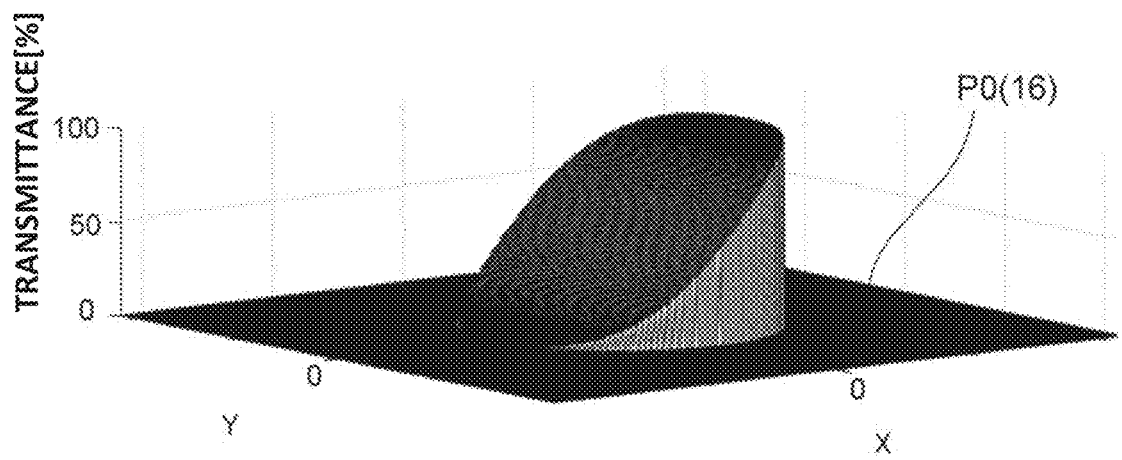
FIG. 10A is a graph showing a case where the light transmittance of the illumination side modulation element changes according to a sine function.
Figure 10B:
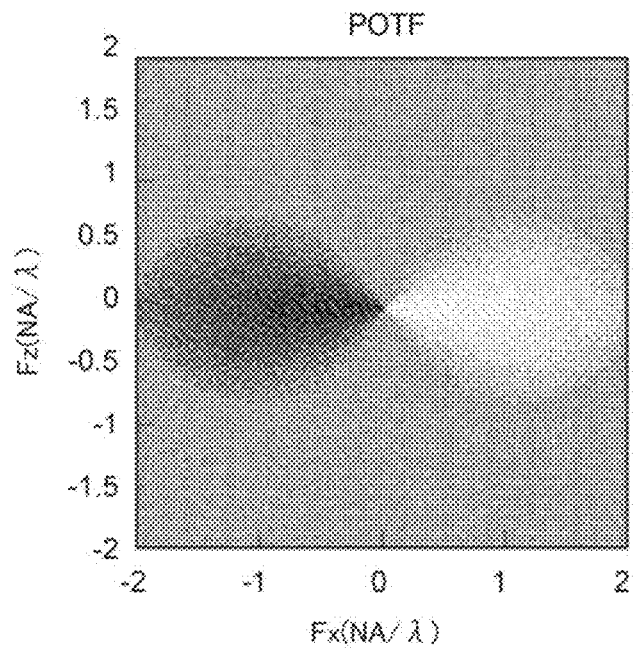
FIG. 10B is a diagram showing a distribution of POTF in the case of FIG. 10A.

FIG. 10A shows a case where the light transmittance of the illumination side modulation element 16 provided at the position P0 of the illumination pupil changes according to a sine function as shown in FIG. 7, and the light transmittance at the position P2 conjugate with the detection pupil is equal to 100% (constant) within the surface conjugate with the detection pupil as in the prior art. FIG. 10B shows a distribution of POTF in the case of FIG. 10A. Here, as in the case of FIGS. 8B and 9B, in FIG. 10B, gray color (background) indicates that the value of POTF is equal to 0, white color indicates that the value of POTF is a positive value, and black color indicates that the value of POTF is a negative value (hereinafter, the same description in figures is omitted). In FIG. 10B, the illumination σ=1 is set. From FIG. 10B, in the case where the light transmittance of the illumination side modulation element 16 provided at the position P0 of the illumination pupil changes according to a sine function as shown in FIG. 7, even when the illumination σ increases up to 1, the absolute value of POTF in a wide frequency band is high. Further, it can be seen that the absolute value of POTF shown in FIG. 10B is larger than the absolute values of the conventional POTF shown in FIG. 8B over the entire band in the frequency space. Therefore, the contrast of the image (picture) of the sample SA by bright field observation is high, and the obtainable dynamic range of the refractive index at each position of the sample SA is widened (the contrast of the image of the refractive index distribution is high). In other words, it is possible to generate an image of a three-dimensional refractive index distribution in the sample SA, which has both high contrast and high resolution (resolving power).

In the present embodiment, all or some of the illumination side modulation elements having different light transmittance distributions as shown in FIGS. 5 to 7 can be adopted as the illumination side modulation element 16. All or some of the detection side modulation elements having different light transmittance distributions as shown in FIGS. 5 to 7 can be adopted as the detection side modulation element 53. FIGS. 11 to 14 show examples in which the light transmittance at the position P0 of the illumination pupil or the position P2 conjugate with the detection pupil is changed by using the illumination side modulation element 16 or the detection side modulation element 53.

Figure 11A:
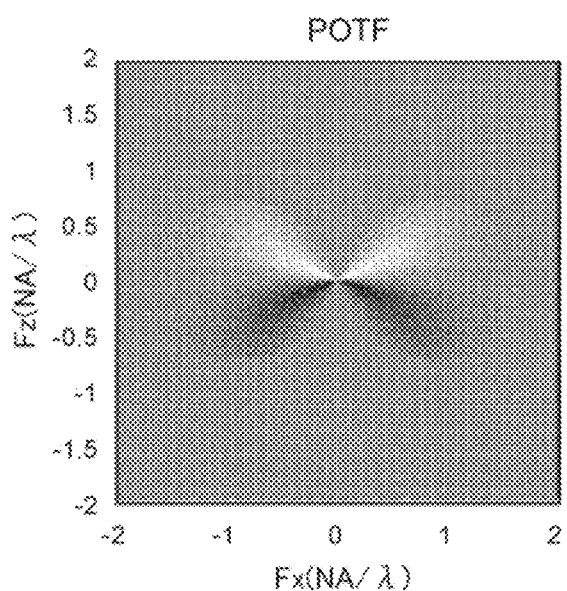
FIG. 11A is a diagram showing a distribution of POTF in a case where the light transmittance of the illumination side modulation element changes according to a Gaussian function.

FIG. 11A shows a distribution of POTF in a case where the light transmittance of the illumination side modulation element 16 provided at the position P0 of the illumination pupil changes according to a Gaussian function described as a modification of the cosine function as shown in FIG. 5, and the light transmittance at the position P2 conjugate with the detection pupil is equal to 100% (constant) within the surface conjugate with the detection pupil as in the prior art. In FIG. 11A, the illumination σ=0.95 is set. It can be seen in FIG. 11A that the absolute value of POTF in a wide frequency band is larger than the absolute value of the conventional POTF in FIG. 8B. Therefore, it is possible to generate an image of a three-dimensional refractive index distribution in the sample SA, which has both high contrast and high resolution (resolving power).

Figure 11B:
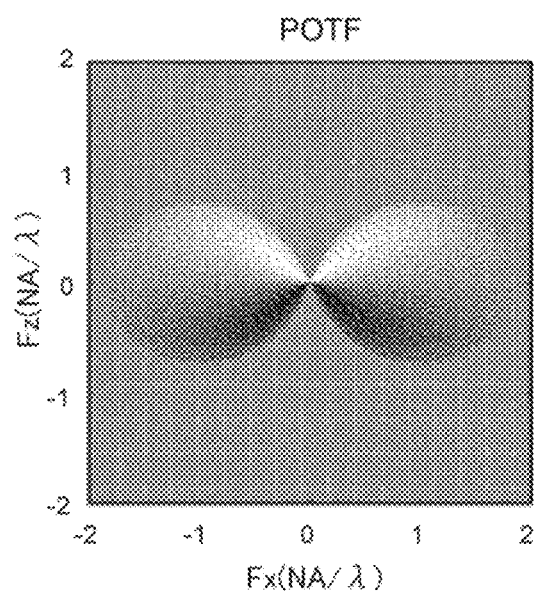
FIG. 11B is a diagram showing a distribution of POTF in a case where the light transmittance of the illumination side modulation element changes according to a quadratic function.

FIG. 11B shows a distribution of POTF in a case where the light transmittance of the illumination side modulation element 16 provided at the position P0 of the illumination pupil changes according to a quadratic function described as a modification of the cosine function as shown in FIG. 5, and the light transmittance at the position P2 conjugate with the detection pupil is equal to 100% (constant) within the surface conjugate with the detection pupil as in the prior art. In FIG. 11B, the illumination σ=0.95 is set. It can also be seen in FIG. 11B that the absolute value of POTF in a wide frequency band is larger than the absolute value of the conventional POTF in FIG. 8B. Therefore, it is possible to generate an image of a three-dimensional refractive index distribution in the sample SA, which has both high contrast and high resolution (resolving power).

Figure 12A:
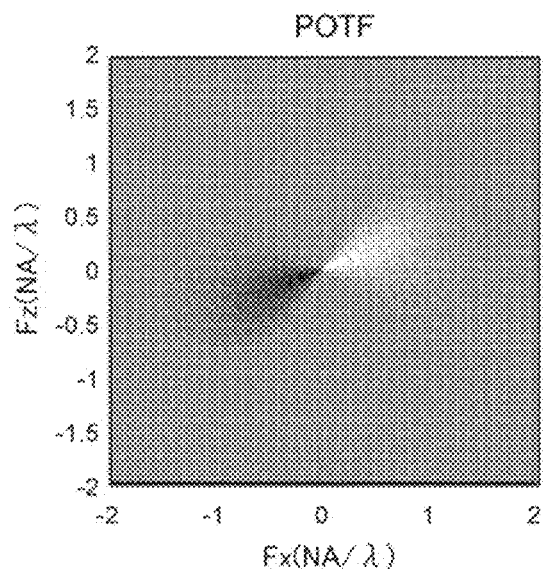
FIG. 12A is a diagram showing a distribution of POTF in a case where the light transmittances of the illumination side modulation element and a detection side modulation element change according to a sine function.

FIG. 12A shows a distribution of POTF in a case where the light transmittances of the illumination side modulation element 16 provided at the position P0 of the illumination pupil and the detection side modulation element 53 provided at the position P2 conjugate with the detection pupil change according to a sine function as shown in FIG. 7. In FIG. 12A, the illumination σ=1 is set. In the example shown in FIG. 12A, the light transmittance distributions of the illumination side modulation element 16 and the detection side modulation element 53 are the same. It can also be seen in FIG. 12A that the absolute value of POTF in a wide frequency band is larger than the absolute value of the conventional POTF in FIG. 8B. Therefore, it is possible to generate an image of a three-dimensional refractive index distribution in the sample SA, which has both high contrast and high resolution (resolving power). The same is true of a case where the light transmittances of the illumination side modulation element 16 and the detection side modulation element 53 change according to a linear function described as a modification of the sine function as shown in FIG. 7 or other functions without limiting to the sine function.

Figure 12B:
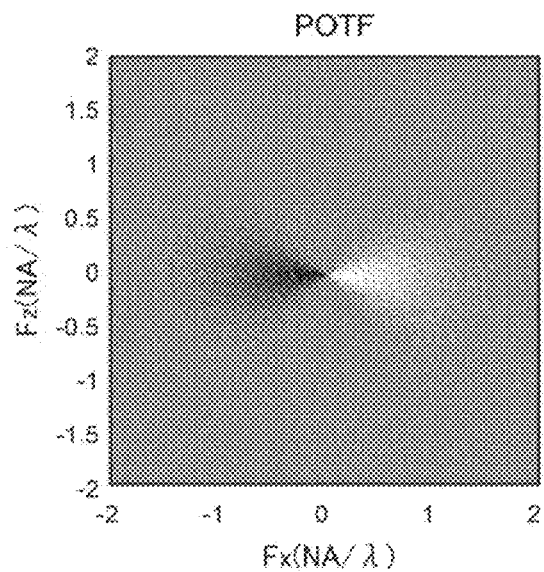
FIG. 12B is a diagram showing a distribution of POTF in a case where the light transmittance of the illumination side modulation element changes according to a sine function, and the light transmittance of the detection side modulation element changes according to a cosine function.

FIG. 12B shows a distribution of POTF in a case where the light transmittance of the illumination side modulation element 16 provided at the position P0 of the illumination pupil changes according to a sine function as shown in FIG. 7, and the light transmittance of the detection side modulation element 53 provided at the position P2 conjugate with the detection pupil changes according to a cosine function described as a modification of the Gaussian function as shown in FIG. 6. In FIG. 12B, the illumination σ=1 is set. It can also be seen in FIG. 12B that the absolute value of POTF in a wide frequency band is larger than the absolute value of the conventional POTF in FIG. 8B. Therefore, it is possible to generate an image of a three-dimensional refractive index distribution in the sample SA, which has both high contrast and high resolution (resolving power). The same is true of a case where the light transmittance of the illumination side modulation element 16 changes according to a linear function described as a modification of the sine function as shown in FIG. 7 or other functions without limiting to the sine function. The same is true of a case where the light transmittance of the detection side modulation element 53 changes according to a Gaussian function as shown in FIG. 6 or changes according to a quadratic function described as a modification of the Gaussian function as shown in FIG. 6 or other functions without limiting to the cosine function.

Figure 12C:
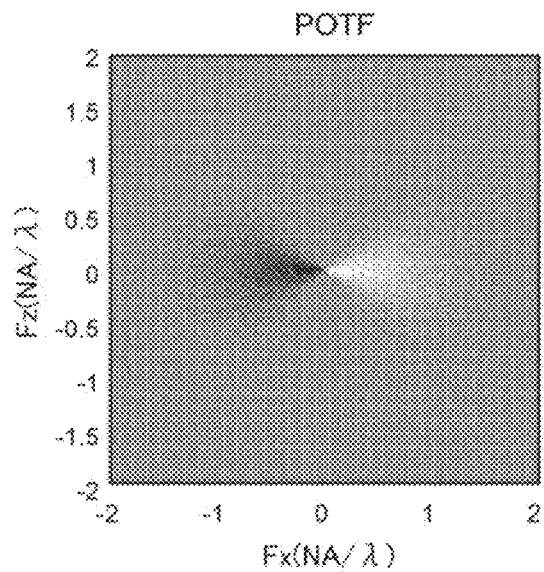
FIG. 12C is a diagram showing a distribution of POTF in a case where the light transmittance of the illumination side modulation element changes according to a sine function, and the light transmittance of the detection side modulation element changes according to a cosine function.

FIG. 12C shows a distribution of POTF in a case where the light transmittance of the illumination side modulation element 16 provided at the position P0 of the illumination pupil changes according to a sine function as shown in FIG. 7 and the light transmittance of the detection side modulation element 53 provided at the position P2 conjugate with the detection pupil changes according to a cosine function as shown in FIG. 5. In FIG. 12C, the illumination σ=1 is set. It can also be seen in FIG. 12C that the absolute value of POTF in a wide frequency band is larger than the absolute value of the conventional POTF in FIG. 8B. Therefore, it is possible to generate an image of a three-dimensional refractive index distribution in the sample SA, which has both high contrast and high resolution (resolving power). The same is true of a case where the light transmittance of the illumination side modulation element 16 changes according to a linear function described as a modification of the sine function as shown in FIG. 7 or other functions without limiting to the sine function. The same is true of a case where the light transmittance of the detection side modulation element 53 changes according to a Gaussian function or a quadratic function described as a modification of the cosine function as shown in FIG. 5 or other functions without limiting to the cosine function.

Figure 13A:
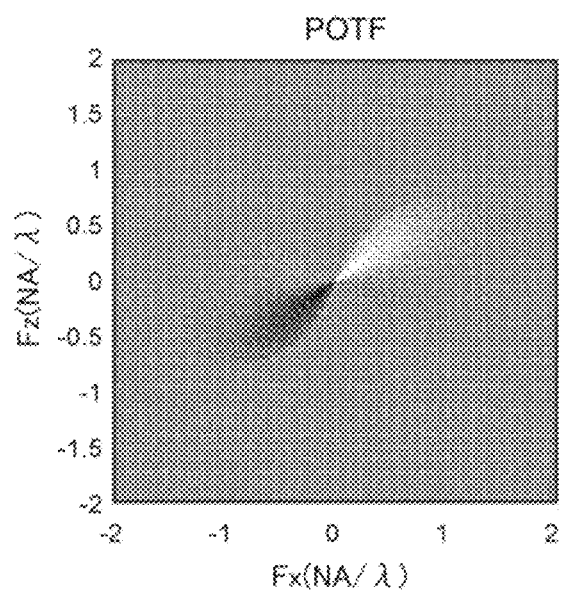
FIG. 13A is a diagram showing a distribution of POTF in a case where the light transmittance of the illumination side modulation element changes according to a cosine function, and the light transmittance of the detection side modulation element changes according to a sine function.

FIG. 13A shows a distribution of POTF in a case where the light transmittance of the illumination side modulation element 16 provided at the position P0 of the illumination pupil changes according to a cosine function described as a modification of the Gaussian function as shown in FIG. 6, and the light transmittance of the detection side modulation element 53 provided at the position P2 conjugate with the detection pupil changes according to a sine function as shown in FIG. 7. In FIG. 13A, the illumination σ=1 is set. It can also be seen in FIG. 13A that the absolute value of POTF in a wide frequency band is larger than the absolute value of the conventional POTF in FIG. 8B. Therefore, it is possible to generate an image of a three-dimensional refractive index distribution in the sample SA, which has both high contrast and high resolution (resolving power). The same is true of a case where the light transmittance of the illumination side modulation element 16 changes according to a Gaussian function as shown in FIG. 6, or changes according to a quadratic function described as a modification of the Gaussian function as shown in FIG. 6 or other functions without limiting to the cosine function. The same is true of a case where the light transmittance of the detection side modulation element 53 changes according to a linear function described as a modification of the sine function as shown in FIG. 7 or other functions without limiting to the sine function.

Figure 13B:
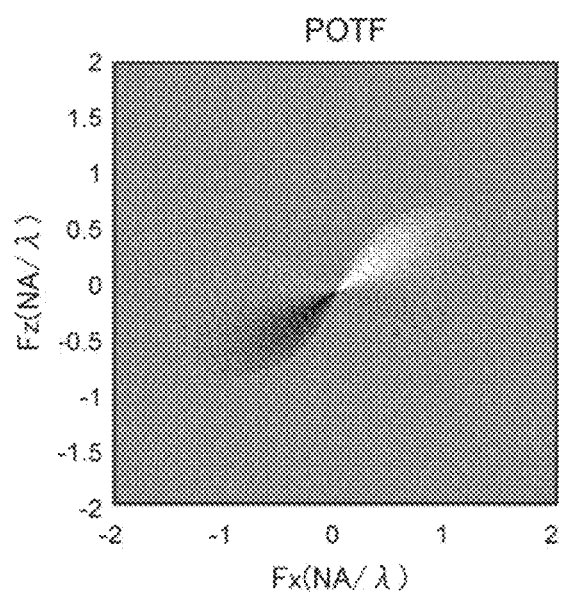
FIG. 13B is a diagram showing a distribution of POTF in a case where the light transmittance of the illumination side modulation element changes according to a cosine function, and the light transmittance of the detection side modulation element changes according to a sine function.

FIG. 13B shows a distribution of POTF in a case where the light transmittance of the illumination side modulation element 16 provided at the position P0 of the illumination pupil changes according to a cosine function as shown in FIG. 5, and the light transmittance of the detection side modulation element 53 provided at the position P2 conjugate with the detection pupil changes according to a sine function as shown in FIG. 7. In FIG. 13B, the illumination σ=1 is set. It can also be seen in FIG. 13B that the absolute value of POTF in a wide frequency band is larger than the absolute value of the conventional POTF in FIG. 8B. Therefore, it is possible to generate an image of a three-dimensional refractive index distribution in the sample SA, which has both high contrast and high resolution (resolving power). The same is true of a case where the light transmittance of the illumination side modulation element 16 changes according to a Gaussian function or a quadratic function described as a modification of the cosine function as shown in FIG. 5 or other functions without limiting to the cosine function. The same is true of a case where the light transmittance of the detection side modulation element 53 changes according to a linear function described as a modification of the sine function as shown in FIG. 7 or other functions without limiting to the sine function.

Figure 14A:
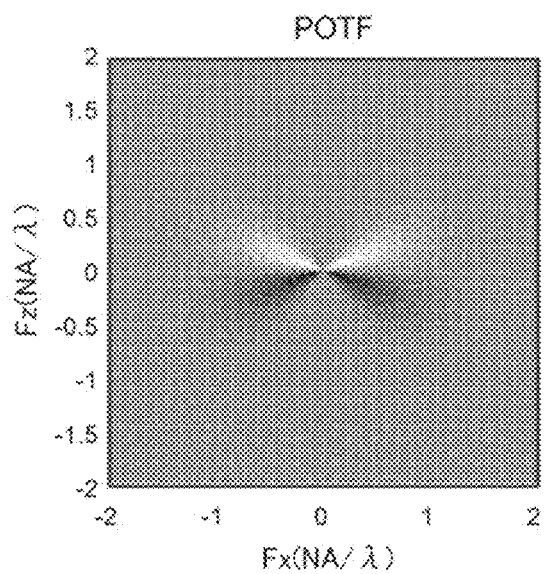
FIG. 14A is a diagram showing a distribution of POTF in a case where the light transmittances of the illumination side modulation element and the detection side modulation element change according to a cosine function.

FIG. 14A shows a distribution of POTF in a case where both the light transmittances of the illumination side modulation element 16 provided at the position P0 of the illumination pupil and the detection side modulation element 53 provided at the position P2 conjugate with the detection pupil change according to a cosine function described as a modification of the Gaussian function as shown in FIG. 6. In FIG. 14A, the illumination σ=1 is set. In an example shown in FIG. 14A, the light transmittance distributions in the illumination side modulation element 16 and the detection side modulation element 53 are the same. It can also be seen in FIG. 14A that the absolute value of POTF in a wide frequency band is larger than the absolute value of the conventional POTF in FIG. 8B. Therefore, it is possible to generate an image of a three-dimensional refractive index distribution in the sample SA, which has both high contrast and high resolution (resolving power). The same is true of a case where the light transmittances of the illumination side modulation element 16 and the detection side modulation element 53 change according to a Gaussian function as shown in FIG. 6 or change according to a quadratic function described as a modification of the Gaussian function as shown in FIG. 6 or other functions without limiting to the cosine function.

Figure 14B:
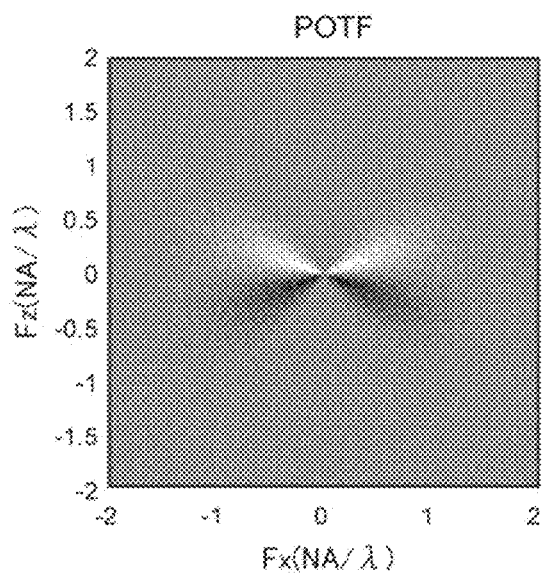
FIG. 14B is a diagram showing a distribution of POTF in a case where the light transmittances of the illumination side modulation element and the detection side modulation element changes according to a cosine function.

FIG. 14B shows a distribution of POTF in a case where both the light transmittances of the illumination side modulation element 16 provided at the position P0 of the illumination pupil and the detection side modulation element 53 provided at the position P2 conjugate with the detection pupil change according to a cosine function as shown in FIG. 5. In FIG. 14B, the illumination σ=1 is set. In an example shown in FIG. 14B, the light transmittance distributions in the illumination side modulation element 16 and the detection side modulation element 53 are the same. It can also be seen in FIG. 14B that the absolute value of POTF in a wide frequency band is larger than the absolute value of the conventional POTF in FIG. 8B. Therefore, it is possible to generate an image of a three-dimensional refractive index distribution in the sample SA, which has both high contrast and high resolution (resolving power). The same is true of a case where the light transmittances of the illumination side modulation element 16 and the detection side modulation element 53 change according to a Gaussian function or a quadratic function described as a modification of the cosine function as shown in FIG. 5 or other functions without limiting to the cosine function.

Figure 14C:
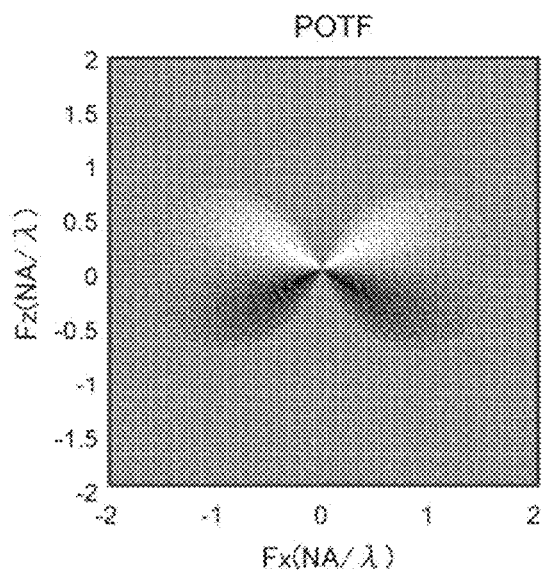
FIG. 14(C) is a diagram showing a distribution of POTF in a case where the light transmittance of the illumination side modulation element changes according to a cosine function.

FIG. 14C shows a distribution of POTF in a case where the light transmittance of the illumination side modulation element 16 provided at the position P0 of the illumination pupil changes according to a cosine function described as a modification of the Gaussian function as shown in FIG. 6, and the light transmittance at the position P2 conjugate with the detection pupil is equal to 100% (constant) within the surface conjugate with the detection pupil as in the prior art. In FIG. 14C, the illumination σ=1 is set. It can also be seen in FIG. 14C that the absolute value of POTF in a wide frequency band is larger than the absolute value of the conventional POTF in FIG. 8B. Therefore, it is possible to generate an image of a three-dimensional refractive index distribution in the sample SA, which has both high contrast and high resolution (resolving power). The same is true of a case where the light transmittance of the illumination side modulation element 16 changes according to a Gaussian function as shown in FIG. 6, a quadratic function described as a modification of the Gaussian function as shown in FIG. 6, or other functions without limiting to the cosine function.

Figure 15:
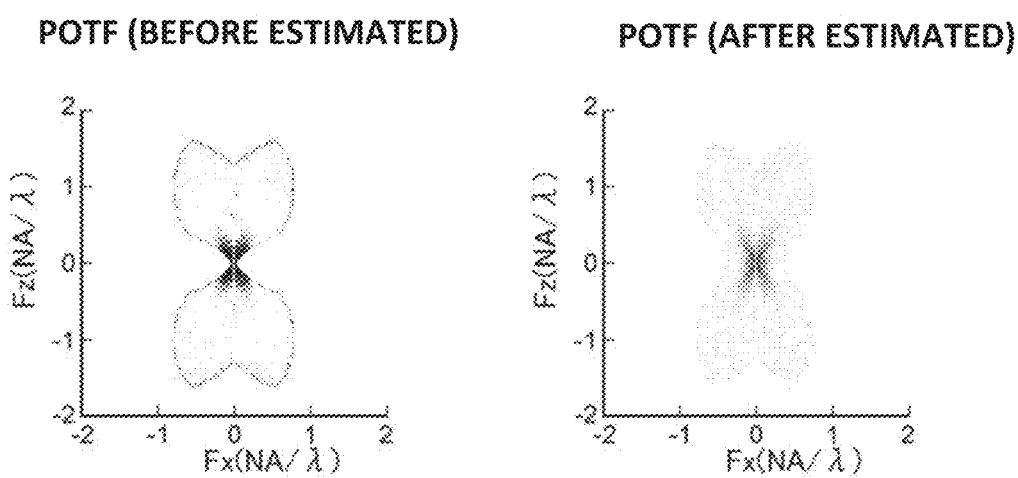
FIG. 15 is a schematic diagram showing a distribution of POTF having a missing cone and a distribution of POTF estimating the missing cone.

When a three-dimensional refractive index distribution is determined by using the above expression (10) or expression (15) and the expression (16), it is necessary to correct the refractive index. This is because POTF has a region where information is missing in the z direction (hereinafter referred to as a missing cone region) as shown in FIG. 15, and thus an error occurs in the change of the refractive index in the z direction. Therefore, the refractive index is corrected by using a missing cone estimation method such as a Gerchberg-Papoulis method, an Edge-Preserving Regularization method, a Total Variation Regularization method or the like. Specifically, a constraint condition is set by using a missing cone estimation algorithm so that a minimum refractive index value is equal to a predetermined refractive index value (for example, a known refractive index value of the medium in the sample SA), and the missing cone region is estimated as shown in FIG. 15.

Figure 16:
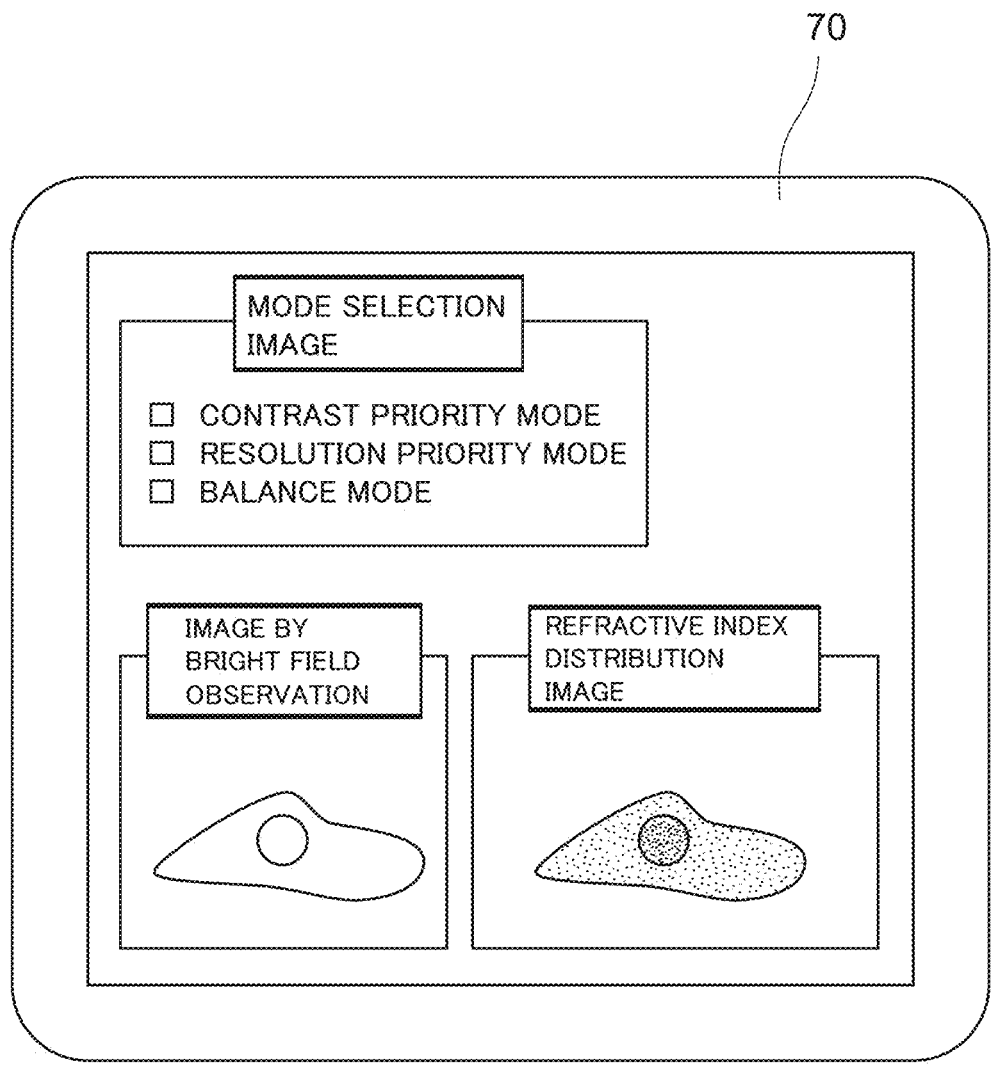
FIG. 16 is a schematic diagram of an image displayed on an image display part.

The image display part 70 displays an image of a three-dimensional refractive index distribution in the sample SA based on image data of the three-dimensional refractive index distribution of the sample SA generated by the image processor 66. The image display part 70 displays an image of the sample SA by bright field observation based on image data of the sample SA by bright field observation generated by the image processor 66. For example, as shown in FIG. 16, the image display part 70 can display the image of the sample SA by bright-field observation as a bright field observation image marked out at the lower left of a screen. The image display part 70 can display the image of the three-dimensional refractive index distribution in the sample SA as a refractive index distribution image marked out at the lower right of the screen. Further, the image display part 70 can display the characters of "contrast priority mode", the characters of "resolution priority mode", and the characters of "balance mode" in this order from the top as a mode selection image marked out on the upper side of the screen. The mode selection image is an image for causing a user to select any one of the contrast priority mode, the resolution priority mode, and the balance mode as a plurality of modes having different characteristics of the three-dimensional refractive index distribution in the sample SA. In other words, the mode selection image is an image for causing a user to select any one of a plurality of modes for displaying images having different characteristics (contrast priority mode, resolution priority mode, and balance mode) for the image of the three-dimensional refractive index distribution in the sample SA. Here, the characteristics of the image are, for example, the resolution and contrast of the image of the three-dimensional refractive index distribution in the sample SA. More specific image characteristics include a higher contrast characteristic that prioritizes high contrast over high resolution, a higher resolution characteristic that prioritizes high resolution over high contrast, and a characteristic in which the contrast and the resolution are high on the same level and well balanced with each other.

As described above, any one of a plurality of illumination side modulation elements 16 which are different in change of light transmittance, that is, different in light transmittance distribution can be selected as the illumination side modulation element 16, and arranged at the position P0 of the illumination pupil. In this case, a turret (not shown) holding a plurality of illumination side modulation elements 16 may be provided, and turned to select the illumination side modulation element 16 to be arranged at the position P0 of the illumination pupil. Note that an element changing part capable of selecting and changing the illumination side modulation element 16 to be arranged at the position P0 of the illumination pupil from the plurality of illumination side modulation elements 16 is not limited to the turret, but an existing mechanism such as a slider may be used. As a result, the control part 65 controls the element changing part so as to change the illumination side modulation element 16 to be arranged at the position P0 of the illumination pupil, thereby changing the light transmittance distribution within the surface of the illumination pupil. Any one of a plurality of detection side modulation elements 53 having different light transmittance distributions can be selected as the detection side modulation element 53, and arranged at the position P2 conjugate with the detection pupil. In this case, a turret (not shown) holding a plurality of detection side modulation elements 53 may be provided, and turned to select the detection side modulation element 53 to be arranged at the position P2 conjugate with the detection pupil. Means (element changing part) similar to means for selecting the illumination side modulation element 16 to be arranged at the position P0 of the illumination pupil can be used as means for selecting the detection side modulation element 53 to be arranged at the position P2 conjugate with the detection pupil from a plurality of detection side modulation elements 53. As a result, the control part 65 controls the element changing part so as to change the detection side modulation element 53 to be arranged at the position P2 conjugate with the detection pupil, thereby changing the light transmittance distribution within the surface conjugate with the detection pupil.

Here, the condition of the light transmittance distribution within the surface of the pupil or within the surface conjugate with the pupil, specifically, the combination condition of the light transmittance distribution within the surface of the illumination pupil and the light transmittance distribution within the surface conjugate with the detection pupil is referred to as a detection condition. For example, when any one of a plurality of illumination side modulation elements 16 having different light transmittance distributions can be selected and arranged at the position P0 of the illumination pupil, and any one of a plurality of detection side modulation elements 53 having different light transmittance distributions can be selected and arranged at the position P2 conjugate with the detection pupil, the detection condition can be set and changed by selecting at least one of the illumination side modulation element 16 and the detection side modulation element 53.

The user operates the operation input part 67 comprising a keyboard, an operation dial, or the like to select a mode corresponding to the characteristic of an image of a refractive index distribution desired by the user from the contrast priority mode, the resolution priority mode, and the balance mode displayed on the image display part 70. Then, at least one of the illumination side modulation element 16 and the detection side modulation element 53 corresponding to a preset detection condition is selected according to the selected mode. Under the detection condition corresponding to the mode selected by the user, the transmitted illumination optical system 10 illuminates the sample SA, and the detector 60 detects the detection light from the sample SA via the detection optical system 40. The image processor 66 calculates a three-dimensional refractive index distribution in the sample SA based on the detection signal of the detection light output from the detector 60, and generates image data of the three-dimensional refractive index distribution of the sample SA. The image display part 70 displays the image of the refractive index distribution in the sample SA based on the image data of the refractive index distribution of the sample SA generated by the image processor 66. As a result, according to the present embodiment, it is possible to generate an image of a refractive index distribution in the sample SA desired by the user. Further, it is possible to easily set the detection condition when displaying the image of the refractive index distribution in the sample SA (and an image of a phase distribution described later).

The contrast priority mode is selected when it is desired to prioritize the contrast of an image of a three-dimensional refractive index distribution in the sample SA. In the contrast priority mode, a three-dimensional distribution in the sample SA is obtained under a detection condition (that is, a combination condition for a light transmittance distribution within the surface of the illumination pupil and a light transmittance distribution within the surface conjugate with the detection pupil) that gives an image of a refractive index distribution having a higher contrast with respect to the resolution (resolving power) and the contrast. Therefore, by selecting the contrast priority mode, it is possible to obtain an image of a three-dimensional refractive index distribution in the sample SA, the image having characteristics that have higher resolution (resolving power) and higher contrast than those in the prior art, but have still higher contrast.

Under the detection condition corresponding to the contrast priority mode, there are selected a light transmittance distribution within the surface of the illumination pupil and a light transmittance distribution within the surface conjugate with the detection pupil with which absolute values of POTF which are not equal to zero are obtained over a wide frequency band as compared with a prior art where the pupil is located at a circular aperture (that is, the light transmittance is equal to 100%), but still higher absolute values of POTF are obtained. For example, as shown in FIG. 9B, the illumination side modulation element 16 whose light transmittance changes according to a cosine function as shown in FIG. 5 is arranged at the position P0 of the illumination pupil, and the detection side modulation element 53 is not arranged. Further, for example, as the distribution of POTF is shown in FIG. 11A, the illumination side modulation element 16 whose light transmittance changes according to a Gaussian function described as a modification of the cosine function as shown in FIG. 5 may be arranged at the position P0 of the illumination pupil, and the detection side modulation element 53 may not be arranged. As the distribution of POTF is shown in FIG. 11B, the illumination side modulation element 16 whose light transmittance changes according to a quadratic function described as a modification of the cosine function as shown in FIG. 5 may be arranged at the position P0 of the illumination pupil, and the detection side modulation element 53 may not be arranged. As the distribution of POTF is shown in FIG. 14C, the illumination side modulation element 16 whose light transmittance changes according to a cosine function described as a modification of the Gaussian function as shown in FIG. 6 may be arranged at the position P0 of the illumination pupil, and the detection side modulation element 53 may not be arranged. Only the illumination side modulation element 16 whose light transmittance decreases according to a continuous function such as a cosine function, a Gaussian function or a quadratic function as it is away from the optical axis (the optical axis Ax1 of the transmitted illumination optical system 10) within the surface of the illumination pupil is arranged at the position P0 of the illumination pupil, which makes it possible to obtain an image of a three-dimensional refractive index distribution in the sample SA, the image having characteristics that have higher resolution (resolving power) and higher contrast than those in the prior art, but have still higher contrast.

In the above-mentioned contrast priority mode, the light transmittance of the illumination side modulation element 16 may change according to a continuous function other than a cosine function, a Gaussian function and a quadratic function (for example, a sine function or a linear function), and may change according to a discontinuous function (for example, a step function). Further, only the illumination side modulation element 16 is arranged at the position P0 of the illumination pupil, but the present invention is not limited to this arrangement. For example, the illumination side modulation element 16 may be arranged at the position P0 of the illumination pupil, and the detection side modulation element 53 may be arranged at the position P2 conjugate with the detection pupil. The illumination side modulation element 16 may not be arranged, and only the detection side modulation element 53 may be arranged at the position P2 conjugate with the detection pupil. In this case, the light transmittance of the detection side modulation element 53 arranged at the position P2 conjugate with the detection pupil may change according to any continuous function or discontinuous function.

The resolution priority mode is selected when it is desired to prioritize the resolution (resolving power) of an image of a three-dimensional refractive index distribution in the sample SA. In the resolution priority mode, a three-dimensional refractive index distribution in the sample SA is obtained under a detection condition that gives an image of a refractive index distribution having a higher resolution (resolving power) with respect to the resolution (resolving power) and the contrast. Therefore, by selecting the resolution priority mode, it is possible to obtain an image of a three-dimensional refractive index distribution in the sample SA, the image having characteristics that have higher resolution (resolving power) and higher contrast than those in the prior art, but have still higher resolution (resolving power).

Under the detection condition corresponding to the resolution priority mode, there are selected a light transmittance distribution within the surface of the illumination pupil and a light transmittance distribution within the surface conjugate with the detection pupil with which higher absolute values of POTF are obtained, and the absolute values of POTF are obtained over a wider frequency band as compared with the prior art in which the pupil is located at a circular aperture (that is, the light transmittance is equal to 100%). For example, as the distribution of POTF is shown in FIG. 10B, the illumination side modulation element 16 whose light transmittance changes according to a sine function as shown in FIG. 7 is arranged at the position P0 of the illumination pupil, and the detection side modulation element 53 is not arranged at the position P2 conjugate with the detection pupil. Only the illumination side modulation element 16 whose light transmittance decreases along one direction within the surface of the illumination pupil according to a continuous function such as a sine function or a linear function is arranged at the position P0 of the illumination pupil, which makes it possible to obtain an image of a three-dimensional refractive index distribution in the sample SA, the image having characteristics that have higher resolution (resolving power) and higher contrast than those in the prior art, and have still higher resolution (resolving power).

In the resolution priority mode described above, the light transmittance of the illumination side modulation element 16 may change according to a continuous function other than the sine function (for example, a cosine function, a Gaussian function, a quadratic function, a linear function), and may change according to a discontinuous function (for example, a step function). Further, only the illumination side modulation element 16 may be arranged at the position P0 of the illumination pupil, but the present invention is not limited to this arrangement. For example, the illumination side modulation element 16 may be arranged at the position P0 of the illumination pupil, and the detection side modulation element 53 may be arranged at the position P2 conjugate with the detection pupil. The illumination side modulation element 16 may not be arranged, and only the detection side modulation element 53 may be arranged at the position P2 conjugate with the detection pupil. In this case, the light transmittance of the detection side modulation element 53 arranged at the position P2 conjugate with the detection pupil may change according to any continuous function or discontinuous function.

The balance mode is selected when it is desired to prioritize the balance between the contrast and the resolution (resolving power) of the image of the three-dimensional refractive index distribution in the sample SA. By selecting the balance mode, it is possible to obtain an image of a three-dimensional refractive index distribution in the sample SA in which the contrast and the resolution (resolving power) are well-balanced.

Under the detection condition corresponding to the balance mode, there are selected a light transmittance distribution within the surface of the illumination pupil and a light transmittance distribution within the surface conjugate with the detection pupil with which intermediate POTF characteristics between those of the contrast priority mode and the resolution priority mode are obtained. In other words, a light transmittance distribution with which the absolute value of POTF increases over a wide frequency band is selected. For example, as the distribution of POTF is shown in FIG. 12B, the illumination side modulation element 16 whose light transmittance changes according to a sine function as shown in FIG. 7 is arranged at the position P0 of the illumination pupil, and the detection side modulation element 53 whose light transmittance changes according to a cosine function described as a modification of the Gaussian function as shown in FIG. 6 is arranged at the position P2 conjugate with the detection pupil. Further, for example, as the distribution of POTF is shown in FIG. 12C, the illumination side modulation element 16 whose light transmittance changes according to a sine function as shown in FIG. 7 may be arranged at the position P0 of the illumination pupil, and the detection side modulation element 53 whose light transmittance changes according to a cosine function as shown in FIG. 5 may be arranged at the position P2 conjugate with the detection pupil.

As the distribution of POTF is shown in FIG. 13A, the illumination side modulation element 16 whose light transmittance changes according to a cosine function described as a modification of the Gaussian function as shown in FIG. 6 may be arranged at the position P0 of the illumination pupil, and the detection side modulation element 53 whose light transmittance changes according to a sine function as shown in FIG. 7 may be arranged at the position P2 conjugate with the detection pupil. As the distribution of POTF is shown in FIG. 13B, the illumination side modulation element 16 whose light transmittance changes according to a cosine function as shown in FIG. 5 may be arranged at the position P0 of the illumination pupil, and the detection side modulation element 53 whose light transmittance changes according to a sine function as shown in FIG. 7 may be arranged at the position P2 conjugate with the detection pupil. The illumination side modulation element 16 whose light transmittance changes according to a continuous function such as a cosine function or a sine function is arranged at the position P0 of the illumination pupil, and the detection side modulation element 53 having a light transmittance distribution different from that of the illumination side modulation element 16 is arranged at the position P2 conjugate with the detection pupil, which makes it possible to obtain an image of a three-dimensional refractive index distribution in the sample SA, the image having characteristics in which the contrast and the resolution (resolving power) are well balanced.

Further, as the distribution of POTF is shown in FIG. 12A, the illumination side modulation element 16 whose light transmittance changes according to a sine function as shown in FIG. 7 may be arranged at the position P0 of the illumination pupil, and the detection side modulation element 53 whose light transmittance changes according to a sine function as shown in FIG. 7 may be arranged at the position P2 conjugate with the detection pupil. As the distribution of POTF is shown in FIG. 14A, the illumination side modulation element 16 whose light transmittance changes according to a cosine function described as a modification of the Gaussian function as shown in FIG. 6 may be arranged at the position P0 of the illumination pupil, and the detection side modulation element 53 whose light transmittance changes according to a cosine function described as a modification of the Gaussian function as shown in FIG. 6 may be arranged at the position P2 conjugate with the detection pupil. As the distribution of POTF is shown in FIG. 14B, the illumination side modulation element 16 whose light transmittance changes according to a cosine function as shown in FIG. 5 may be arranged at the position P0 of the illumination pupil, and the detection side modulation element 53 whose light transmittance changes according to a cosine function as shown in FIG. 5 may be arranged at the position P2 conjugate with the detection pupil. Even when the illumination side modulation element 16 whose light transmittance changes according to a continuous function such as a cosine function or a sine function is arranged at the position P0 of the illumination pupil, and the detection side modulation element 53 having the same light transmittance distribution as the illumination side modulation element 16 is arranged at the position P2 conjugate with the detection pupil, it is also possible to obtain an image of a three-dimensional refractive index distribution in the sample SA, the image having characteristics in which the contrast and the resolution (resolving power) are well balanced with each other.

In the above-mentioned balance mode, the light transmittance of the illumination side modulation element 16 and the light transmittance of the detection side modulation element 53 may change according to a continuous function other than the cosine function and the sine function (for example, a Gaussian function, a quadratic function, a linear function), or may change according to a discontinuous function (for example, a step function). Further, the illumination side modulation element 16 is arranged at the position P0 of the illumination pupil, and the detection side modulation element 53 is arranged at the position P2 conjugate with the detection pupil, but the present invention is not limited to this arrangement. For example, the detection side modulation element 53 may not be arranged, and only the illumination side modulation element 16 may be arranged at the position P0 of the illumination pupil. The illumination side modulation element 16 may not be arranged, and only the detection side modulation element 53 may be arranged at the position P2 conjugate with the detection pupil. In this case, the light transmittance of the modulation element (the illumination side modulation element 16, the detection side modulation element 53) to be arranged at the position P0 of the illumination pupil or the position P2 conjugate with the detection pupil may change according to any continuous function or discontinuous function.

When the user does not select any mode described above, it is also possible to illuminate the sample SA by the transmitted illumination optical system 10 and detect detection light from the sample SA via the detection optical system 40 by the detector 60 under a detection condition corresponding to a standards setting mode. Under the detection condition corresponding to the standards setting mode, for example, as the distribution of POTF is shown in FIG. 11B, the illumination side modulation element 16 whose light transmittance changes according to a quadratic function described as a modification of the cosine function as shown in FIG. 5 is arranged at the position P0 of the illumination pupil, and the detection side modulation element 53 is not arranged.

In the above-mentioned standards setting mode, the light transmittance of the illumination side modulation element 16 may change according to a continuous function other than the quadratic function (for example, a cosine function, a Gaussian function, a sine function, a linear function), and may change according to a discontinuous function (for example, a step function). Further, only the illumination side modulation element 16 is arranged at the position P0 of the illumination pupil, but the present invention is not limited to this arrangement. For example, the illumination side modulation element 16 may be arranged at the position P0 of the illumination pupil, and the detection side modulation element 53 may be arranged at the position P2 conjugate with the detection pupil. The illumination side modulation element 16 may not be arranged, and only the detection side modulation element 53 may be arranged at the position P2 conjugate with the detection pupil. In this case, the light transmittance of the detection side modulation element 53 arranged at the position P2 conjugate to the detection pupil may change according to any continuous function or discontinuous function. The user can freely set the detection condition corresponding to the standards setting mode.

Figure 17:
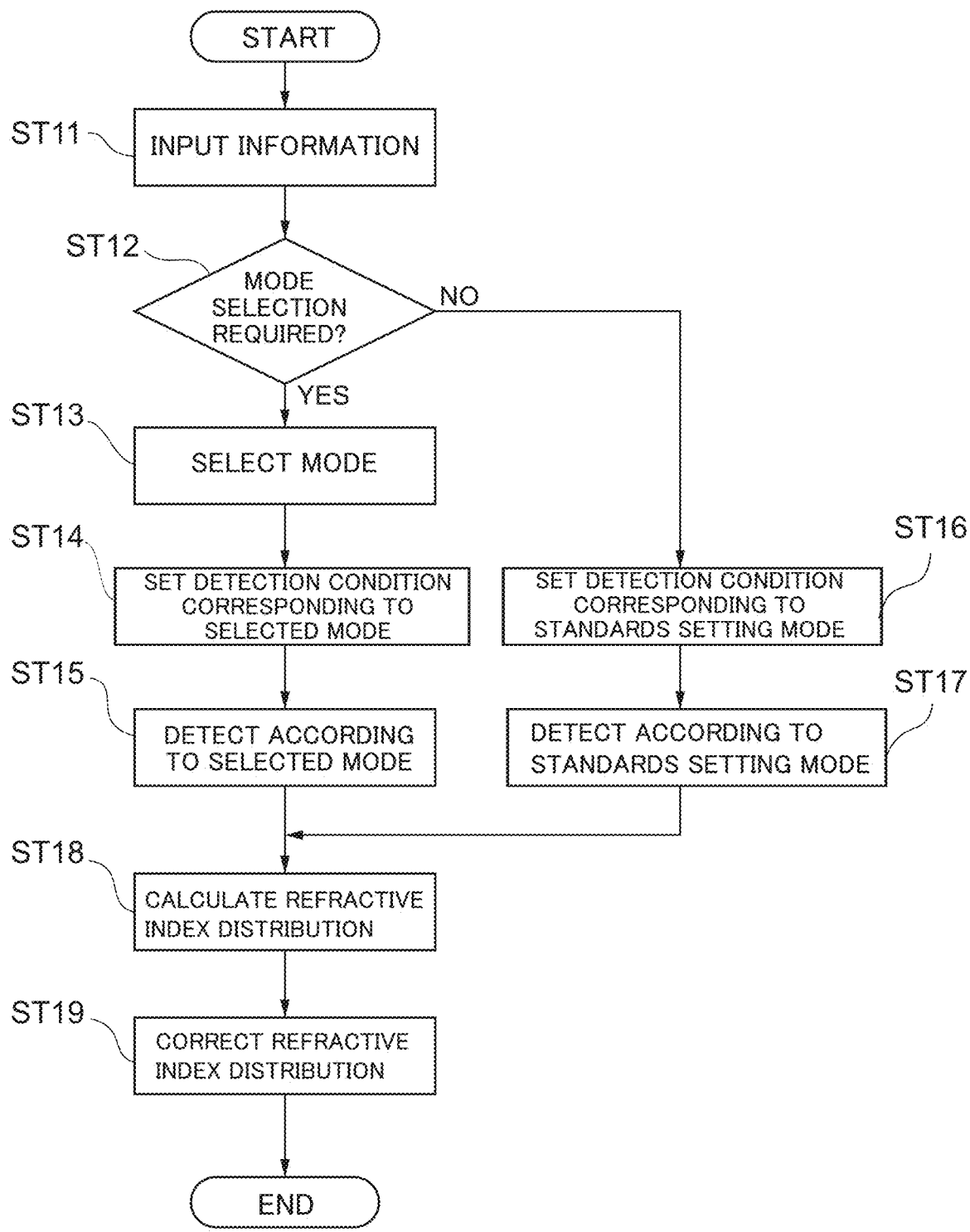
FIG. 17 is a flowchart showing a data generation method according to a first embodiment.

Next, a method of generating data of the refractive index in the microscope device 1 according to the first embodiment will be described. FIG. 17 is a flowchart showing a data generation method according to the first embodiment. It is assumed that the sample SA is placed on the stage 2 in advance. The control part 65 includes, for example, a computer system. The control part 65 reads out a control program stored in the storage part, and executes various processing according to the control program. This control program causes a computer to execute control processing for controlling the detector 60 for detecting light from the sample SA and data processing for generating image data related to the sample SA by the image processor 66.

In step ST11, information on setting of the microscope device 1 (hereinafter, may be simply referred to as "setting") is input via the operation input part 67. The information on the setting includes, for example, the wavelength of the illumination light, the number of cross sections (xy cross sections) of a z-stack image of the sample SA (that is, the number of image data pieces of cross sections of the sample SA to be acquired), the refractive index of a medium around the sample SA, and the like. The refractive index of the medium around the sample SA is, for example, the refractive index of water when the sample SA is in water, and the refractive index of a culture solution when the sample SA is in the culture solution. When the user performs an operation of inputting information on the setting to the operation input part 67, the information on the setting input via the operation input part 67 is stored in the storage part.

In step ST12, it is determined whether the operation for selecting a mode has been performed. If the determination is YES, the processing proceeds to step ST13. If the determination is NO, the processing proceeds to step ST16.

If the determination in step ST12 is YES, in step ST13, any mode selected from a plurality of modes (for example, the above-mentioned contrast priority mode, resolution priority mode, and balance mode) is input by the user. When the user performs an operation of selecting any mode on the operation input part 67, the mode corresponding to the operation performed on the operation input part 67 is stored in the storage part.

In step ST14, the control part 65 sets a detection condition according to the mode input in step ST13. As a result, at least one of the illumination side modulation element 16 and the detection side modulation element 53 corresponding to the preset detection condition is selected according to the mode selected by the user. At this time, the condenser lens 18 and the objective lens 22 which are determined according to the illumination σ are selected. The illumination σ is preset in each mode.

In step ST15, under the detection condition corresponding to the mode selected by the user, the transmitted illumination optical system 10 illuminates the sample SA, and the detector 60 detects the detection light from the sample SA via the detection optical system 40. At this time, the control part 65 calculates an interval Δz of respective cross sections of the sample SA in the z-stack image of the sample SA according to the combination of the condenser lens 18 and the objective lens 22. The control part 65 controls the stage driver 3, the detector 60 and the like so as to be capable of acquiring the intensity of an image of each cross section of the sample SA (the signal strength of the detection signal of the detector 60) in the z-stack image of the sample SA at the calculated interval Δz. When the processing of step ST15 is terminated, the processing proceeds to step ST18.

When the determination in step ST12 is NO, in step ST16, the control part 65 sets the detection condition corresponding to the standards setting mode. As a result, at least one of the illumination side modulation element 16 and the detection side modulation element 53 corresponding to the detection condition preset as the standards setting mode is selected. At this time, the condenser lens 18 and the objective lens 22 which are determined according to the illumination σ are selected.

In step ST17, under the detection condition corresponding to the standards setting mode, the transmitted illumination optical system 10 illuminates the sample SA, and the detector 60 detects the detection light from the sample SA via the detection optical system 40. At this time, the control part 65 controls the stage driver 3, the detector 60 and the like so as to be capable of acquiring the intensity of an image of each cross section of the sample SA (the signal strength of the detection signal of the detector 60) in the z-stack image of the sample SA at the interval Δz corresponding to the standards setting mode. When the processing of step ST17 is terminated, the processing proceeds to step ST18.

In step ST18, the image processor 66 determines a three-dimensional refractive index distribution in the sample SA based on the detection signal output from the detector 60, and generates image data of the three-dimensional refractive index distribution in the sample SA. At this time, as described above, the image processor 66 uses the above expression (10) or expression (15) and the expression (16) to calculate a three-dimensional refractive index distribution n(x, y, z) in the sample SA from the signal strength of the detection signal output from the detector 60, that is, the intensity I(x, y, z) of the image of the three-dimensional sample SA. The intensity of the image of the three-dimensional sample SA is expressed as the intensity of the image of each cross section of the sample SA in the z-stack image of the sample SA. Further, the image processor 66 generates image data of the sample SA by bright field observation based on the detection signal output from the detector 60. The image display part 70 displays the image of the three-dimensional refractive index distribution in the sample SA based on the image data of the three-dimensional refractive index distribution in the sample SA generated by the image processor 66. The image display part 70 displays the image of the sample SA by bright field observation based on the image data of the sample SA by bright field observation generated by the image processor 66.

In step ST19, the image processor 66 corrects the image data of the three-dimensional refractive index distribution in the sample SA. The image processor 66 estimates a missing cone region by using a missing cone estimation algorithm when calculating the three-dimensional refractive index distribution using the above expression (10) or the expression (15) and the like. This makes it possible to improve the calculation accuracy of the three-dimensional refractive index distribution. The image display part 70 displays a corrected image of the three-dimensional refractive index distribution based on the image data of the three-dimensional refractive index distribution corrected by the image processor 66. When the image data of the three-dimensional refractive index distribution is not corrected, the processing is terminated without executing the processing of step ST19.

In the flow of FIG. 17, the processing of step ST12 may be omitted. For example, the processing of steps ST12 to ST15 may be omitted, and after the processing of step ST11, the processing of step S18 may be executed subsequently to the processing of step ST16 and step ST17. Further, the processing of step ST12, step ST16 and step ST17 may be omitted, and after the processing of step S11, the processing of step ST18 may be executed subsequently to the processing of steps ST13 to ST15. Further, in the above flow, the processing of step ST19 may be omitted.

In the flow of FIG. 17, the interval Δz in the z direction is calculated in step ST15, but the present invention is not limited to this flow. For example, in step ST11, the interval Δz in the z direction may be input as information on the setting.

In the flow of FIG. 17, under the detection condition corresponding to the mode selected by the user or the standards setting mode, the transmitted illumination optical system 10 illuminates the sample SA, and the detector 60 detects the detection light from the sample SA via the detection optical system 40. However, the present invention is not limited to this manner. For example, the user may perform a setting operation on the operation input part 67 or the like to directly perform setting of a detection condition (setting of selecting at least one of the illumination side modulation element 16 and the detection side modulation element 53), so that under the set detection condition, the transmitted illumination optical system 10 illuminates the sample SA and the detector 60 detects the detection light from the sample SA via the detection optical system 40.

Second Embodiment

Next, a microscope device according to a second embodiment will be described. The microscope device according to the second embodiment has the same configuration as the microscope device 1 according to the first embodiment except for the processing in the image processor 66. Therefore, the components as those in the first embodiment are designated by the same reference numerals and characters as those in the first embodiment, and detailed description thereof will be omitted. In the second embodiment, the image processor 66 illuminates the sample SA by using the transmitted illumination optical system 10 and detects the light from the sample SA via the detection optical system 40 (in other words, bright field observation), thereby generating phase data relating to the sample SA based on the detection signal of the light (detection light) output from the detector 60. Here, the phase data relating to the sample SA is data representing the phase of the sample SA, and it is, for example, data of phase at each position in the sample SA, that is, data representing a phase distribution in the sample SA. Further, the phase data relating to the sample SA is stored in a storage part (not shown) as a look-up table, for example. The image processor 66 generates image data in which the brightness value of each pixel is set according to the value of phase at each position of the phase distribution in the sample SA (hereinafter may be referred to as the image data of the phase distribution of the sample SA). Further, the image processor 66 generates image data of the sample SA by bright field observation based on the detection signal of the detection light output from the detector 60. The image processor 66 generates image data of the sample SA by fluorescence observation based on the detection signal of fluorescence output from the detector 60.

The image display part 70 displays an image representing the phase distribution in the sample SA based on the image data of the phase distribution of the sample SA generated by the image processor 66. Further, the image display part 70 displays an image of the sample SA by bright field observation based on the image data of the sample SA by bright field observation generated by the image processor 66. The image display part 70 displays an image of the sample SA by fluorescence observation based on the image data of the sample SA by fluorescence observation generated by the image processor 66.

Next, a method of finding a two-dimensional phase distribution in the sample SA as phase data relating to the sample SA by the image processor 66 will be described. From an expression of partial coherent image formation, the intensity I(x, y) of an image of a two-dimensional object can be expressed as the following expression (17).

[Expression 17]

$$I(x, y) = C \int\int\int\int d\xi_1 d\eta_1 d\xi_2 d\eta_2 \tilde{o}(\xi_1, \eta_1) \tilde{o}^*(\xi_2, \eta_2) TCC(\xi_1, \eta_1, \xi_2, \eta_2) \exp[ik[(\xi_1 - \xi_2)x + (\eta_1 - \eta_2)y]] \quad (17)$$

In expression (17), o represents the complex amplitude transmittance of the object. TCC represents the transmission cross coefficient. (ξ, η) represents the direction cosine of diffracted light (or direct light). Further, the image in this case is an image of the sample SA obtained by forming an image of light (detection light) transmitted through at least a part of the sample SA by illumination. Therefore, the intensity I(x, y) of the image of the two-dimensional object, that is, the image of the two-dimensional sample SA can be replaced by the signal strength of the detection signal output from the detector 60 in image processing (that is, the signal strength at each pixel of the detector 60 when the sample SA is imaged by the detector 60). The transmission cross coefficient TCC can be expressed as the following expression (18).

[Expression 18]

$$TCC(\xi_1, \eta_1, \xi_2, \eta_2) = \int\int S(\xi_s, \eta_s) G(\xi_1 + \xi_s, \eta_1 + \eta_s) G^*(\xi_2 + \xi_s, \eta_2 + \eta_s) \quad (18)$$

In expression (18), S represents the illumination pupil. G represents the detection pupil. Since the transmission cross coefficient TCC is Hermitian conjugate, it has the property shown in the following expression (19).

[Expression 19]

$$TCC(\xi_1, \eta_1, \xi_2, \eta_2) = TCC^*(\xi_2, \eta_2, \xi_1, \eta_1) \quad (19)$$

As described in the first embodiment, in the case of a thin sample such as a cell, the influence of scattering is small, so that the first-order Born approximation (low contrast approximation) is established. Therefore, the following expression (20) can be obtained from the above expressions (17) to (19) by the first-order Born approximation.

[Expression 20]

$$I(x, y) = 2C \int\int d\xi d\eta \text{Re}[\tilde{o}(\xi, \eta) \tilde{o}^*(0, 0) TCC(\xi, \eta, 0, 0) \exp[ik(\xi x + \eta y)]] \quad (20)$$

In expression (20), the transmission cross coefficient TCC can be expressed as the following expression (21).

[Expression 21]

$$TCC(\xi, \eta, 0, 0) = \int\int d\xi_s d\eta_s S(\xi_s, d\eta_s) G(\xi + \xi_s, \eta + \eta_s) G^*(\xi, \eta) \quad (21)$$

A function obtained by performing the Fourier transform on TCC is referred to as EPSF. EPSF represents an effective point spread distribution. The effective point spread distribution EPSF can be expressed as the following expression (22).

[Expression 22]

$$EPSF(x, y) C \int\int d\xi d\eta TCC(\xi, \eta, 0, 0)[ik(\xi x + \eta y)] \quad (22)$$

Further, the complex amplitude transmittance o of the object can be approximated as the following expression (23).

[Expression 23]

$$o(x, y) = [1 + P(x, y)]\exp[i\Phi(x, y)] \simeq 1 + i\Phi(x, y) + P(x, y) \quad (23)$$

In expression (23), φ represents the phase of the object. P represents the amplitude of the object. The above expression (20) is expressed as the following expression (24) by using the expression (22) and the expression (23).

[Expression 24]

$$I(x, y) = 2C \int\int d\xi d\eta \text{Re}\begin{bmatrix} [\tilde{o}(\xi, \eta) + i\tilde{\phi}(\xi, \eta) + \tilde{P}(\xi, \eta)] \\ TCC(\xi, \eta, 0, 0) \\ \exp[ik(\xi x + \eta y)] \end{bmatrix}$$

$$= 2C \begin{bmatrix} \int\int dxdy \text{Re}[EPSF(x, y)] - \\ \phi(x, y) \otimes \text{Im}[EPSF(x, y)] + \\ P(x, y) \otimes \text{Re}[EPSF(x, y)] \end{bmatrix} \quad (24)$$

Here, TCC is changed to WOTF (Weak Object Transfer Function). WOTF is defined by the following expression (25). IDC-48E

[Expression 25]

$$WOTF(\xi, \eta) = \qquad (25)$$
$$TCC(\xi, \eta, 0, 0) = \int\int d\xi_s d\eta_s S(\xi_s, d\eta_s) G(\xi+\xi_s, \eta+\eta_s) G^*(\xi, \eta)$$

It is assumed that WOTF when defocused by $+\Delta z$ from the focusing position is expressed as the following expression (26).

[Expression 26]

$$WOTF(\xi, \eta)_{+\Delta z} = \int\int d\xi_z d\eta_z G(\xi+\xi_z, \eta+\eta_z) \qquad (26)$$
$$\exp\left[ik\Delta z\left(\sqrt{1-[(\xi+\xi_z)^2+(\eta+\eta_z)^2]}-1\right)\right]$$
$$S(\xi_z, \eta_z) G^*(\xi_z, \eta_z)\exp\left[-ik\Delta z\left(\sqrt{1-(\xi_z^2+\eta_z^2)}-1\right)\right]$$

By using the expression (26), it is possible to extend the expression of the intensity I(x, y) of the image of the two-dimensional object as the following expression (27).

[Expression 27]

$$I(x, y)_{+\Delta z} = 2C \int\int d\xi d\eta \qquad (27)$$
$$\text{Re}\left[\left[\delta(\xi, \eta) + i\tilde{\phi}(\xi, \eta) + \tilde{P}(\xi, \eta)\right] WOTF(\xi, \eta)_{+\Delta z} \exp[ik(\xi x + \eta y)]\right]$$

By using the expression (27), the two-dimensional phase distribution $\phi(x, y)$ in the object (that is, the sample SA) is found.

<First Method for Finding $\phi(x, y)$>

Figure 18:
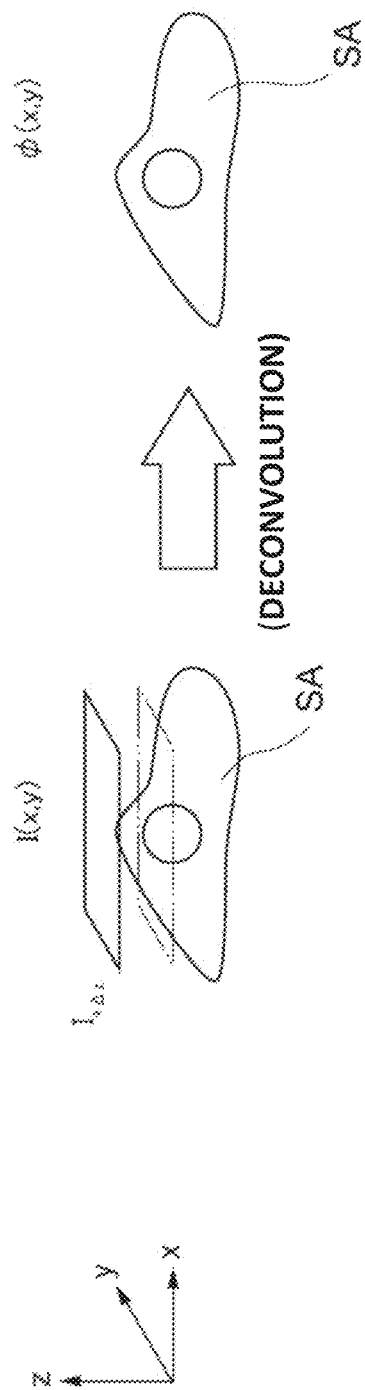
FIG. 18 is a schematic diagram showing a first method for performing deconvolution based on a defocused image of a sample.

A first method for finding a two-dimensional phase distribution $\phi(x, y)$ in the sample SA includes a method of finding a two-dimensional phase distribution $\phi(x, y)$ in the sample SA by using one defocused image of the sample SA or one in-focus image. FIG. 18 schematically shows a process of acquiring the intensity of one defocused image of the sample SA (the signal strength of a detection signal of the detector 60) and performing deconvolution. The intensity $I(x, y)_{+\Delta z}$ of an image of a two-dimensional object at a position apart from an focusing position by $+\Delta z$ (that is, one defocused image of the sample SA) is expressed by the above expression (27). Here, it is assumed that the change in amplitude of the sample is small and negligible. In other words, P is assumed to be equal to 0. In this case, when the above expression (27) is expressed in real space, the following expression (28) is obtained.

[Expression 28]

$$I(x, y)_{+\Delta z} = \qquad (28)$$
$$2C\left[\int\int dxdy \text{Re}[EPSF(x, y)_{+\Delta z}] - \phi(x, y) \otimes \text{Im}[EPSF(x, y)_{+\Delta z}]\right]$$

The first term of the expression (28) is a constant term representing the background intensity. The second term of the expression (28) represents that the imaginary part Im[EPSF] of EPSF is applied to the phase $\phi$ of the object (sample). First, both sides of the expression (28) are divided by this constant term to be normalized, and then the first term of the normalized expression (28) is removed in real space (or frequency space). Then, deconvolution is performed using Im[EPSF] to obtain the following expression (29).

[Expression 29]

$$\phi(x, y) = -\mathcal{F}^{-1}\left[\tilde{I}'_{+\Delta z} \frac{POTF(\xi, \eta)^*}{|POTF(\xi, \eta)|^2 + \gamma}\right] \qquad (29)$$

In expression (29), a function obtained by performing two-dimensional Fourier transform on Im[EPSF] is referred to as POTF (Phase Optical Transfer Function). The intensity of the image of the two-dimensional object is normalized by the constant term of expression (28) to be defined as I'. It is assumed that $\gamma$ takes any small value. The image processor 66 uses the expression (29) to calculate the two-dimensional phase distribution $\phi(x, y)$ in the sample SA from the intensity $I(x, y)_{+\Delta z}$ of one defocused image of the sample SA. As an example, the image processor 66 generates image data in which the brightness value of each pixel is set according to the phase value at each position of the calculated two-dimensional phase distribution in the calculated sample SA, that is, image data of the phase distribution of the sample SA.

The first method for finding the two-dimensional phase distribution $\phi(x, y)$ in the sample SA will be described for a case where one defocused image of the sample SA is used. When one in-focus image of the sample SA is used, $\Delta z=0$ may be set in the above expression (29). For example, when the illumination side modulation element 16 whose light transmittance changes according to a quadratic function (see FIG. 5) is arranged at the position P0 of the illumination pupil, the two-dimensional phase distribution $\phi(x, y)$ in the sample SA is found by using one defocused image of the sample SA. Further, for example, when the illumination side modulation element 16 whose light transmittance changes according to a sine function (see FIG. 7) is arranged at the position P0 of the illumination pupil, the two-dimensional phase distribution $\phi(x, y)$ in the sample SA is found by using one in-focus image of the sample SA.

<Second Method for Finding $\phi(x, y)$>

Figure 19:
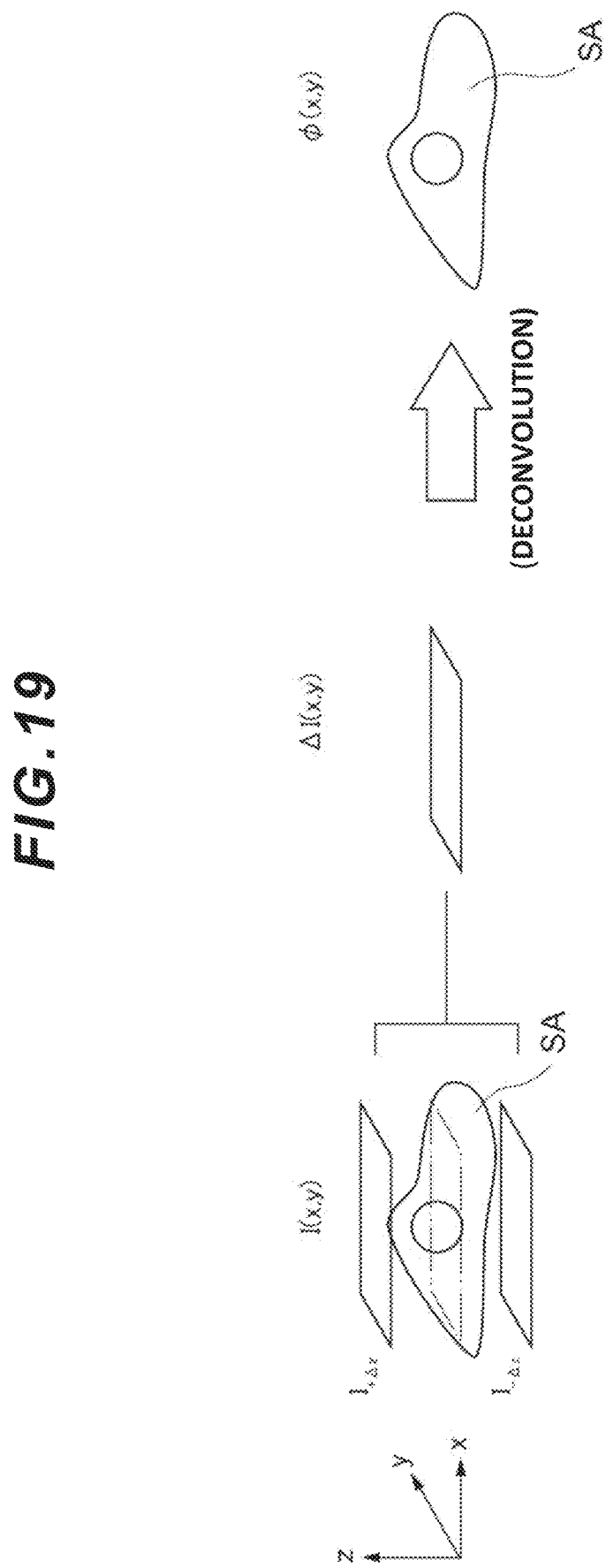
FIG. 19 is a schematic diagram showing a second method for performing deconvolution based on a defocused image of the sample.

A second method for finding the two-dimensional phase distribution $\phi(x, y)$ in the sample SA includes a method of the two-dimensional phase distribution $\phi(x, y)$ in the sample SA by using two defocused images of the sample SA. FIG. 19 schematically shows a process of acquiring the intensities of two defocused images of the sample SA (the signal strengths of detection signals of the detector 60), finding the difference between the intensities of the two defocused images and performing deconvolution. First, image formation in a case where z is shifted by only $\pm\Delta z$ is considered. Intensities $I(x, y)_{+\Delta z}$ and $I(x, y)_{-\Delta z}$ of images of a two-dimensional object at positions apart from the focusing position by $\pm\Delta z$ (that is, two defocused images of the sample SA) are represented by the following expressions (27) and (30).

[Expression 30]

$$I(x, y)_{+\Delta z} = 2C \int\int d\xi d\eta \qquad (27)$$
$$\text{Re}\left[\left[\delta(\xi, \eta) + i\tilde{\phi}(\xi, \eta) + \tilde{P}(\xi, \eta)\right] WOTF(\xi, \eta)_{+\Delta z} \exp[ik(\xi x + \eta y)]\right]$$

-continued $$I(x, y)_{-\Delta z} = 2C \int\int d\xi d\eta \quad (30)$$

$$\mathrm{Re}\big[[\delta(\xi, \eta) + i\tilde{\phi}(\xi, \eta) + \tilde{P}(\xi, \eta)] WOTF(\xi, \eta)_{-\Delta z} \exp[ik(\xi x + \eta y)]\big]$$

Here, it is assumed that the change in amplitude of the sample is small and negligible. In other words, P=0 is set. The first terms of the expressions (27) and (30) are constant terms representing background intensities. Therefore, the difference between the expression (27) and the expression (30) is found. As a result, the first terms of the expressions (27) and (30) cancel each other, and the following expression (31) is obtained.

[Expression 31]

$$I(x, y)_{+\Delta z} - I(x, y)_{-\Delta z} = \quad (31)$$

$$2C \int\int d\xi d\eta \mathrm{Re}\big[i\tilde{\phi}(\xi, \eta) WOTF'(\xi, \eta) \exp[ik(\xi x + \eta y)]\big]$$

In expression (31), the difference for WOTF is referred to as WOTF'. WOTF' can be expressed as the following expression (32).

[Expression 32]

$$WOTF'(\xi, \eta) = \int\int d\xi_z d\eta_z G(\xi + \xi_z, \eta + \eta_z) S(\xi_z, \eta_z) \quad (32)$$

$$G^*(\xi_z, \eta_z)\Big[\exp\big[ik\Delta z\big(\sqrt{1 - [(\xi+\xi_z)^2 + (\eta+\eta_z)^2]} - 1\big)\big]$$

$$\exp\big[-ik\Delta z\big(\sqrt{1 - (\xi_z^2 + \eta_z^2)} - 1\big)\big] -$$

$$\exp\big[-ik\Delta z\big(\sqrt{1 - [(\xi+\xi_z)^2 + (\eta+\eta_z)^2]} - 1\big)\big]$$

$$\exp\big[ik\Delta z\big(\sqrt{1 - (\xi_z^2 + \eta_z^2)} - 1\big)\big]\Big] =$$

$$\int\int d\xi_z d\eta_z G(\xi + \xi_z, \eta + \eta_z) S(\xi_z, \eta_z) G^*(\xi_z, \eta_z) \times 2i \sin k$$

$$\Delta z\Big(\sqrt{1 - [(\xi+\xi_z)^2 + (\eta+\eta_s)^2]} - \sqrt{1 - (\xi_z^2 + \eta_z^2)}\Big)$$

When the above expression (31) is expressed in real space, the following expression (33) is obtained.

[Expression 33]

$$I(x, y)_{+\Delta z} - I(x, y)_{-\Delta z} = -2C\phi(x, y) \otimes \mathrm{Im}[EPSF'(x, y)] \quad (33)$$

After dividing both sides of the expression (33) by a constant term, deconvolution is performed by using ImEPSF' to obtain the following expression (34).

[Expression 34]

$$\phi(x, y) = -\mathcal{F}^{-1}\left[(I'_{+\Delta z} - I'_{-\Delta z}) \frac{POTF'(\xi, \eta)^*}{|POTF'(\xi, \eta)|^2 + \gamma}\right] \quad (34)$$

This is a method for finding a two-dimensional phase distribution in arbitrary spatial coherence. The image processor 66 uses the expression (34) to calculate the two-dimensional phase distribution φ(x, y) from the intensity I(x, y)$_{+\Delta z}$ and I(x, y)$_{-\Delta z}$ of the two defocused images of the sample SA. As an example, the image processor 66 generates image data in which the brightness value of each pixel is set according to the phase value at each position of the calculated two-dimensional phase distribution in the sample SA, that is, image data of the phase distribution of the sample SA.

Note that the two-dimensional phase distribution φ(x, y) in the sample SA can be found by using two defocused images and one in-focus image without limiting to only the two defocused images. In this case, when normalization is performed in the expression (33), the intensity of an in-focus image with Δz=0 is used.

In the second embodiment, in a case where the aperture shape at the position of the pupil is circular as in the prior art, when the contrast of an image (picture) of the sample SA by bright field observation lowers as a result of increasing the illumination σ (making illumination σ close to 1) in order to improve the resolution, the obtainable dynamic range of the phase at each position of the sample SA is narrowed. In other words, the contrast of the image of the phase distribution in the sample SA lowers. On the contrary, when the resolution of the image (picture) of the sample SA by bright field observation lowers as a result of reducing the illumination σ in order to improve the contrast, it is not possible to find a fine change in phase at each position of the sample SA. In other words, the resolution (resolving power) of the image of the phase distribution in the sample SA lowers. Therefore, it is difficult to find a fine change in phase with a wide dynamic range of phase. In other words, it is difficult to obtain an image of the phase distribution in the sample SA, which has both high contrast and high resolution (resolving power).

In the present embodiment, the illumination side modulation element 16 whose light transmittance changes within the surface of the illumination pupil is provided at the position P0 of the illumination pupil in the transmitted illumination optical system 10. Further, the detection side modulation element 53 whose light transmittance changes within the surface conjugate with the detection pupil is provided at the position P2 conjugate to the detection pupil in the detection optical system 40. As a result, according to the present embodiment, even in a state where the illumination σ is large and the resolution of the image (picture) of the sample SA by bright field observation is high, the contrast is maintained in a high state, so that it is possible to obtain a two-dimensional phase distribution that has a wide dynamic range of phase and represents a fine change in phase in the sample SA. In other words, it is possible to obtain an image of a phase distribution in the sample SA, which has both high contrast and high resolution (resolving power).

Figure 20A:
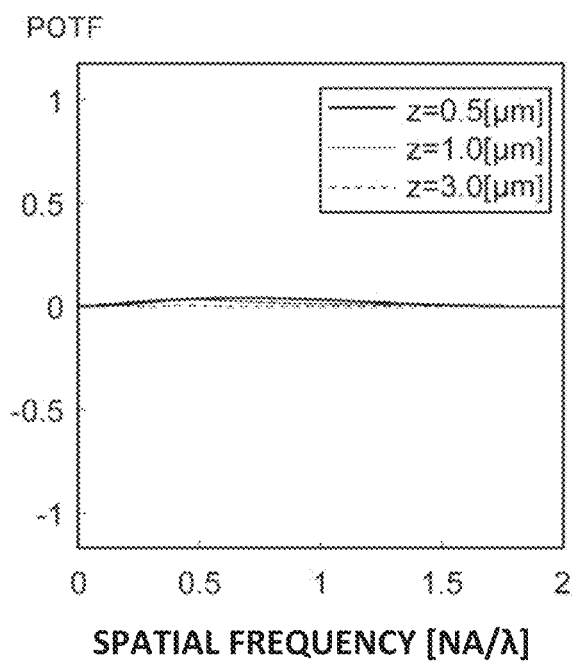
FIG. 20A is a diagram showing the gain of POTF in the case of the shape of a conventional pupil.

FIG. 8A shows a case where the light transmittances at the position P0 of the illumination pupil and the position P2 conjugate with the detection pupil are equal to 100% (constant) within the surface of the illumination pupil and the surface conjugate with the detection pupil as in the prior art. In this case, the light transmittance distribution is similar to that of the conventional circular aperture stop. FIG. 20A shows the gain of POTF in the case of FIG. 8A. In FIG. 20A, the illumination σ=0.95 is set. In the graph showing the gain of POTF, the amount of defocus is represented by Δz. In a case where the light transmittance at the position of the pupil is equal to 100% (constant) within the surface of the pupil as in the prior art, it can be seen from FIG. 20A that when the illumination σ increases up to 0.95, the value of POTF in the entire band in the frequency space is almost 0 in any of Δz=0.5 [μm], Δz=1.0 [μm], and Δz=3.0 [μm]. Therefore, the contrast of the image (picture) of the sample SA by bright field observation is low, and the obtainable dynamic range of the phase at each position of the sample SA narrows (the contrast of the image of the phase distribution lowers). In other words, it is difficult to generate an image having a two-dimensional phase distribution in the sample SA, which has both high contrast and high resolution (resolving power).

Figure 20B:
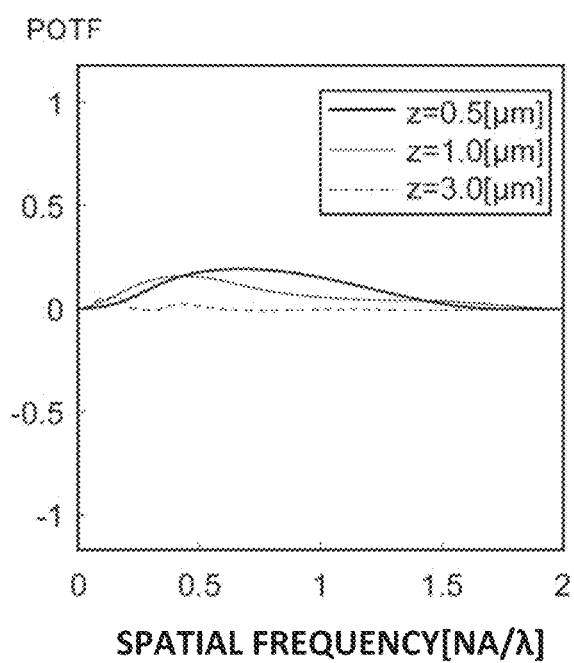
FIG. 20B is a diagram showing the gain of POTF in a case where the light transmittance of the illumination side modulation element changes according to a cosine function.

FIG. 9A shows a case where the light transmittance of the illumination side modulation element 16 provided at the position P0 of the illumination pupil changes according to a cosine function as shown in FIG. 5, and the light transmittance at the position P2 conjugate with the detection pupil as in the prior art is equal to 100% (constant) within the surface conjugate with the detection pupil. FIG. 20B shows the gain of POTF in the case of FIG. 9A. In FIG. 20B, the illumination σ=0.95 is set. From FIG. 20B, when the light transmittance of the illumination side modulation element 16 provided at the position P0 of the illumination pupil changes according to a cosine function as shown in FIG. 5, the value of POTF in a wide frequency band is high in spite of increase of the illumination σ up to 0.95. Further, it can be seen that the value of POTF shown in FIG. 20B is larger than the value of POTF in the prior art shown in FIG. 20A in the entire band in the frequency space. Therefore, the contrast of the image (picture) of the sample SA by bright field observation is high, and the obtainable dynamic range of the phase at each position of the sample SA widens (the contrast of the image of the phase distribution is enhanced). In other words, it is possible to generate an image having a two-dimensional phase distribution in the sample SA, which has both high contrast and high resolution (resolving power).

In the present embodiment, there has been described the case where the light transmittance of the illumination side modulation element 16 provided at the position P0 of the illumination pupil changes according to a cosine function as shown in FIG. 5, and the light transmittance at the position P2 conjugate with the detection pupil is equal to 100% (constant) within the surface conjugate with the detection pupil as in the prior art. However, the present invention is not limited to this manner. For example, the light transmittance at the position P0 of the illumination pupil or the position P2 conjugate with the detection pupil may be changed by using the illumination side modulation element 16 or the detection side modulation element 53 described with reference to FIGS. 10 to 14 in the first embodiment.

Figure 21:
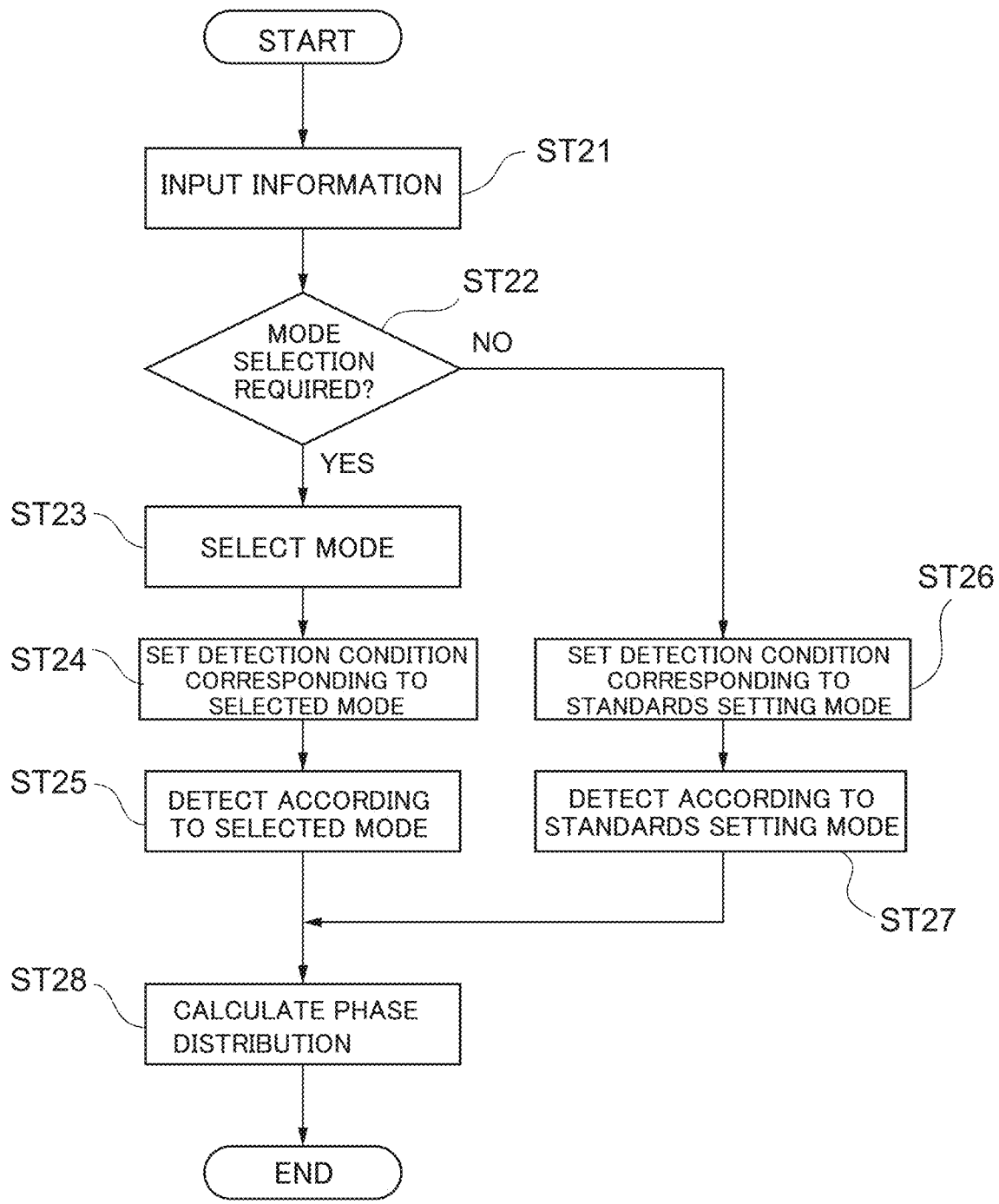
FIG. 21 is a flowchart showing a data generation method according to a second embodiment.

Next, a method for generating data of phase in a microscope device according to the second embodiment will be described. FIG. 21 is a flowchart showing the data generation method according to the second embodiment. It is assumed that the sample SA is placed on the stage 2 in advance. The control part 65 reads out the control program stored in the storage part and executes various processing according to the control program. This control program causes a computer to execute control processing for controlling the detector 60 for detecting light from the sample SA and data processing for generating image data relating to the sample SA by the image processor 66.

In step ST21, as in the first embodiment, information on the setting of the microscope device 1 is input via the operation input part 67. In step ST22, it is determined whether an operation for selecting a mode has been performed as in the first embodiment. If the determination is YES, the processing proceeds to step ST23. If the determination is NO, the processing proceeds to step ST26.

If the determination in step ST22 is YES, any mode selected from a plurality of modes (for example, the above-mentioned contrast priority mode, resolution priority mode, and balance mode) by the user is input in step ST23 as in the first embodiment. In step ST24, as in the first embodiment, the control part 65 sets a detection condition corresponding to the mode input in step ST23.

In step ST25, under the detection condition corresponding to the mode selected by the user, the transmitted illumination optical system 10 illuminates the sample SA, and the detector 60 detects the detection light from the sample SA via the detection optical system 40. In the following steps, a case where $\phi(x, y)$ is found by the above-mentioned first method will be described. The control part 65 calculates a defocus amount $\Delta z$ by which the image of the sample SA is defocused, according to the combination of the condenser lens 18 and the objective lens 22. The control part 65 controls the stage driver 3, the detector 60, and the like so that the intensity of one defocused image or one in-focus image of the sample SA (the signal strength of the detection signal of the detector 60) can be obtained with the calculated defocus amount $\Delta z$. When the processing of step ST25 is terminated, the processing proceeds to step ST28.

When the determination in step ST22 is NO, the control part 65 sets the detection condition corresponding to the standards setting mode in step ST26 as in the first embodiment. In step ST27, under the detection condition corresponding to the standards setting mode, the transmitted illumination optical system 10 illuminates the sample SA and the detector 60 detects the detection light from the sample SA via the detection optical system 40. At this time, the control part 65 controls the stage driver 3, the detector 60, and the like so that the intensity of one defocused image or one in-focus image of the sample SA (the signal strength of the detection signal of the detector 60) can be obtained with the defocus amount $\Delta z$ corresponding to the standards setting mode. When the processing of step ST27 is terminated, the processing proceeds to step ST28.

In step ST28, the image processor 66 finds a two-dimensional phase distribution in the sample SA based on the detection signal output from the detector 60, and generates image data of the two-dimensional phase distribution in the sample SA. At this time, as described above, the image processor 66 uses the above expression (29) to calculate the two-dimensional phase distribution $\phi(x, y)$ in the sample SA from the intensity $I(x, y)_{+\Delta z}$ of one defocused image or one in-focus image of the sample SA. Further, the image processor 66 generates image data of the sample SA by bright field observation based on the detection signal output from the detector 60. The image display part 70 displays an image of the two-dimensional phase distribution in the sample SA based on the image data of the two-dimensional phase distribution in the sample SA generated by the image processor 66. The image display part 70 displays an image of the sample SA by bright field observation based on the image data of the sample SA by bright field observation generated by the image processor 66.

In the above-mentioned flow, the case where $\phi(x, y)$ is found by the first method has been described, but a similar flow is also used when $\phi(x, y)$ is found by the second method. Here, a different point from the first method when $\phi(x, y)$ is found by the second method will be described.

In step ST25, the control part 65 calculates a defocus amount $\Delta z$ by which the image of the sample SA is defocused, according to the combination of the condenser lens 18 and the objective lens 22. The control part 65 controls the stage driver 3, the detector 60, and the like so that the intensities of two defocused images of the sample SA (the signal intensity of the detection signal of the detector 60) can be obtained with the calculated defocus amount Δz. In step ST27, the control part 65 controls the stage driver 3, the detector 60, and the like so that the intensities of two defocused images of the sample SA (the signal intensity of the detection signal of the detector 60) can be obtained with the defocus amount Δz corresponding to the standards setting mode. In step ST28, the image processor 66 uses the above expression (34) to calculate the two-dimensional phase distribution $\phi(x, y)$ in the sample SA from the intensities $I(x, y)_{+\Delta z}$ and $I(x, y)_{-\Delta z}$ of the two defocused images of the sample SA.

In the flow of FIG. 21, the processing of step ST22 may be omitted. For example, the processing of steps ST22 to ST25 may be omitted, and after the processing of step ST21, the processing of step ST28 may be executed subsequently to the processing of step ST26 and step ST27. Further, the processing of step ST22, step ST26 and step ST27 may be omitted, and after the processing of step ST21, the processing of step ST28 may be executed subsequently to the processing of steps ST23 to ST25.

In the flow of FIG. 21, under the detection condition corresponding to the mode selected by the user or the standards setting mode, the transmitted illumination optical system 10 illuminates the sample SA, and the detector 60 detects the detection light from the sample SA via the detection optical system 40. However, the present invention is not limited to this manner. For example, the user may perform a setting operation on the operation input part 67 or the like to directly perform the setting of a detection condition (the setting for selecting at least one of the illumination side modulation element 16 and the detection side modulation element 53), whereby under the set detection condition, the transmitted illumination optical system 10 illuminates the sample SA, and the detector 60 detects the detection light from the sample SA via the detection optical system 40.

Third Embodiment

Figure 22:
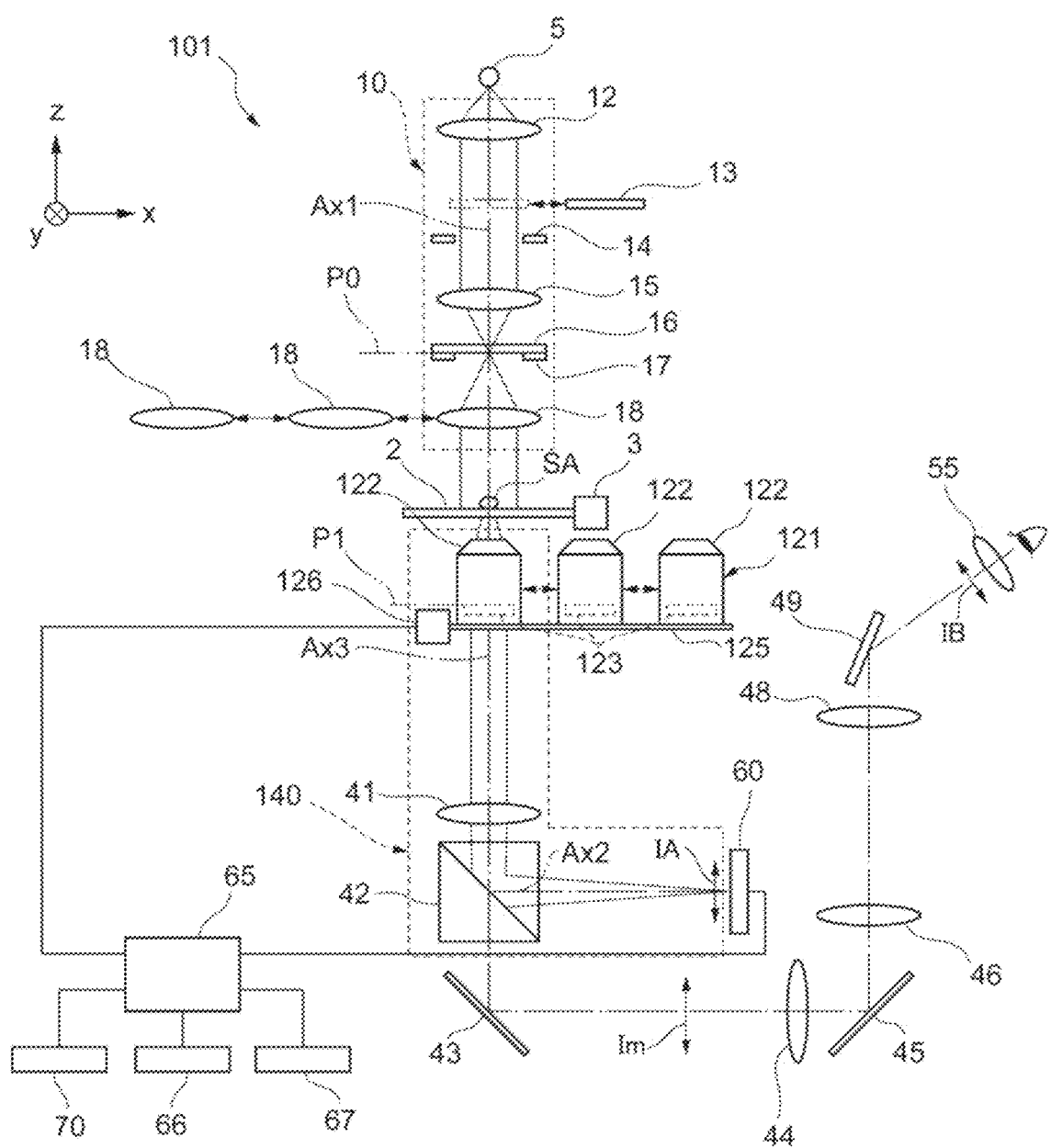
FIG. 22 is a diagram showing a schematic configuration of a microscope device according to a third embodiment.

Next, a microscope device 101 according to a third embodiment will be described with reference to FIG. 22. The microscope device 101 according to the third embodiment has mainly the same configuration as the microscope device 1 according to the first embodiment, except for the detection optical system. Therefore, the same components as those of the first embodiment are designated by the same reference numerals and characters as those in the first embodiment, and detailed description thereof will be omitted. The microscope device 101 according to the third embodiment comprises a stage 2, a transmitted illumination light source 5, a transmitted illumination optical system 10, a detection optical system 140, a detector 60, a control part 65, an image processor 66, an operation input part 67, and an image display part 70.

The detection optical system 140 comprises an objective lens unit 121, a first imaging lens 41, and a half mirror 42 in this order from the sample SA side. Further, a first mirror 43, a lens 44, a second mirror 45, a collimator lens 46, a second imaging lens 48, a third mirror 49, and an eyepiece 55 are arranged on the optical path of light transmitted through the half mirror 42.

The objective lens unit 121 comprises a plurality of objective lenses 122, a lens holder 125, and a unit driver 126. The objective lenses 122 are arranged below the stage 2 so as to face the stage 2. The lens holder 125 holds the plurality of objective lenses 122 having different focal lengths. The lens holder 125 is configured by using, for example, a revolver, a turret, or the like. The unit driver 126 drives the lens holder 125 so that one of the plurality of objective lenses 122 can be selected and arranged below the stage 2.

A detection side modulation element 123 is provided at the position of the pupil of the objective lens 122 (the position of the detection pupil) P1. More specifically, the detection side modulation element 123 is incorporated in the objective lens 122. A surface perpendicular to an optical axis Ax3 of the objective lens 122 at the position P1 of the detection pupil is referred to as a surface of the detection pupil. The detection side modulation elements 123 are formed in the same manner as the illumination side modulation element 16 and the detection side modulation element 53 of the first embodiment except that the light transmittance changes within the surface of the detection pupil. When the detection side modulation element 123 is incorporated in the objective lens 122, a mechanism (not shown) for holding the detection side modulation element 123 detachably in each of the objective lenses having different focal lengths may be provided. By providing this mechanism, it is possible to change the detection side modulation elements 123 which are different in light transmittance distribution among the objective lenses (that is, it is possible to change the light transmittance distribution within the surface of the detection pupil without changing the focal length).

The ratio of the transmittance and reflectance of the half mirror 42 is set to, for example, 1:1. A part of light incident on the half mirror 42 is reflected by the half mirror 42 and forms an image on a predetermined first image surface IA. Here, the position of the predetermined first image surface IA is a position conjugate with the focal position of the objective lens 122. The detector 60 is arranged on the first image surface IA of the detection optical system 140. The other part of the light incident on the half mirror 42 passes through the half mirror 42 and is reflected by the first mirror 43. The light reflected by the first mirror 43 forms an image on a predetermined intermediate image surface IM, and is incident on the lens 44. The light transmitted through the lens 44 is reflected by the second mirror 45, and incident on the collimator lens 46. The light transmitted through the collimator lens 46 is incident as parallel light on the second imaging lens 48. The light transmitted through the second imaging lens 48 is reflected by the third mirror 49, and forms an image on a predetermined second image surface IB. Here, the position of the predetermined second image surface IB is a position conjugate with the focal position of the objective lens 122. An observer can observe an image of the sample SA which is formed on the second image surface IB by using the eyepiece 55.

When bright field observation is performed in the present embodiment, the transmitted illumination optical system 10 illuminates the sample SA on the stage 2 with illumination light from the transmitted illumination light source 5 as in the first embodiment. Detection light transmitted through or diffracted from the sample SA is incident on the objective lens 122 of the detection optical system 140. The detection light incident on the objective lens 122 is transmitted through the detection side modulation element 123, and emitted to the first imaging lens 41. The detection light emitted from the objective lens 122 is incident on the first imaging lens 41. The detection light transmitted through the first imaging lens 41 is incident on the half mirror 42. A part of the detection light incident on the half mirror 42 is reflected by the half mirror 42 and forms an image on a predetermined first image surface IA on which the detector 60 is arranged. The other part of the detection light incident on the half mirror 42 passes through the half mirror 42 and is reflected by the first mirror 43. The detection light reflected by the first mirror 43 forms an image on a predetermined intermediate image surface IM, and is incident on the lens 44. The detection light transmitted through the lens 44 is reflected by the second mirror 45, and incident on the collimator lens 46. The detection light transmitted through the collimator lens 46 is incident as parallel light on the second imaging lens 48. The detection light transmitted through the second imaging lens 48 is reflected by the third mirror 49, and forms an image on a predetermined second image surface IB.

In the case of bright field observation, the detector 60 detects detection light from the sample SA via the detection optical system 140 and outputs the detection signal of the detection light. The image processor 66 generates data indicating a refractive index distribution in the sample SA (as an example, image data of a three-dimensional refractive index distribution in the sample SA) based on the detection signal of the detection light output from the detector 60. Further, the image processor 66 generates image data of the sample SA by bright field observation based on the detection signal of the detection light output from the detector 60. In the third embodiment, the image processor 66 fines a three-dimensional refractive index distribution in the sample SA, and generates image data of the three-dimensional refractive index distribution in the sample SA as in the first embodiment. As a result, according to the third embodiment, the same effect as that of the first embodiment can be obtained.

Fourth Embodiment

Next, a microscope device according to a fourth embodiment will be described. The microscope device according to the fourth embodiment has the same configuration as that of the microscope device 101 according to the third embodiment except for the processing in the image processor 66. Therefore, the same components as those of the first and third embodiments are designated by the same reference numerals and characters as those of the first and third embodiments, and detailed description thereof are omitted. In the fourth embodiment, in the case of bright field observation, the detector 60 detects detection light from the sample SA via the detection optical system 140 and outputs the detection signal of the detection light as in the third embodiment.

The image processor 66 generates data representing a phase distribution in the sample SA (as an example, image data of a two-dimensional phase distribution in the sample SA) based on the detection signal of the detection light output from the detector 60. Further, the image processor 66 generates image data of the sample SA by bright field observation based on the detection signal of the detection light output from the detector 60. In the fourth embodiment, the image processor 66 finds a two-dimensional phase distribution in the sample SA and generates image data of the two-dimensional phase distribution in the sample SA as in the second embodiment. As a result, according to the fourth embodiment, the same effect as that of the second embodiment can be obtained.

Fifth Embodiment

Figure 23:
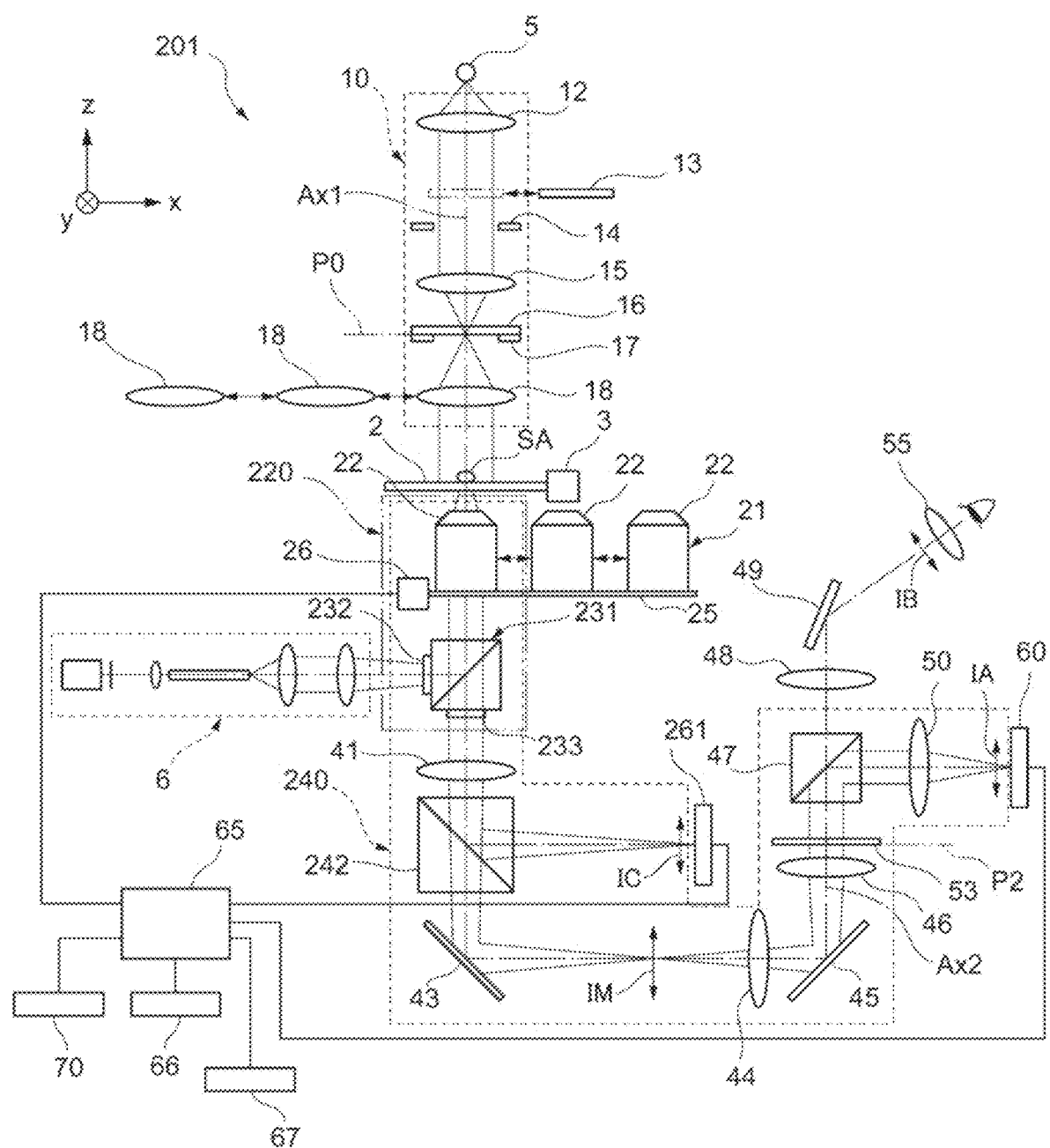
FIG. 23 is a diagram showing a schematic configuration of a microscope device according to a fifth embodiment.

Next, a microscope device 201 according to a fifth embodiment will be described with reference to FIG. 23. The microscope device 201 according to the fifth embodiment has the same configuration as the microscope device 1 according to the first embodiment except for the epi-illumination optical system, the detection optical system, and the detector. Therefore, the same components as those in the first embodiment are designated by the same reference numerals and characters as those in the first embodiment, and detailed description thereof are omitted. The microscope device 201 according to the fifth embodiment comprises a stage 2, a transmitted illumination light source 5, an epi-illumination light source 6, a transmitted illumination optical system 10, an epi-illumination optical system 220, a detection optical system 240, detector 60, a second detector 261, a control part 65, an image processor 66, an operation input part 67, and an image display part 70.

The epi-illumination optical system 220 comprises an objective lens unit 21 and a filter cube 231 in this order from the sample SA side. The filter cube 231 is always inserted into the optical path of the detection optical system 240 including the epi-illumination optical system 220. The filter cube 231 reflects excitation light emitted from the epi-illumination light source 6 toward the stage 2. The filter cube 231 transmits therethrough fluorescence generated in the sample SA on the stage 2 by the irradiation of the excitation light from the epi-illumination light source 6 to the first imaging lens 41. The filter cube 231 transmits therethrough light (detection light) transmitted or diffracted through the sample SA by irradiation of illumination light from the transmitted illumination optical system 10. The filter cube 231 includes an excitation filter 232 for transmitting therethrough the excitation light from the epi-illumination light source 6. The filter cube 231 includes an absorption filter 233 for absorbing the excitation light reflected by the sample SA, the stage 2, and the like. The absorption filter 233 transmits the fluorescence and the detection light from the sample SA.

The detection optical system 240 comprises the objective lens unit 21 and the filter cube 231. The configurations other than the objective lens unit 21 and the filter cube 231 in the detection optical system 240 are the same as the configurations of the detection optical system 40 of the first embodiment except that a dichroic filter 242 is arranged between a first imaging lens 41 and a first mirror 43.

The dichroic filter 242 separates light according to the difference in wavelength of light. Specifically, the fluorescence emitted from the sample SA (due to the irradiation of the excitation light from the epi-illumination optical system 20) as a part of light incident on the dichroic filter 242 is reflected by the dichroic filter 242 to form an image on a predetermined third image surface IC. Here, the position of the predetermined third image surface IC is a position conjugate with the focal position of the objective lens 22. A second detector 261 is arranged on the third image surface IC of the detection optical system 240. Light (detection light) transmitted or diffracted through the sample SA (due to irradiation of illumination light from the transmitted illumination optical system 10) as the other part of the light incident on the dichroic filter 242 is transmitted through the dichroic filter 242, and reflected by the first mirror 43. The detection light reflected by the first mirror 43 forms an image on a predetermined first image surface IA on which the detector 60 is arranged as in the first embodiment. An imaging element such as CCD or CMOS is used for the second detector 261.

Not limited to the dichroic filter 242, a half mirror may be used. In this case, a barrier filter is used together with the half mirror. Specifically, a first barrier filter for absorbing a part (the detection light from the sample SA) of the light reflected from the half mirror is provided, and a second barrier filter for absorbing a part (the fluorescence from the sample SA) of the light transmitted through the half mirror is provided. This configuration makes it possible for the second detector 261 to capture an image caused by the fluorescence from the sample SA, which is reflected from the half mirror, and also makes it possible for the detector 60 to capture an image caused by the detection light from the sample SA, which is transmitted through the half mirror.

In the present embodiment, the transmitted illumination optical system 10 illuminates the sample SA on the stage 2 with illumination light from the transmitted illumination light source 5 as in the first embodiment. The detector 60 detects detection light from the sample SA via the detection optical system 240, and outputs the detection signal of the detection light. In the detection optical system 240 of the present embodiment, the detection light from the sample SA is incident on the objective lens 22. The detection light transmitted through the objective lens 22 is incident on the filter cube 231. The detection light incident on the filter cube 231 is transmitted through the filter cube 231, passes through the absorption filter 233, and then is incident on the first imaging lens 41. The detection light transmitted through the first imaging lens 41 is incident on the dichroic filter 242. The detection light incident on the dichroic filter 242 is transmitted through the dichroic filter 242, and is reflected by the first mirror 43. The detection light reflected by the first mirror 43 forms an image on the predetermined first image surface IA on which the detector 60 is arranged as in the first embodiment.

As in the first embodiment, the epi-illumination optical system 220 illuminates the sample SA on the stage 2 with the excitation light from the epi-illumination light source 6. The second detector 261 detects the fluorescence from the sample SA via the detection optical system 240, and outputs the detection signal of the fluorescence. In the detection optical system 240 of the present embodiment, the fluorescence from the sample SA is incident on the objective lens 22. The fluorescence transmitted through the objective lens 22 is incident on the filter cube 231. The fluorescence incident on the filter cube 231 is transmitted through the filter cube 231, passes through the absorption filter 233, and then is incident on the first imaging lens 41. The fluorescence transmitted through the first imaging lens 41 is incident on the dichroic filter 242. The fluorescence incident on the dichroic filter 242 is reflected by the dichroic filter 242, and forms an image on the predetermined third image surface IC on which the second detector 261 is arranged.

The image processor 66 generates data indicating a refractive index distribution in the sample SA (as an example, image data of a three-dimensional refractive index distribution in the sample SA) based on the detection signal of the detection light output from the detector 60. Further, the image processor 66 generates image data of the sample SA by bright field observation based on the detection signal of the detection light output from the detector 60. The image processor 66 generates image data of the sample SA by fluorescence observation based on the detection signal of fluorescence output from the second detector 261. In the fifth embodiment, as in the first embodiment, the image processor 66 finds a three-dimensional refractive index distribution in the sample SA and generates image data of the three-dimensional refractive index distribution in the sample SA. As a result, according to the fifth embodiment, the same effect as that of the first embodiment can be obtained. In the fifth embodiment, the detector 60 detects the detection light from the sample SA via the detection optical system 240, and the second detector 261 detects the fluorescence from the sample SA via the detection optical system 240. Therefore, it is possible to generate an image of the three-dimensional refractive index distribution in the sample SA and an image of the sample SA by fluorescence observation at the same time, allowing the user to observe and compare both the images.

Sixth Embodiment

Next, a microscope device according to a sixth embodiment will be described. The microscope device according to the sixth embodiment has the same configuration as the microscope device 201 according to the fifth embodiment except for the processing in the image processor 66. Therefore, the same components as those of the first and fifth embodiments are designated by the same reference numerals and characters as those of the first and fifth embodiments, and detailed description thereof are omitted. In the sixth embodiment, the transmitted illumination optical system 10 illuminates the sample SA on the stage 2 with illumination light from the transmitted illumination light source 5 as in the fifth embodiment. As in the fifth embodiment, the detector 60 detects detection light from the sample SA via the detection optical system 240 and outputs the detection signal of the detection light. As in the fifth embodiment, the epi-illumination optical system 220 illuminates the sample SA on the stage 2 with excitation light from the epi-illumination light source 6. As in the fifth embodiment, the second detector 261 detects fluorescence from the sample SA via the detection optical system 240 and outputs the detection signal of the fluorescence.

The image processor 66 generates data representing a phase distribution in the sample SA (as an example, image data of a two-dimensional phase distribution in the sample SA) based on the detection signal of the detection light output from the detector 60. Further, the image processor 66 generates image data of the sample SA by bright field observation based on the detection signal of the detection light output from the detector 60. The image processor 66 generates image data of the sample SA by fluorescence observation based on the detection signal of fluorescence output from the second detector 261. In the sixth embodiment, the image processor 66 finds a two-dimensional phase distribution in the sample SA and generates image data of the two-dimensional phase distribution in the sample SA, as in the second embodiment. As a result, according to the sixth embodiment, the same effect as that of the second embodiment can be obtained. Further, in the sixth embodiment, as in the fifth embodiment, it is possible to generate an image of the two-dimensional phase distribution in the sample SA and an image of the sample SA by fluorescence observation at the same time, allowing the user to observe and compare both the images.

Seventh Embodiment

Figure 24:
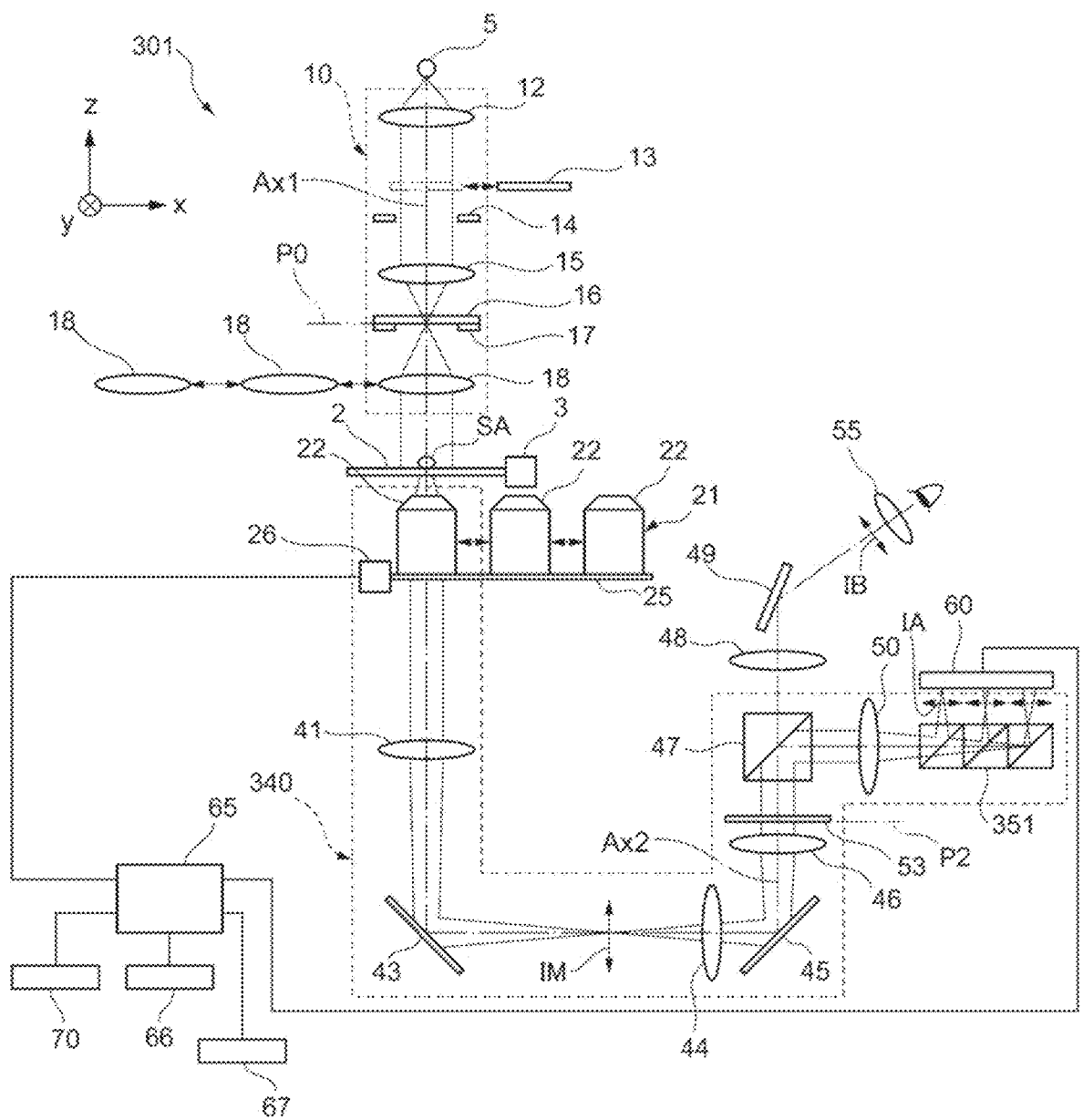
FIG. 24 is a diagram showing a schematic configuration of a microscope device according to a seventh embodiment.

Next, a microscope device 301 according to a seventh embodiment will be described with reference to FIG. 24. The microscope device 301 according to the seventh embodiment has mainly the same configuration as the microscope device 1 according to the first embodiment, except for the detection optical system. Therefore, the same components as those in the first embodiment are designated by the same reference numerals and characters as those in the first embodiment, and detailed description thereof are omitted. The microscope device 301 according to the seventh embodiment comprises a stage 2, a transmitted illumination light source 5, a transmitted illumination optical system 10, a detection optical system 340, a detector 60, a control part 65, an image processor 66, an operation input part 67, and an image display part 70.

The detection optical system 340 comprises an objective lens unit 21, a first imaging lens 41, a first mirror 43, a lens 44, a second mirror 45, a collimator lens 46, and a half mirror 47 in this order from the sample SA side. Further, the detection optical system 340 includes a third imaging lens 50, an optical path splitting member 351, and a detection side modulation element 53. Further, a second imaging lens 48, a third mirror 49, and an eyepiece 55 are arranged on an optical path of light transmitted through the half mirror 47.

The optical path splitting member 351 is arranged between the third imaging lens 50 and the predetermined first image surface IA. The optical path splitting member 351 splits the optical path between the third imaging lens 50 and the detector 60 into three optical paths which are different in optical path length from one another. The optical path splitting member 351 is configured by using, for example, a triple prism, and has three reflecting surfaces. Light incident on the optical path splitting member 351 reaches a first reflecting surface of the optical path splitting member 351. A part of light that has reached the first reflecting surface is reflected by the first reflecting surface, and forms an image on one end side (left side in FIG. 24) of the first image surface IA. The other part of the light that has reached the first reflecting surface is transmitted through the first reflecting surface and reaches the second reflecting surface. A part of the light that has reached the second reflecting surface is reflected by the second reflecting surface and forms an image at the center of a first image surface IA. The other part of the light that has reached the second reflecting surface is transmitted through the second reflecting surface, and is reflected by the third reflecting surface. The light reflected by the third reflecting surface forms an image on the other end side (right side of FIG. 24) of the first image surface IA. In this way, the light split by the optical path splitting member 351 forms three defocused images arranged in parallel on the first image surface IA. These three defocused images have defocus amounts which are different from one another according to the difference in the optical path length. The ratio of the transmittance and reflectance of the first reflecting surface in the optical path splitting member 351 is set to, for example, 2:1. The ratio of the transmittance and reflectance of the second reflecting surface in the optical path splitting member 351 is set to, for example, 1:1. The ratio of the transmittance and reflectance of the third reflecting surface in the optical path splitting member 351 is set to, for example, 0:1. As a result, the three defocused images can be made equal in brightness.

When bright field observation is performed in the present embodiment, the transmitted illumination optical system 10 illuminates the sample SA on the stage 2 with the illumination light from the transmitted illumination light source 5 as in the first embodiment. The detection light transmitted or diffracted through the sample SA is incident on the objective lens 22 of the detection optical system 340. The detection light transmitted through the objective lens 22 is incident on the first imaging lens 41. The detection light transmitted through the first imaging lens 41 is reflected by the first mirror 43 to form an image on a predetermined intermediate image surface IM, and is incident on the lens 44. The detection light transmitted through the lens 44 is reflected by the second mirror 45, and incident on the collimator lens 46. The detection light transmitted through the collimator lens 46 passes as parallel light through the detection side modulation element 53, and is incident on the half mirror 47. A part of the detection light incident on the half mirror 47 is reflected by the half mirror 47, and incident on the third imaging lens 50. The detection light transmitted through the third imaging lens 50 is incident on the optical path splitting member 351. The detection light split by the optical path splitting member 351 forms three defocused images arranged in parallel on the first image surface IA. The other part of the detection light incident on the half mirror 47 is transmitted through the half mirror 47, and incident on the second imaging lens 48. The detection light transmitted through the second imaging lens 48 is reflected by the third mirror 49, and forms an image on a predetermined second image surface IB.

In the case of bright field observation, the detector 60 detects detection light from the sample SA via the detection optical system 340, and outputs the detection signal of the detection light. The image processor 66 generates data representing a refractive index distribution in the sample SA (as an example, image data of a three-dimensional refractive index distribution in the sample SA) based on the detection signal of the detection light output from the detector 60. In the seventh embodiment, as in the first embodiment, the image processor 66 finds a three-dimensional refractive index distribution in the sample SA, and generates image data of the three-dimensional refractive index distribution in the sample SA. As a result, according to the seventh embodiment, the same effect as that of the first embodiment can be obtained. In the seventh embodiment, three defocused images having different defocus amounts are formed on the first image surface IA. As a result, each time the detector 60 detects detection light from the sample SA once (that is, each time an image of the sample SA is picked up once), the intensities of three defocused images (the signal strengths of detection signals of the detector 60) can be acquired as images of three cross sections in a z-stack image of the sample SA (images of a plurality of cross sections at different positions in the z-direction of the sample SA (that is, different positions in the optical axis direction)). Therefore, the intensity of the image of each cross section of the sample SA in the z-stack image of the sample SA can be acquired in a short time, and a three-dimensional refractive index distribution in the sample SA can be acquired in a short time.

Note that the image processor 66 may generate image data of the sample SA by bright field observation based on the detection signal of the detection light output from the detector 60. As described above, the three defocused images having different defocus amounts are formed on the first image surface IA. Therefore, the image processor 66 can generate a defocused image of the sample SA by bright field observation based on the three defocused images, and can also generate an in-focus image of the sample SA by bright field observation.

Further, the case where the optical path splitting member 351 is used has been described as a method for acquiring the intensity of each cross section of the sample SA in the z-stack image of the sample SA in a short time, but the present invention is not limited to this manner. For example, light may be split by MFG (Multi Focus Grating). Further, the optical path splitting member 351 is arranged between the third imaging lens 50 and the first image surface IA (detector 60), but the present invention is not limited to this arrangement. For example, it may be arranged between the half mirror 42 and the first image surface IA (detector 60) in the microscope device 101 according to the third embodiment (see FIG. 22).

Eighth Embodiment

Next, a microscope device according to an eighth embodiment will be described. The microscope device according to the eighth embodiment has the same configuration as the microscope device 401 according to the seventh embodiment except for the processing in the image processor 66. Therefore, the same components as those of the first and seventh embodiments are designated by the same reference numerals and characters as those of the first and seventh embodiments, and detailed description thereof are omitted. In the eighth embodiment, in the case of bright field observation, the detector 60 detects detection light from the sample SA via the detection optical system 340 and outputs the detection signal of the detection light as in the seventh embodiment.

The image processor 66 generates data representing a phase distribution in the sample SA (as an example, image data of a two-dimensional phase distribution in the sample SA) based on the detection signal of the detection light output from the detector 60. Further, the image processor 66 generates image data of the sample SA by bright field observation based on the detection signal of the detection light output from the detector 60. In the eighth embodiment, the image processor 66 finds a two-dimensional phase distribution in the sample from the intensities of two defocused images of the sample SA, and generates image data of the two-dimensional phase distribution in the sample SA as in the case of the second method in the second embodiment. As a result, according to the eighth embodiment, the same effect as that of the second embodiment can be obtained. In the eighth embodiment, three defocused images having different defocus amounts are formed on the first image surface IA. Therefore, the intensities of the two defocused images of the sample SA (the signal strengths of the detection signals of the detector 60) can be acquired in a short time, and a two-dimensional phase distribution in the sample SA can be acquired in a short time. Not limited to the second method in the second embodiment, the image processor 66 may find a two-dimensional phase distribution in the sample SA from the intensity of one defocused image or one in-focus image of the sample SA and generate image data of the two-dimensional phase distribution in the sample SA as in the case of the first method in the second embodiment.

Ninth Embodiment

Figure 25:
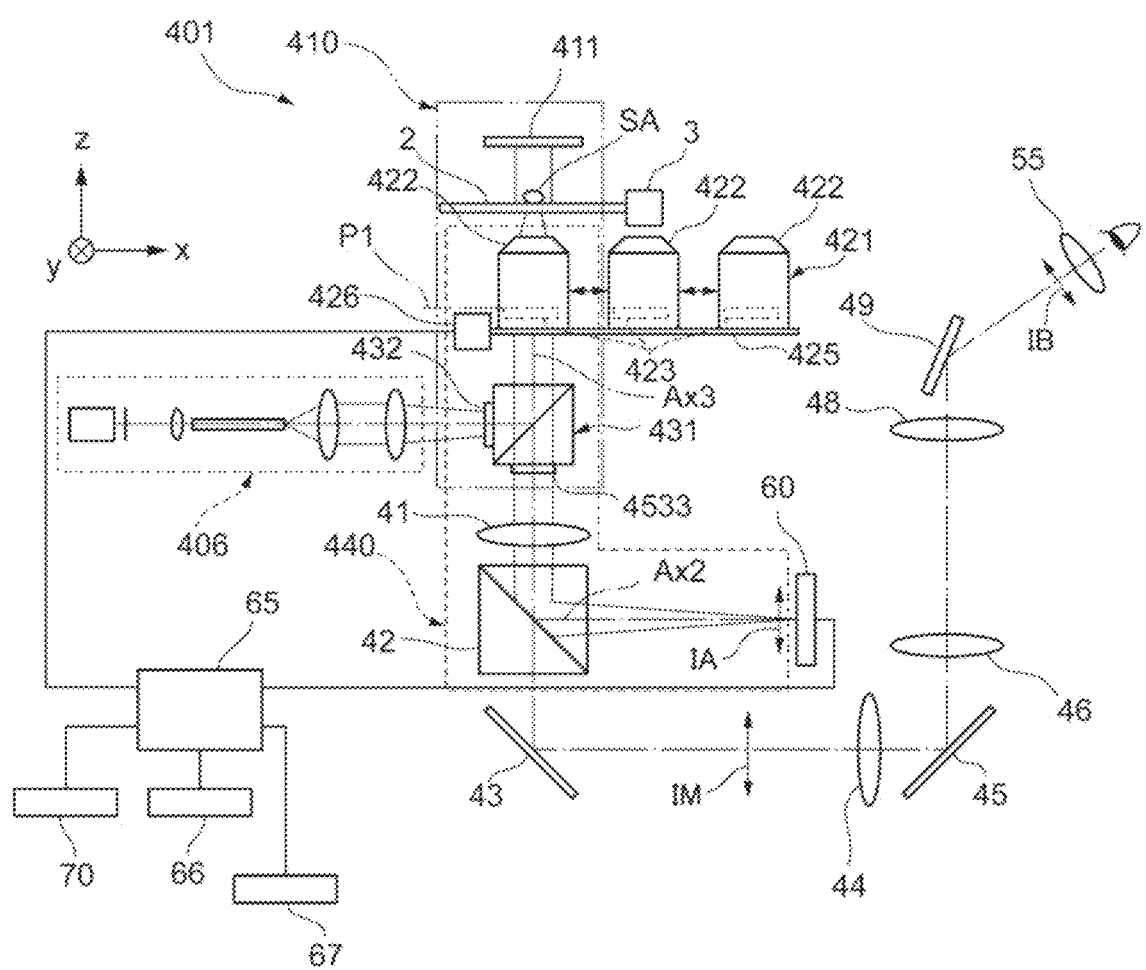
FIG. 25 is a diagram showing a schematic configuration of a microscope device according to a ninth embodiment.

Next, a microscope device 401 according to a ninth embodiment will be described with reference to FIG. 25. The microscope device 401 according to the ninth embodiment has the same configuration as the microscope device 1 according to the first embodiment except for the illumination optical system and the detection optical system. Therefore, the same components as those in the first embodiment are designated by the same reference numerals and characters as those in the first embodiment, and detailed description thereof are omitted. The microscope device 401 according to the ninth embodiment comprises a stage 2, an illumination light source 406, an illumination optical system 410, a detection optical system 440, a detector 60, a control part 65, an image processor 66, an operation input part 67, and an image display part 70.

The illumination light source 406 generates illumination light in a predetermined wavelength band. The illumination optical system 410 comprises a filter cube 431, an objective lens unit 421, and an illumination mirror 411 in this order from the illumination light source 406 side. The objective lens unit 421 includes a plurality of objective lenses 422, a lens holder 425, and a unit driver 426. The objective lens 422 is arranged below the stage 2 so as to face the stage 2. The lens holder 425 holds a plurality of objective lenses 422 having different focal lengths. The lens holder 425 is configured by using, for example, a revolver, a turret, or the like. The unit driver 426 drives the lens holder 425 to be capable of selecting any one of the plurality of objective lenses 422 and arranging the selected one below the stage 2.

An illumination/detection side modulation element 423 is provided at the position P1 of the pupil of the objective lens 422 (since the illumination pupil and the detection pupil are located at the same position in the present embodiment, they will be hereinafter referred to as an illumination/detection pupil or simply a pupil). A surface perpendicular to the optical axis Ax3 of the objective lens 422 at the position P1 of the pupil is referred to as a surface of the illumination/detection pupil. The illumination/detection side modulation element 423 is formed in the same manner as the illumination side modulation element 16 and the detection side modulation element 53 of the first embodiment except that the light transmittance changes within the surface of the illumination/detection pupil. The illumination/detection side modulation element 423 may be built in the objective lens 422 or may be arranged separately from the objective lens 422.

The filter cube 431 reflects a part of illumination light emitted from the illumination light source 406 toward the stage 2. The filter cube 431 transmits a part of detection light transmitted or diffracted through the sample SA on the stage 2 toward the first imaging lens 41 of the detection optical system 440. The filter cube 431 includes a first filter 432 through which the illumination light from the illumination light source 406 passes. The filter cube 431 includes a second filter 433 through which detection light from the sample SA passes. For example, bandpass filters are used as the first filter 432 and the second filter 433.

The detection optical system 440 comprises the objective lens unit 421 and the filter cube 431. The detection optical system 440 includes a first imaging lens 41 and a half mirror 42 in this order from the illumination optical system 410 side. Further, a first mirror 43, a lens 44, a second mirror 45, a collimator lens 46, a second imaging lens 48, a third mirror 49, and an eyepiece 55 are arranged on the optical path of light transmitted through the half mirror 42.

The ratio of the transmittance and reflectance of the half mirror 42 is set to, for example, 1:1. A part of light incident on the half mirror 42 is reflected by the half mirror 42 and forms an image on a predetermined first image surface IA. Here, the position of the predetermined first image surface IA is a position conjugate with the focal position of the objective lens 422. The detector 60 is arranged on the first image surface IA of the detection optical system 440. The other part of the light incident on the half mirror 42 is transmitted through the half mirror 42, and reflected by the first mirror 43. The light reflected by the first mirror 43 forms an image on a predetermined intermediate image surface IM, and is incident on the lens 44. The light transmitted through the lens 44 is reflected by the second mirror 45, and incident on the collimator lens 46. The light transmitted through the collimator lens 46 is incident as parallel light on the second imaging lens 48. The light transmitted through the second imaging lens 48 is reflected by the third mirror 49 and forms an image on a predetermined second image surface IB. Here, the position of the predetermined second image surface IB is a position conjugate with the focal position of the objective lens 422. An observer can observe the image of the sample SA formed on the second image surface IB by using the eyepiece 55.

In the present embodiment, illumination light emitted from the illumination light source 406 passes through the first filter 432 of the illumination optical system 410 and enters the filter cube 431. A part of the illumination light incident on the filter cube 431 is reflected by the filter cube 431, and incident on the objective lens 422. The illumination light incident on the objective lens 422 passes through the illumination/detection side modulation element 423, and is emitted to the stage 2. The illumination light emitted from the objective lens 422 is transmitted through the stage 2 and the sample SA, and reflected by the illumination mirror 411. The illumination light reflected by the illumination mirror 411 is incident on the sample SA on the stage 2. As a result, the illumination optical system 410 illuminates the sample SA on the stage 2 with the illumination light from the illumination light source 406.

The detection light transmitted or diffracted through the sample SA is incident on the objective lens 422 as the detection optical system 440. The detection light incident on the objective lens 422 passes through the illumination/detection side modulation element 423, and is emitted to the filter cube 431. The detection light emitted from the objective lens 422 is incident on the filter cube 431. A part of the detection light incident on the filter cube 431 is transmitted through the filter cube 431, passes through the second filter 433, and is incident on the first imaging lens 41. The detection light transmitted through the first imaging lens 41 is incident on the half mirror 42. A part of the detection light incident on the half mirror 42 is reflected by the half mirror 42 and forms an image on a predetermined first image surface IA on which the detector 60 is arranged. The other part of the detection light incident on the half mirror 42 is transmitted through the half mirror 42, and reflected by the first mirror 43. The detection light reflected by the first mirror 43 forms an image on a predetermined intermediate image surface IM, and is incident on the lens 44. The detection light transmitted through the lens 44 is reflected by the second mirror 45, and incident on the collimator lens 46. The detection light transmitted through the collimator lens 46 is incident as parallel light on the second imaging lens 48. The detection light transmitted through the second imaging lens 48 is reflected by the third mirror 49, and forms an image on a predetermined second image surface IB.

The detector 60 detects the detection light from the sample SA via the detection optical system 440, and outputs the detection signal of the detection light. The image processor 66 generates data representing a refractive index distribution in the sample SA (as an example, image data of a three-dimensional refractive index distribution in the sample SA) based on the detection signal of the detection light output from the detector 60. Further, the image processor 66 generates image data of the sample SA by bright field observation based on the detection signal of the detection light output from the detector 60. In the ninth embodiment, as in the first embodiment, the image processor 66 finds a three-dimensional refractive index distribution in the sample SA, and generates image data of the three-dimensional refractive index distribution in the sample SA. As a result, according to the ninth embodiment, the same effect as that of the first embodiment can be obtained.

Tenth Embodiment

Next, a microscope device according to a tenth embodiment will be described. The microscope device according to the tenth embodiment has the same configuration as the microscope device 401 according to the ninth embodiment except for the processing in the image processor 66. Therefore, the same components as those of the first and ninth embodiments are designated by the same reference numerals and characters as those of the first and ninth embodiments, and detailed description thereof are omitted. In the tenth embodiment, the detector 60 detects detection light from the sample SA via the detection optical system 440, and outputs the detection signal of the detection light as in the ninth embodiment.

The image processor 66 generates data representing a phase distribution in the sample SA (as an example, image data of a two-dimensional phase distribution in the sample SA) based on the detection signal of the detection light output from the detector 60. Further, the image processor 66 generates image data of the sample SA by bright field observation based on the detection signal of the detection light output from the detector 60. In the tenth embodiment, the image processor 66 finds a two-dimensional phase distribution in the sample SA and generates image data of the two-dimensional phase distribution in the sample SA as in the second embodiment. As a result, according to the tenth embodiment, the same effect as that of the second embodiment can be obtained.

Modification

In each of the above-mentioned embodiments, the image processor 66 finds a three-dimensional refractive index distribution or two-dimensional phase distribution in the sample SA based on the detection signal of light detected under one detection condition regarding light transmittance, however, the present invention is not limited to this manner. The image processor 66 may acquire a three-dimensional refractive index distribution in the sample SA or a two-dimensional phase distribution in the sample SA based on detection signals of light detected under a plurality of detection conditions regarding light transmittance. For example, the image processor 66 calculates a linear sum of POTFs based on detection signals of light detected under two detection conditions set by user's setting or the like. As a result, it is possible to obtain a higher absolute value of POTF over a wide frequency band as compared with a case where it is obtained based on a detection signal of light detected under one detection condition set by user's setting or the like. Therefore, it is possible to generate an image of a three-dimensional refractive index distribution or an image of a two-dimensional phase distribution in the sample SA, which has both high contrast and high resolution (resolving power). By using the above expression (10) or expression (15) containing POTF and the expression (16), the image processor 66 can calculate a three-dimensional refractive index distribution $n(x, y, z)$ in the sample SA. By using the above expression (29) or expression (34) containing POTF, the image processor 66 can calculate a two-dimensional phase distribution $\phi(x, y)$ in the sample SA.

Figure 26:
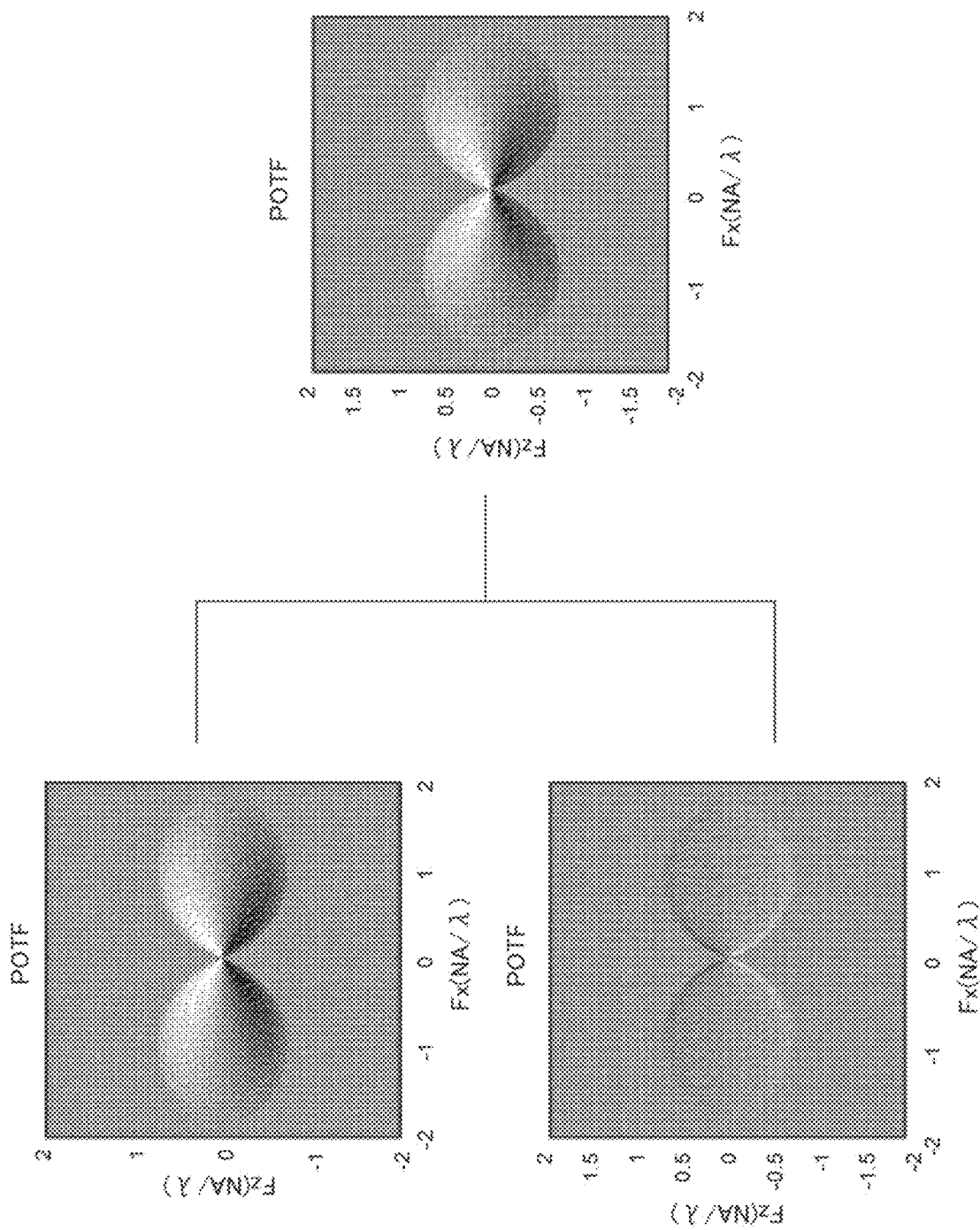
FIG. 26 is a diagram showing a distribution of POTF in a modification of the first embodiment.

Here, a first modification in which a three-dimensional refractive index distribution in the sample SA is found will be described. Under a first detection condition, the illumination side modulation element 16 whose light transmittance changes according to a cosine function as shown in FIG. 5 is arranged at the position P0 of the illumination pupil, and the detection side modulation element 53 is not arranged. Under a second detection condition, the illumination side modulation element 16 whose light transmittance is distributed in a discontinuous ring-shaped pattern within the surface of the illumination pupil is arranged at the position P0 of the illumination pupil, and the detection side modulation element 53 is not arranged. In this first modification, when a linear sum is calculated for POTF based on a detection signal of light detected under the first detection condition and POTF based on a detection signal of light detected under the second detection condition, it can be seen as shown in FIG. 26 that absolute values of POTF increase in a low frequency band and a high frequency band. Therefore, by using the above expression (10) or expression (15) including POTF containing information in a wide frequency band, it is possible to generate an image of a three-dimensional refractive index distribution in the sample SA, which has both high contrast and high resolution (resolving power). Note that the second detection condition is not limited to the example in which the light transmittance is distributed in a discontinuous ring-shaped pattern. For example, under the second detection condition, the illumination side modulation element 16 whose light transmittance changes according to a discontinuous function may be arranged at the position P0 of the illumination pupil, and in this case, the illumination side modulation element 16 whose light transmittance changes according to a step function may be arranged at the position P0 of the illumination pupil.

A second modification in a case where a three-dimensional refractive index distribution in the sample SA is found will be described. Under a first detection condition, the illumination side modulation element 16 whose light transmittance changes according to a sine function as shown in FIG. 7 is arranged at the position P0 of the illumination pupil, and the detection side modulation element 53 is not arranged. Under a second detection condition, the illumination side modulation element 16 whose light transmittance changes in a direction opposite to the direction in which the light transmittance changes according to a sine function as shown in FIG. 7 is arranged at the position P0 of the illumination pupil, and the detection side modulation element 53 is not arranged. In this second modification, when a linear sum is calculated for POTF based on a detection signal of light detected under the first detection condition and POTF based on a detection signal of light detected under the second detection condition, it can be seen that a frequency band range in which the absolute value of POTF is not equal to zero does not significantly change, but the absolute value of POTF is doubled.

This is because the value of POTF in the first detection condition and the value of POTF in the second detection condition have opposite signs to each other. This makes it possible to generate image data having a three-dimensional refractive index distribution having excellent contrast. Further, the first term of the above-mentioned expression (9) is a constant term representing the background intensity. When a linear sum is calculated for POTFs obtained under two detection conditions in which the light transmittance distribution following the sine function is inverted, the first terms of the expression (9) cancel out, so that an operation of excluding the first term of the expression (9) is not required to be performed. Therefore, it is possible to enhance the accuracy of deconvolution for the expression (9), that is, it is possible to enhance the calculation accuracy of $\phi(x, y, z)$ using the above-mentioned expression (10).

Further, not limited to the light transmittance, the image processor 66 may find a three-dimensional refractive index distribution or two-dimensional phase distribution in the sample SA based on detection signals of light detected under a plurality of conditions regarding the defocus amount of defocus (hereinafter, the condition for the defocus amount may be referred to as a focusing condition). For example, the image processor 66 may acquire a linear sum of POTFs based on detection signals of light detected under two focusing conditions having different defocus amounts $\Delta z$ to find a three-dimensional refractive index distribution or a two-dimensional phase distribution. As a result, POTF can be simply obtained over a wide frequency band by changing the defocusing amount $\Delta z$. Therefore, it is possible to generate an image having a three-dimensional refractive index distribution or an image having a two-dimensional phase distribution in the sample SA, which has both high contrast and high resolution (resolving power).

Figure 27:
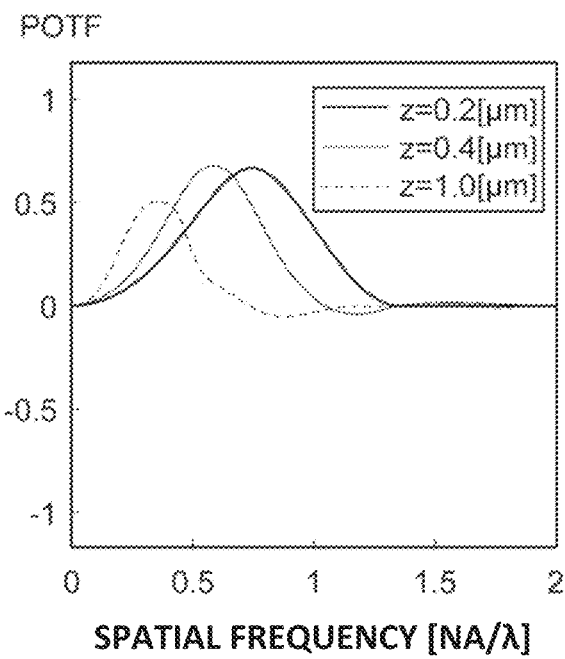
FIG. 27 is a diagram showing the gain of POTF in a modification of the second embodiment.

Here, a modification in a case of where a two-dimensional phase distribution in the sample SA is found will be described. Under a first focusing condition, the defocus amount $\Delta z = 0.4$ [μm] is set. Under a second focusing condition, the defocus amount $\Delta z = 1.0$ [μm] is set. Note that under both the first and second focusing conditions, the illumination side modulation element 16 whose light transmittance changes according to a cosine function as shown in FIG. 5 is arranged at the position P0 of the illumination pupil, and the detection side modulation element 53 is not arranged. FIG. 27 shows values of POTF for $\Delta z = 0.2$ [μm], $\Delta z = 0.4$ [μm], and $\Delta z = 1.0$ [μm]. It can be seen that in the case of $\Delta z = 0.4$ [μm], the peak of POTF is located in a band on a low frequency side, and in the case of $\Delta z = 1.0$ [μm], the peak of POTF is located in a band on a high frequency side. In this modification, when calculating a linear sum of POTF based on a detection signal of light detected under the first focusing condition and POTF based on a detection signal of light detected under the second focusing condition, the value of POTF increases over a wide frequency band from the low frequency band to the high frequency band. Therefore, by using the above expression (29) or expression (34) including POTF containing information in a wide frequency band, it is possible to generate an image of a two-dimensional phase distribution, which has both high contrast and high resolution (resolving power).

In the above-mentioned first embodiment, the three-dimensional refractive index distribution in the sample SA is found as data representing a refractive index distribution in the sample SA, but the present invention is not limited to this manner. It is also possible to find a two-dimensional refractive index distribution in the sample SA or a one-dimensional refractive index distribution in the sample SA. For example, by setting z to a constant value, it is possible to calculate a two-dimensional refractive index distribution in the sample SA (generate data of two-dimensional refractive index in the sample SA) by using the expression (10) or expression (15) and the expression (16). Further, a part of data of three-dimensional refractive index in the sample SA may be extracted to generate data of two-dimensional refractive index or data of one-dimensional refractive index in the sample SA.

In the above-mentioned first to eighth embodiments, the illumination side modulation element 16 is provided at the position P0 of the illumination pupil, but the present invention is not limited to this manner. The illumination side modulation element 16 may be provided at a position conjugate with the illumination pupil.

In the above-mentioned first to eighth embodiments, the microscope device is provided with the illumination side modulation element 16 and the detection side modulation element 53, 123, but the present invention is not limited to this manner. For example, the microscope device may be provided with only the illumination side modulation element 16, or may be provided with only the detection side modulation element 53, 123.

In each of the above-mentioned embodiments, the illumination side modulation element 16, the detection side modulation elements 53 and 123, and the illumination/detection side modulation element 423 are exemplified by elements which are formed by depositing a film capable of reducing light transmittance on a parallel flat plate such as a glass substrate as an element whose light transmittance changes within a flat plate, but the present invention is not limited to this manner. For example, the illumination side modulation element, the detection side modulation element, and the illumination/detection side modulation element may be configured so that a minute dot pattern capable of reducing the light transmittance (having a light-shielding property) is formed on a parallel flat plate such as a glass substrate. In this case, a dot pattern is formed on a parallel flat plate (glass substrate) so as to be changed in density by using an existing lithography process or the like, whereby it is possible to change the light transmittance (a dense region of the dot pattern is lower in transmittance than a sparse region). The illumination side modulation element, the detection side modulation element, and the illumination/detection side modulation element are not limited to the optical elements as described above, but may be configured by using SLM (spatial light modulator) such as a transmission type liquid crystal element, a reflection type liquid crystal element, or DMD (digital mirror device). When SLM is used, SLM is arranged at the pupil (at least one of the illumination pupil and the detection pupil) or a position conjugate with the pupil as in the optical element in each of the above-described embodiments. For example, when a transmission type liquid crystal element is used as SLM, a desired light transmittance distribution can be set by controlling the transmittance of each pixel of the element. When DMD is used as SLM, a desired light transmittance distribution can be set by controlling the angle of each mirror. In this way, it is possible to change the detection condition by changing the light transmittance distribution within the surface of the pupil or a surface conjugate with the pupil in the SLM.

When the optical element (that is, a flat plate having light transmissivity) in each of the above-described embodiments is used as the illumination side modulation element, the detection side modulation element, and the illumination/detection side modulation element, the control part 65 controls the element changing part (for example, a turret) so as to change the element to be arranged at the position of the pupil or a position conjugate with the pupil, thereby changing the light transmittance distribution within the surface of the pupil or within the surface conjugate with the pupil. For example, as described in the first embodiment, the control part 65 controls the element changing part so as to change the illumination side modulation element 16 arranged at the position P0 of the illumination pupil, thereby changing the light transmittance distribution within the surface of the illumination pupil. The control part 65 controls the element changing part so as to change the detection side modulation element 53 to be arranged at the position P2 conjugate with the detection pupil, thereby changing the light transmittance distribution within the surface conjugate with the detection pupil. When SLM is used as the illumination side modulation element, the detection side modulation element, and the illumination/detection side modulation element, the control part 65 controls the SLM to change the light transmittance distribution within the surface of the pupil or within the surface conjugate with the pupil. Therefore, it is not necessary to provide a plurality of elements and the element changing part for the purpose of changing the light transmittance distribution by the control part 65.

Further, the light transmittance distribution within the surface of the pupil or within the surface conjugate with the pupil can be changed from a predetermined first distribution to a second distribution by the control part 65, but the present invention is not limited to this manner. For example, in the first, second, fifth, and sixth embodiments described above, instead of the detection side modulation element 53, the third imaging lens 50, and the detector 60, an optical path splitting element (not shown), a first detection side modulation element (not shown), a second detection side modulation element (not shown), an imaging lens for the first detection side modulation element (not shown), an imaging lens for the second detection side modulation element (not shown), a detector for the first detection side modulation element (not shown), and a detector for the second detection side modulation element (not shown) may be provided so as to be nearer to the image surface side than the collimator lens 46. The optical path splitting element splits the optical path from the collimator lens 46 into two optical paths, which are an optical path to the first detection side modulation element and an optical path to the second detection side modulation element. The first detection side modulation element and the second detection side modulation element have the same configuration as the detection side modulation element 53 of the first embodiment. The light transmittance distribution of the first detection side modulation element is any one of the transmittance distributions described in the first embodiment (hereinafter referred to as a first distribution). The light transmittance distribution of the second detection side modulation element is a second distribution different from the above-mentioned first distribution out of the transmittance distributions described in the first embodiment. The imaging lens for the first detection side modulation element and the imaging lens for the second detection side modulation element have the same configuration as the third imaging lens 50 of the first embodiment. The detector for the first detection side modulation element has the same configuration as the detector 60 of the first embodiment, and it detects light (detection light) from the sample SA, which is split by the optical path splitting element and passes through the first detection side modulation element and the imaging lens for the first detection side modulation element, and outputs a detection signal of the light. The detector for the second detection side modulation element has the same configuration as the detector 60 of the first embodiment, and it detects light (detection light) from the sample SA, which is split by the optical path splitting element and passes through the second detection side modulation element and the imaging lens for the second detection side modulation element, and outputs a detection signal of the light.

The image processor 66 may generate image data of a three-dimensional refractive index distribution or image data of a two-dimensional phase distribution in the sample SA based on at least one of the detection signal of light output from the detector for the first detection side modulation element and the detection signal of light output from the detector for the second detection side modulation element. As a result, when the image processor 66 finds a three-dimensional refractive index distribution in the sample SA or a two-dimensional phase distribution in the sample SA based on the detection signals of light detected under a plurality of detection conditions relating to the light transmittance, a step of changing the detection condition (that is, changing the light transmittance distribution within the surface of the pupil or within the surface conjugate with the pupil) can be omitted, so that image data of a three-dimensional refractive index distribution in the sample SA or image data of a two-dimensional phase distribution in the sample SA can be generated in a short time. In this case, as in the seventh and eighth embodiments described above, the optical path splitting members 351 may be provided between the imaging lens for the first detection side modulation element and the detector for the first detection side modulation element and between the imaging lens for the second detection side modulation element and the detector for the second detection side modulation element, respectively.

In each of the above-described embodiments, the light transmittances of the illumination side modulation element 16, the detection side modulation elements 53, 123, and the illumination/detection side modulation element 423 change continuously according to a continuous function, but the present invention is not limited to this manner. For example, the light transmittances of the illumination side modulation element 16, the detection side modulation elements 53, 123, and the illumination/detection side modulation element 423 may change discretely according to a discontinuous function such as a step function. The light transmittances of the illumination side modulation element 16, the detection side modulation elements 53, 123, and the illumination/detection side modulation element 423 may partially change continuously according to a continuous function or partially change discretely according to a discontinuous function.

In each of the above-described embodiments, the "lens" such as the collector lens 12, the relay lens 15, the condenser lens 18, the first imaging lens 41, the lens 44, the collimator lens 46, and the third imaging lens 50 is illustrated as a single lens for convenience of explanation in the figures, but the present invention is not limited to this configuration. For example, the "lens" such as the collector lens 12 may be configured by a plurality of lenses, or may be configured by a combination of a lens and an existing optical element other than the lens.

In each of the above-described embodiments, the transmitted illumination light source 5 or the illumination light source 406 is provided in the microscope device. However, the present invention is not limited to this configuration, and they may be provided separately from the microscope device. For example, the transmitted illumination light source 5 or the illumination light source 406 may be detachably and exchangeably attached to the microscope device. The transmitted illumination light source 5 or the illumination light source 406 may be externally attached to the microscope device when an observation or the like is performed with the microscope device.

In each of the above-described embodiments, the illumination for the sample SA is Koehler illumination. However, the illumination is not limited to Koehler illumination, and may be critical illumination.

In each of the above-described embodiments, a microscope device capable of detecting light from the entire sample SA is used, but the present invention is not limited to this type microscope device. For example, a scanning microscope device that detects light from a part of a sample and scans the entire sample may be used.

EXPLANATION OF NUMERALS AND CHARACTERS

1 microscope device
10 transmitted illumination optical system
16 illumination side modulation element
20 epi-illumination optical system
21 objective lens unit
22 objective lens
40 detection optical system
53 detection side modulation element
60 detector
65 control part
66 image processor (data processor)
70 image display part
101 microscope device (third embodiment)
120 epi-illumination optical system
121 objective lens unit
122 objective lens
123 detection side modulation element
140 detection optical system
201 microscope device (fifth embodiment)
220 epi-illumination optical system
240 detection optical system
260 first detector
261 second detector
301 microscope device (seventh embodiment)
340 detection optical system
351 optical path splitting member
401 microscope device (ninth embodiment)
410 illumination optical system
421 objective lens unit
422 objective lens
423 illumination/detection side modulation element
440 detection optical system

RELATED APPLICATIONS

This is a continuation of PCT International Application No. PCT/JP2019/038569, filed on Sep. 30, 2019, which is hereby incorporated by reference.

The invention claimed is:
1. A microscope device comprising:
an illumination optical system for illuminating a sample;
a detection optical system for receiving light from the sample;
a detector for detecting the light from the sample via the detection optical system and outputting a detection signal of the light;
a data processor for generating at least one of a three-dimensional refractive index distribution and a two-dimensional phase distribution in the sample based on the detection signal output from the detector; and
a modulation element that is provided at a position of a pupil or a position conjugate with the pupil in only the illumination optical system, and has light transmittance changing continuously within a surface of the pupil or within a surface conjugate with the pupil,
the modulation element is at least one of the following:
the light transmittance is a maximum on an optical axis and a minimum over an entire circumference of an outer peripheral portion within the surface of the pupil or within the surface conjugate with the pupil in the illumination optical system; and
the light transmittance changes continuously from one position to another position along one direction over an entire surface of the pupil or an entire surface coniugate to the pupil in the illumination optical system, and the light transmittance at one position is smaller than the light transmittance at another position.

2. The microscope device according to claim 1, wherein a continuous function which specifies the light transmittance is any one function of a sine function, a cosine function, a quadratic function, a linear function, and a Gaussian function.

3. The microscope device according to claim 2, wherein in the sine function and the cosine function, the continuous function is in a range smaller than one cycle.

4. The microscope device according to claim 2, wherein the modulation element is a flat plate having light transmissivity, light transmittance of the flat plate changing within a surface of the flat plate.

5. The microscope device according to claim 4, wherein the modulation element is formed by a minute dot pattern capable of reducing light transmittance formed on the flat plate, and is formed so as to be changed in density, thereby forming a change of light transmittance according to the continuous function.

6. The microscope device according to claim 1, wherein the data processor generates data of at least one of a three-dimensional refractive index distribution and a two-dimensional phase distribution in the sample based on detection signals corresponding to intensities of a plurality of images at different positions in an optical axis direction in the sample as detection signals of light from the sample.

7. The microscope device according to claim 6, wherein the modulation element is a spatial light modulator capable of changing the light transmittance distribution, wherein the spatial modulation element includes a transmission type liquid crystal element, a reflection type liquid crystal element, and a digital mirror device (DMD), and when the DMD is used, it is possible to set a desired light transmittance distribution by controlling an angle of each mirror in the DMD, and wherein a control part controls the spatial light modulator to change the light transmittance distribution.

8. The microscope device according to claim 7, wherein the data processor generates data of at least one of a three-dimensional refractive index distribution and a two-dimensional phase distribution in the sample based on the detection signal output from the detector when the light transmittance distribution of the modulation element within the surface of the pupil or within the surface conjugate with the pupil is a first distribution, and the detection signal output from the detector when the light transmittance distribution of the modulation element within the surface of the pupil or within the surface conjugate with the pupil is a second distribution different from the first distribution.

9. A microscope device comprising:
an illumination optical system for illuminating a sample;
a detection optical system for receiving light from the sample;
a detector for detecting light from the sample via the detection optical system and outputting a detection signal of the light;
a data processor for forming an image of the sample based on the detection signal output from the detector; and
a modulation element that is provided at a position of a pupil or a position conjugate with the pupil in only the illumination optical system, and has light transmittance changing continuously within a surface of the pupil or a surface conjugate with the pupil,
wherein the modulation element is a spatial light modulator capable of changing a transmittance distribution of the light, and wherein the spatial light modulator includes a transmission type flat plate, a transmission type liquid crystal element, a reflection type liquid crystal element, and a digital mirror device (DMD) in which light transmittance changes, and when the DMD is used, a desired light transmittance distribution can be set by controlling an angle of each mirror in the DMD,
the modulation element is at least one of the following:
light transmittance continuously changes as being apart from an optical axis within the surface of the pupil or within the surface conjugate with the pupil in the illumination optical system, and the light transmittance is equal to zero on an entire circumference of an outer peripheral portion within the surface of the pupil or within the surface conjugate with the pupil, and
the light transmittance continuously changes along one direction within the surface of the pupil or within the surface conjugate with the pupil in the illumination optical system, and the light transmittance is equal to zero at a part of an outer circumference within the surface of the pupil or within the surface coniugate with the pupil.

10. The microscope device according to claim 9, wherein a case of the light transmittance continuously changing along the one direction, in the illumination optical system, a transmittance change of the modulation element for changing the transmittance within the surface of the pupil or within the surface conjugate with the pupil is a linear function changing continuously along one direction.

11. A data generation method using an illumination optical system for illuminating a sample, a detection optical system on which light from the sample is incident, and a modulation element which is provided at a position of a pupil or a position conjugate with the pupil in only the illumination optical system, and has light transmittance changing continuously within a surface of the pupil or within a surface conjugate with the pupil, comprising:
detecting light from the sample via the detection optical system and outputting a detection signal of the light; and
generating data of at least one of a three-dimensional refractive index distribution and a two-dimensional phase distribution in the sample based on the output detection signal,
wherein, the modulation element is at least one of the following:
the light transmittance is a maximum on an optical axis and a minimum over an entire circumference of an outer peripheral portion within the surface of the pupil or within a surface coniugate with the pupil in the illumination optical system, and
the light transmittance changes continuously from one position to another position along one direction over the entire surface of the pupil or the entire surface coniugate to the pupil in the illumination optical system, and the light transmittance at one position is smaller than the light transmittance at another position.

12. The microscope device according to claim 9, wherein a case of the light transmittance continuously changing as being apart from the optical axis, in the illumination optical system, a transmittance change of the modulation element for changing the transmittance within the surface of the pupil or within the surface conjugate with the pupil is a quadratic function.

* * * * *

UNITED STATES PATENT AND TRADEMARK OFFICE
CERTIFICATE OF CORRECTION

PATENT NO. : 12,386,166 B2
APPLICATION NO. : 17/707096
DATED : August 12, 2025
INVENTOR(S) : Satoshi Ikeda et al.

Page 1 of 1

It is certified that error appears in the above-identified patent and that said Letters Patent is hereby corrected as shown below:

In the Claims

Column 58, Line 64:
In Claim 1, delete "coniugate" and insert -- conjugate --.

Column 60, Line 21:
In Claim 9, delete "coniugate" and insert -- conjugate --.

Column 60, Line 49:
In Claim 11, delete "coniugate" and insert -- conjugate --.

Column 60, Line 55:
In Claim 11, delete "coniugate" and insert -- conjugate --.

Signed and Sealed this
Twenty-eighth Day of October, 2025

John A. Squires
*Director of the United States Patent and Trademark Office*